(12) United States Patent
Nozaki et al.

(10) Patent No.: US 11,117,984 B2
(45) Date of Patent: Sep. 14, 2021

(54) METAL COMPLEX AND METHOD FOR PRODUCING THE SAME, CATALYST COMPONENT FOR OLEFIN POLYMERIZATION AND CATALYST FOR OLEFIN POLYMERIZATION CONTAINING THE METAL COMPLEX, AND METHODS FOR PRODUCING α-OLEFIN POLYMER AND COPOLYMER USING THE CATALYST FOR OLEFIN POLYMERIZATION

(71) Applicants: THE UNIVERSITY OF TOKYO, Tokyo (JP); JAPAN POLYCHEM CORPORATION, Tokyo (JP)

(72) Inventors: Kyoko Nozaki, Tokyo (JP); Shingo Ito, Tokyo (JP); Wen-Jie Tao, Tokyo (JP); Yohei Konishi, Kanagawa (JP); Hisashi Ohtaki, Kanagawa (JP); Yasuo Oishi, Kanagawa (JP); Akio Tanna, Mie (JP); Takao Tayano, Mie (JP)

(73) Assignees: THE UNIVERSITY OF TOKYO, Tokyo (JP); JAPAN POLYCHEM CORPORATION, Tokyo (JP)

( * ) Notice: Subject to any disclaimer, the term of this patent is extended or adjusted under 35 U.S.C. 154(b) by 0 days.

(21) Appl. No.: 16/320,046

(22) PCT Filed: Jul. 26, 2017

(86) PCT No.: PCT/JP2017/027134
§ 371 (c)(1),
(2) Date: Jan. 23, 2019

(87) PCT Pub. No.: WO2018/021446
PCT Pub. Date: Feb. 1, 2018

(65) Prior Publication Data
US 2019/0263945 A1     Aug. 29, 2019

(30) Foreign Application Priority Data

Jul. 27, 2016 (JP) .............................. JP2016-147876
Jul. 27, 2016 (JP) .............................. JP2016-147877
Jul. 27, 2016 (JP) .............................. JP2016-147880

(51) Int. Cl.
*C08F 10/06* (2006.01)
*C07F 15/04* (2006.01)
(Continued)

(52) U.S. Cl.
CPC ............... *C08F 10/06* (2013.01); *B01J 23/00* (2013.01); *C07F 9/5022* (2013.01);
(Continued)

(58) Field of Classification Search
CPC ........... C08F 210/02; C08F 4/42; C07F 15/04
See application file for complete search history.

(56) References Cited

U.S. PATENT DOCUMENTS

| 6,559,326 B1 | 5/2003 | Kristen et al. |
| 2011/0213110 A1 | 9/2011 | Shimizu et al. |
| 2017/0002120 A1* | 1/2017 | Sato ...................... C08F 210/02 |

FOREIGN PATENT DOCUMENTS

| CN | 102197040 A | 9/2011 |
| JP | 2005-307021 | 11/2005 |

(Continued)

OTHER PUBLICATIONS

Ina Dubinsky-Davidchik et al., "Selective Aryl-Fluoride Reductive Elimination from a Platinum (IV) Complex", Angewandte Chemie, International Edition, 2015, vol. 54, No. 42, ISSN 1433-7851, pp. 12447-12451.

(Continued)

*Primary Examiner* — Catherine S Branch
(74) *Attorney, Agent, or Firm* — Greenblum & Bernstein, P.L.C.

(57) ABSTRACT

Provided are a novel catalyst component for producing an α-olefin (co)polymer, and a production method using the same. A metal complex is obtainable by contacting a compound represented by the general formula [I] or [II] with a transition metal compound containing a transition metal belonging to 9th to 11th group:

(Continued)

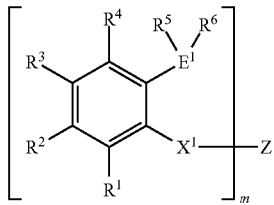

[I]

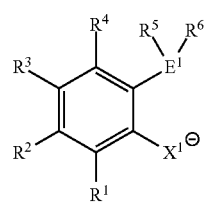

[II]

wherein $R^1$, $R^2$, $R^3$ and $R^4$ represent (i) hydrogen, (ii) a halogen, (iii) a linear alkyl or the like, or (iv) $OR^9$ or the like; $R^5$ and $R^6$ represent a linear alkyl group or the like; any one of $R^1$-$R^6$ may have a heteroatom or a heteroatom containing group; $E^1$ represents phosphorus, arsenic or antimony; $X^1$ represents oxygen or sulfur; Z represents hydrogen or a leaving group.

21 Claims, 1 Drawing Sheet

(51) Int. Cl.
  C07F 9/50    (2006.01)
  B01J 23/00   (2006.01)
(52) U.S. Cl.
  CPC .......... C07F 9/5045 (2013.01); C07F 15/04 (2013.01); *C08F 2410/01* (2013.01)

(56) References Cited

FOREIGN PATENT DOCUMENTS

| JP | 2010-150246 | 7/2010 | |
|---|---|---|---|
| WO | 2010/050256 | 5/2010 | |
| WO | 2013/159229 | 10/2013 | |
| WO | WO-2015115378 A1 * | 8/2015 | ................ C08F 4/80 |

OTHER PUBLICATIONS

David H. Empsall et al., "Complexes of Platinum and Palladium with Tertiary Dimethoxyphenylphosphines: Attempts to Effect 0- or C-Metallation", Journal of the Chemical Society, Dalton Transactions: Inorganic Chemistry (1972-1999), 1978, No. 3, ISSN 0300-9246, pp. 257-262.
Alex S. Ionkin et al., "Rare Organometallic Complex of Divalent, Four-coordinate Iridium: Synthesis, Structural Characterization, and First Insights into Reactivity, Organometallics", 2004, vol. 23, No. 25, ISSN 0276-7333, pp. 6031-6041.
Heinicke et al., "Chem. Eur. J.", 2003, 9, 6093.
Heinicke et al., "European Journal of Inorganic Chemistry", 2000, 3, 431.
Empsall et al., "Some Unusual Iridium Complexes formed from (2,6-Dimethoxyphenyl)-and (2,3-Dimethoxyphenyl)-di-t-butylphosphine: Crystal Structure of [2-Di-t-butylphosphino-3-methoxyphenoxo-op] {2-[(2-hydroxy-6-methoxyphenyl)t-butylphosphino]- . . . ", Journal of the Chemical Society, Dalton Transactions: Inorganic Chemistry (1972-1999), 1978, No. 9, ISSN 0300-9246, pp. 1119-1126.
International Search Report in International Patent Application No. PCT/JP2017/027134, dated Oct. 31, 2017.
International Preliminary Report on Patentability issued with respect to Patent Application No. PCT/JP2017/027134, dated Jan. 29, 2019.
Extended European Search Report (EESR) in European Patent App. No. 17834448.7 dated Jun. 26, 2019.
Konishi et al., "Nickel-Catalyzed Propylene/Polar Monomer Copolymerization," *ACS Macro Letters*, vol. 7, No. 2, Jan. 30, 2018, pp. 213-217.
Office Action issued in corresponding JP App. No. 2016-147877, dated Mar. 17, 2020 with English machine translation.
Office Action issued in corresponding Chinese Patent App. No. 201780046126.4, dated Sep. 18, 2020 with English machine translation.
Office Action issued in JP App. No. 2017-144969, dated Oct. 6, 2020 2020 with English machine translation.
Office Action issued in JP App. No. 2017-144970, dated Oct. 6, 2020 2020 with English machine translation.
Office Action issued in JP App. No. 2016-147877, dated Nov. 4, 2020 2020 with English machine translation.
Chinese Office Action in corresponding Application No. 201780046126. 4, dated Mar. 19, 2021 with English Machine translation.
STN Registry database "RN: 826995-33-9" ACS, pp. 1-53, dated Jan. 22, 2014.

* cited by examiner

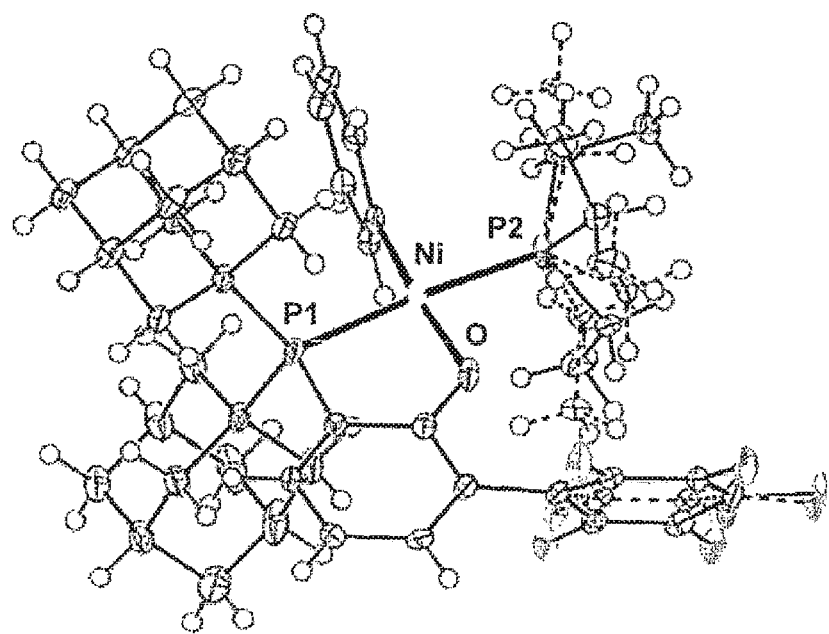

METAL COMPLEX AND METHOD FOR PRODUCING THE SAME, CATALYST COMPONENT FOR OLEFIN POLYMERIZATION AND CATALYST FOR OLEFIN POLYMERIZATION CONTAINING THE METAL COMPLEX, AND METHODS FOR PRODUCING α-OLEFIN POLYMER AND COPOLYMER USING THE CATALYST FOR OLEFIN POLYMERIZATION

TECHNICAL FIELD

The disclosure relates to a metal complex useful for producing an α-olefin polymer and an α-olefin copolymer, and novel methods for producing an α-olefin polymer and an α-olefin copolymer using the same.

BACKGROUND ART

A copolymer of α-olefin and a polar group-containing monomer is an industrially useful polymer. To obtain the copolymer by direct polymerization, a high pressure radical method is generally employed. However, this method has a disadvantage in that it is not possible to polymerize higher α-olefins such as propylene. It is industrially difficult to produce the copolymer by methods other than the high pressure radical method, and catalyst deactivation is inevitable in the case of using a Ziegler catalyst or metallocene catalyst.

Then, in the field of metallocene catalysts, copolymerization of ethylene and methyl methacrylate was enabled by an organic rare earth metal complex-based metallocene catalyst. Since the 1990s, copolymerization of ethylene and a polar group-containing comonomer by a late transition metal complex catalyst, has been intensively studied. For example, (α-diimine)palladium complexes as reported by Brookhart, et al. and (salicyl amidinate)nickel catalysts as reported by Grubbs et al, are known. In the case of using those catalysts, low polymerization temperature is employed to suppress frequency of chain transfer; thereby, low copolymer productivity and low molecular weight are generally caused. In recent years, the problem with copolymerization of ethylene and a polar group-containing monomer was solved by findings such as (phosphorus sulfonate)palladium complexes (see Patent Literature 1) and (phosphorus phenolate) nickel complexes (see Patent Literatures 2 to 4, Non-Patent Literatures 1 and 2, etc.), which are so-called SHOP-based catalysts.

As just described, the (phosphorus phenolate)nickel complexes are effective as a copolymerization catalyst for copolymerization of ethylene and a polar group-containing monomer. However, there has been no report of the effectiveness of the (phosphorus phenolate)nickel complexes in copolymerization of α-olefin and a polar group-containing monomer.

CITATION LIST

Patent Literatures

Patent Literature 1: Japanese Patent Application Laid-Open (JP-A) No. 2010-150246
Patent Literature 2: International Publication No. WO2010/050256
Patent Literature 3: U.S. Pat. No. 6,559,326
Patent Literature 4: JP-A No. 2005-307021

Non-Patent Literatures

Non-Patent Literature 1: J. Heinicke et al., "Chem. Eur. J.", 2003, 9, 6093.

Non-Patent Literature 2: J. Heinicke et al., "European Journal of Inorganic Chemistry", 2000, 3, 431.

SUMMARY OF INVENTION

Technical Problem

In light of the problems of the prior art, an object of the present disclosure is to provide a novel catalyst component with excellent polymerization activity, which is used for producing an α-olefin polymer and α-olefin copolymer, especially used for producing a high-molecular-weight polymer, and methods for producing an α-olefin polymer and an α-olefin copolymer using the same.

Solution to Problem

To achieve the above object, the inventors of the present invention conducted research and found a novel transition metal complex having a phosphorus phenolate ligand structure, which differs from existing (phosphorus phenolate) transition metal complexes, and they found that homopolymerization of α-olefin or copolymerization with a polar group-containing monomer is possible. Also, they found that a (co)polymer with a higher molecular weight can be obtained, and they accomplished the present disclosure.

In a first embodiment of the present disclosure, there are provided:

[1-1] A metal complex obtained by contacting a compound represented by the following general formula [I] or [II] with a transition metal compound containing a transition metal belonging to 9th, 10th or 11th group in the periodic table:

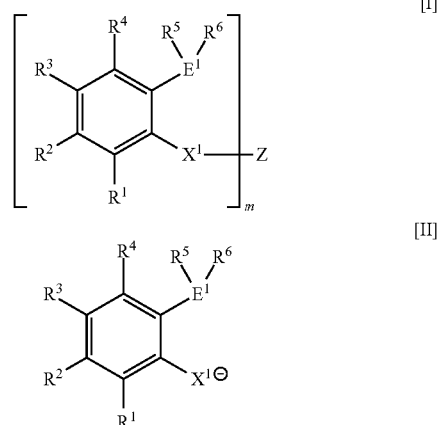

wherein $R^1$ to $R^6$, $E^1$ and $X^1$ in the general formulae and [II] are as follows:

$R^1$, $R^2$, $R^3$ and $R^4$ each independently represent an atom or group selected from the group consisting of the following (i) to (iv):

(i) hydrogen,
(ii) a halogen,
(iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and (iv) $OR^9$, $CO_2R^9$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; Mt represents an alkali metal, an alkaline earth metal, ammonium, quaternary ammonium or phosphonium; x represents an integer of from 0 to 3; and y represents an integer of from 0 to 2;

a plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represent a linear alkyl group having 7 to 30 carbon atoms, a branched acyclic alkyl group having 7 to 30 carbon atoms, an alkenyl group having 7 to 30 carbon atoms, a cycloalkyl group having 7 to 30 carbon atoms and optionally having a side chain, or an arylalkyl group having 7 to 30 carbon atoms, each of the groups optionally having one selected from the group consisting of a heteroatom and a group containing a heteroatom;

$E^1$ represents phosphorus, arsenic or antimony; and $X^1$ represents oxygen or sulfur, and wherein, in the general formula [I], Z represents hydrogen or a leaving group, and m represents a valence of Z.

[1-2] A metal complex represented by the following general formula [III]:

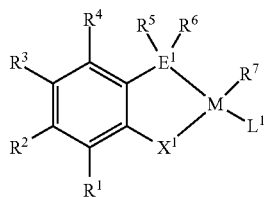

[III]

wherein $R^1$ to $R^7$, $E^1$, $X^1$, M and $L^1$ in the general formula [III] are as follows:

$R^1$, $R^2$, $R^3$ and $R^4$ each independently represent an atom or group selected from the group consisting of the following (i) to (iv):

(i) hydrogen, (ii) a halogen, (iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and (iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

a plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represent a linear alkyl group having 7 to 30 carbon atoms, a branched acyclic alkyl group having 7 to 30 carbon atoms, an alkenyl group having 7 to 30 carbon atoms, a cycloalkyl group having 7 to 30 carbon atoms and optionally having a side chain, or an arylalkyl group having 7 to 30 carbon atoms, each of the groups optionally having one selected from the group consisting of a heteroatom and a group containing a heteroatom;

$E^1$ represents phosphorus, arsenic or antimony;

$X^1$ represents oxygen or sulfur; M represents a transition metal belonging to 9th, 10th or 11th group in the periodic table;

$R^7$ represents hydrogen or a hydrocarbon group having 1 to 20 carbon atoms and optionally having one selected from the group consisting of a heteroatom and a group containing a heteroatom;

$L^1$ represents a ligand coordinated to M; and $R^7$ and $L^1$ optionally bind to each other to form a ring.

[1-3] The metal complex according to [1-2], wherein M is a transition metal belonging to 10th group in the periodic table.

[1-4] The metal complex according to any one of [1-1] to [1-3], wherein $R^3$ is hydrogen.

[1-5] A method for producing a metal complex represented by the general formula [III] of the above-mentioned [1-2], Wherein a compound represented by the general formula [I] or [II] of the above-mentioned [1-1] is contacted with a transition metal compound containing a transition metal belonging to 9th, 10th or 11th group in the periodic table.

[1-6] A catalyst component for olefin polymerization, comprising the metal complex defined by any one of [1-1] to [1-4] or a metal complex obtained by the production method defined by [1-5].

[1-7] A catalyst for olefin polymerization, comprising the following components (A) and (B) and, as needed, the following component (C):

the component (A): the metal complex defined by any one of [1-1] to [1-4] or a metal complex obtained by the production method defined by [1-5]

the component (B): a compound reactive with the component (A) to form an ion pair, or an ion-exchange layered silicate the component (C): an organoaluminum compound.

[1-8] The catalyst for olefin polymerization according to [1-7], wherein the component (B) is aluminoxane.

[1-9] A method for producing an α-olefin polymer, wherein (a) an α-olefin is polymerized or copolymerized in the presence of the catalyst for polymerization defined by [1-7] or [1-8].

[1-10] A method for producing an α-olefin copolymer, wherein (a) an α-olefin and (b) a (meth)acrylic acid ester monomer, vinyl monomer or allyl monomer are copolymerized in the presence of the catalyst for polymerization defined by [1-7] or [1-8].

In a second embodiment of the present disclosure, there are provided:

[2-1] A metal complex obtained by contacting a compound represented by the following general formula [I] or [II] with a transition metal compound containing a transition metal belonging to 9th, 10th or 11th group in the periodic table:

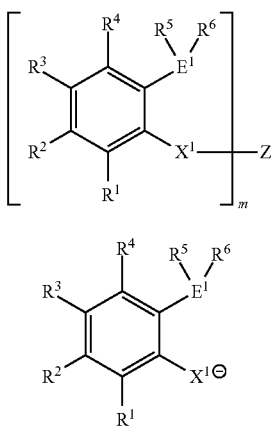

wherein $R^1$ to $R^6$, $E^1$ and $X^1$ in the general formulae [I] and [II] are as follows:

$R^2$, $R^3$ and $R^4$ each independently represent an atom or group selected from the group consisting of the following (i) to (iv):

(i) hydrogen,
(ii) a halogen,
(iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and
(iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; represents an alkali metal, an alkaline earth metal, ammonium, quaternary ammonium or phosphonium; x represents an integer of from 0 to 3; and y represents an integer of from 0 to 2;

$R^1$ represents a group selected from the group consisting of the following (v) and (vi):

(v) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups having one selected from the group consisting of a heteroatom and a group containing a heteroatom, and (vi) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, wherein $R^8$, $R^9$, x and y are as described above;

a plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represent a linear alkyl group having 1 to 6 carbon atoms, a branched acyclic alkyl group having 3 to 6 carbon atoms, or an alkenyl group having 2 to 6 carbon atoms, each of the groups optionally having one selected from the group consisting of a heteroatom and a group containing a heteroatom;

$R^5$ and $R^6$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$E^1$ represents phosphorus, arsenic or antimony; and
$X^1$ represents oxygen or sulfur, and
wherein, in the general formula [I],
Z represents hydrogen or a leaving group, and
m represents a valence of Z.

[2-2] A metal complex represented by the following general form a [III]:

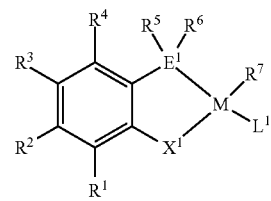

wherein $R^1$ to $R^7$, $E^1$, $X^1$, M and $L^1$ in the general formula [III] are as follows:

$R^2$, $R^3$ and $R^4$ each independently represent an atom or group selected from the group consisting of the following (i) to (iv):

(i) hydrogen,
(ii) a halogen,
(iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and (iv) OR$^9$, CO$_2$R$^9$, CO$_2$M', C(O)N(R$^8$)$_2$, C(O)R$^9$, SR$^9$, SO$_2$R$^9$, SOR$^9$, OSO$_2$R$^9$, P(O)(OR$^9$)$_{2-y}$(R$^8$)$_y$, CN, NHR$^9$, N(R$^9$)$_2$, Si(OR$^8$)$_{3-x}$(R$^8$)$_x$, OSi(OR$^8$)$_{3-x}$(R$^8$)$_x$, NO$_2$, SO$_3$M', PO$_3$M'$_2$, P(O)(OR$^9$)$_2$M' or an epoxy-containing group, where R$^8$ represents hydrogen or a hydrocarbon group having 1 to 20 carbon atoms; R$^9$ represents a hydrocarbon group having 1 to 20 carbon atoms; Mt represents an alkali metal, an alkaline earth metal, ammonium, quaternary ammonium or phosphonium; x represents an integer of from 0 to 3; and y represents an integer of from 0 to 2;

R$^1$ represents a group selected from the group consisting of the following (v) and (vi):

(v) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups having one selected from the group consisting of a heteroatom and a group containing a heteroatom, and (vi) OR$^9$, CO$_2$R$^9$, CO$_2$M', C(O)N(R$^8$)$_2$, C(O)R$^9$, SR$^9$, SO$_2$R$^9$, SOR$^9$, OSO$_2$R$^9$, P(O)(OR$^9$)$_{2-y}$(R$^8$)$_y$, CN, NHR$^9$, N(R$^9$)$_2$, Si(OR$^8$)$_{3-x}$(R$^8$)$_x$, OSi(OR$^8$)$_{3-x}$(R$^8$)$_x$, NO$_2$, SO$_3$M', PO$_3$M'$_2$, P(O)(OR$^9$)$_2$M' or an epoxy-containing group, wherein R$^8$, R$^9$, M', x and y are as described above;

a plurality of groups appropriately selected from R$^1$, R$^2$, R$^3$ and R$^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

R$^5$ and R$^6$ each independently represent a linear alkyl group having 1 to 6 carbon atoms, a branched acyclic alkyl group having 3 to 6 carbon atoms, or an alkenyl group having 2 to 6 carbon atoms, each of the groups optionally having one selected from the group consisting of a heteroatom and a group containing a heteroatom;

R$^5$ and R$^6$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

E$^1$ represents phosphorus, arsenic or antimony;

X$^1$ represents oxygen or sulfur;

M represents a transition metal belonging to 9th, 10th or 11th group in the periodic table;

R$^7$ represents hydrogen or a hydrocarbon group having 1 to 20 carbon atoms and optionally having one selected from the group consisting of a heteroatom and a group containing a heteroatom;

L$^1$ represents a ligand coordinated to M; and

R$^7$ and L$^1$ optionally bind to each other to form a ring.

[2-3] The metal complex according to [2-2], wherein M is a transition metal belonging to 10th group in the periodic table.

[2-4] The metal complex according to any one of [2-1] to [2-3], wherein R$^1$ is an aryl group having 6 to 30 carbon atoms and having one selected from the group consisting of a heteroatom and a group containing a heteroatom, or Si(OR$^8$)$_{3-x}$(R$^8$)$_x$.

[2-5] The metal complex according to any one of [2-1] to [2-4], wherein R$^3$ is hydrogen or a linear alkyl group having 1 to 30 carbon atoms and having a group containing a heteroatom.

[2-6] The metal complex according to [2-5], wherein R$^3$ is hydrogen.

[2-7] A method for producing a metal complex represented by the general formula [III] of the above-mentioned [2-2], wherein a compound represented by the general formula [I] or [II] of the above-mentioned [2-1] is contacted with a transition metal compound containing a transition metal belonging to 9th, 10th or 11th group in the periodic table.

[2-8] A catalyst component for olefin polymerization, comprising the metal complex defined by any one of [2-1] to [2-6] or a metal complex obtained by the production method defined by [2-7].

[2-9] A catalyst for olefin polymerization, comprising the following components (A) and (B) and, as needed, the following component (C):

the component (A): the metal complex defined by any one of [2-1] to [2-6] or a metal complex obtained by the production method defined by [2-7]

the component (13): a compound reactive with the component (A) to form an ion pair, or an ion-exchange layered silicate the component (C): an organoaluminum compound.

[2-10] The catalyst for olefin polymerization according to [2-9], wherein the component (B) is aluminoxane.

[2-11] A method for producing an α-olefin polymer, wherein (a) an α-olefin is polymerized or copolymerized in the presence of the catalyst for polymerization defined by [2-9] or [2-10].

[2-12] A method for producing an α-olefin copolymer, wherein (a) an α-olefin and (b) a (meth)acrylic acid ester monomer, vinyl monomer or allyl monomer are copolymerized in the presence of the catalyst for polymerization defined by [2-9] or [2-10].

In a third embodiment of the present disclosure, there are provided:

[3-1] A metal complex obtained by contacting a compound represented by the following general formula [I] or [II] with a transition metal compound containing a transition metal belonging to 9th, 10th or 11th group in the periodic table:

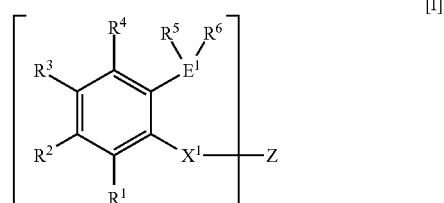

[I]

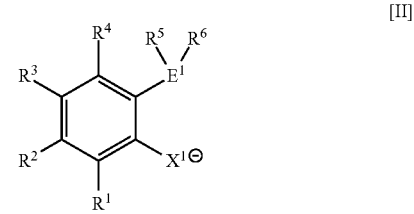

[II]

wherein $R^1$ to $R^6$, $E^1$ and $X^1$ in the general formulae [I] and [II] are as follows:

$R^1$ represents a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms;

$R^2$, $R^3$ and $R^4$ each independently represent an atom or group selected from the group consisting of the following (i) to (iv):
- (i) hydrogen,
- (ii) a halogen,
- (iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and
- (iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

a plurality of groups appropriately selected from $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represent a linear alkyl group having 4 to 6 carbon atoms, a secondary alkyl group having 4 to 6 carbon atoms, a tertiary alkyl group having 4 to 6 carbon atoms, or an alkenyl group having 4 to 6 carbon atoms, each of the groups optionally having one selected from the group consisting of a heteroatom and a group containing a heteroatom;

$E^1$ represents phosphorus, arsenic or antimony; and
$X^1$ represents oxygen or sulfur, and
wherein, in the general formula [I],
Z represents hydrogen or a leaving group, and
m represents a valence of Z.

[3-2] A metal complex represented by the following general formula [III]:

[III]

wherein $R^1$ to $R^7$, $E^1$, $X^1$, M and $L^1$ in the general formula [III] are as follows:

$R^1$ represents a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms;

$R^2$, $R^3$ and $R^4$ each independently represent an atom or group selected from the group consisting of the following (i) to (iv):
- (i) hydrogen,
- (ii) a halogen,
- (iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and
- (iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9R_2)_2M'$ or an epoxy-containing group, where represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

a plurality of groups appropriately selected from $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represent a linear alkyl group having 4 to 6 carbon atoms, a secondary alkyl group having 4 to 6 carbon atoms, a tertiary alkyl group having 4 to 6 carbon atoms, or an alkenyl group having 4 to 6 carbon atoms, each of the groups optionally having one selected from the group consisting of a heteroatom and a group containing a heteroatom;

$E^1$ represents phosphorus, arsenic or antimony;
$X^1$ represents oxygen or sulfur;
M represents a transition metal belonging to 9th, 10th or 11th group in the periodic table;
$R^7$ represents hydrogen or a hydrocarbon group having 1 to 20 carbon atoms and optionally having one selected from the group consisting of a heteroatom and a group containing a heteroatom;
$L^1$ represents a ligand coordinated to M; and
$R^7$ and $L^1$ optionally bind to each other to form a ring.

[3-3] The metal complex according to [3-2], wherein M is a transition metal belonging to 10th group in the periodic table.

[3-4] The metal complex according to any one of [3-1] to [3-3], wherein $R^5$ and $R^6$ are a tert-butyl group each.

[3-5] The metal complex according to any one of [3-1] to [3-4], wherein $R^1$ is a tert-butyl group.

[3-6] A method for producing a metal complex represented by the general formula [III] of the above-mentioned [3-2], wherein a compound represented by the general formula [I] or [II] of the above-mentioned [3-1] is contacted with a transition metal compound containing a transition metal belonging to 9th, 10th or 11th group in the periodic table.

[3-7] A catalyst component for olefin polymerization, comprising the metal complex defined by any one of [3-1] to [3-5] or a metal complex obtained by the production method defined by [3-6].

[3-8] A catalyst for olefin polymerization, comprising the following components (A) and (B) and, as needed, the following component (C):

the component (A): the metal complex defined by any one of [3-1] to [3-5] or a metal complex obtained by the production method defined by [3-6]

the component (B): a compound reactive with the component (A) to form an ion pair, or an ion-exchange layered silicate the component (C): an organoaluminum compound.

[3-9] The catalyst for olefin polymerization according to [3-8], wherein the component (B) is aluminoxane.

[3-10] A method for producing an α-olefin polymer, wherein (a) an α-olefin is Polymerized in the presence of the catalyst for polymerization defined by [3-8] or [3-9].

[3-11] A method for producing an α-olefin copolymer, wherein (a) an α-olefin and (b) a (meth)acrylic acid ester monomer, vinyl monomer or allyl monomer are copolymerized in the presence of the catalyst for polymerization defined by [3-8] or [3-9].

[3-12] The method for producing the α-olefin polymer according to [3-10] or the method for producing the α-olefin copolymer according to [3-11], wherein the (a) α-olefin is propylene.

Advantageous Effects of Invention

By the present disclosure, an α-olefin homopolymer with a higher molecular weight can be obtained by higher polymerization activity than ever before; moreover, copolymerization of α-olefin and a polar group-containing monomer by excellent polymerization activity, can be achieved.

BRIEF DESCRIPTION OF DRAWING

FIG. 1 is an ORTEP diagram of complex (B-350)NiPh (PEt$_3$).

DESCRIPTION OAF EMBODIMENTS

1. First Embodiment

In the first embodiment of the present disclosure, there are provided a reaction product obtainable by contacting a compound represented by a general formula [I] or [II] with a transition metal compound containing a transition metal belonging to 9th, 10th or 11th group in the periodic table such as nickel, palladium, cobalt, copper or rhodium, that is, a metal complex represented by a general formula [III] (hereinafter may be referred to as metal complex [III]), and also provided a method using the reaction product as a catalyst component, that is, a method for producing a polymer or copolymer of (a) α-olefin and a method for producing a copolymer of (a) α-olefin and (b) (meth)acrylic acid ester monomer, vinyl monomer or allyl monomer, both in the presence of the metal complex as a catalyst component.

In the present disclosure, "polymerization" collectively means homopolymerization of one kind of monomer and copolymerization of plural kinds of monomers, and both cases are simply described as "polymerization" especially when both cases need not to be distinguished. Also in the present disclosure, "(meth)acrylic acid ester" encompasses both acrylic ester and methacrylic ester.

1-1. Metal Complex

The metal complex of the first embodiment of the present disclosure is obtainable by contacting a compound represented by the following general formula [I] or [II] with a transition metal compound containing a transition metal belonging to 9th, 10th or 11th group in the periodic table:

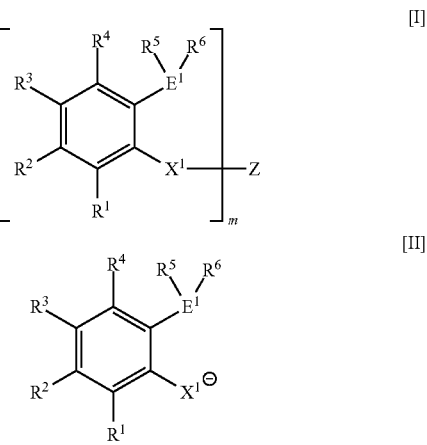

In the present disclosure, "contact" means that compounds represented by the general formulae [I] and [II] (hereinafter, they may be collectively referred to as phosphorus phenolate compounds) and the transition metal compound are present very closely to each other so that $E^1$ in the general formula [I] or [II] can form a coordination bond with the transition metal, and/or $X^1$ in the general formulae can form a single bond with the transition metal. Also, contacting the phosphorus phenolate compounds with the transition metal compound means that these compounds are mixed so that these compounds are present very closely to each other and can form at least one of the two kinds of bonds.

The condition for mixing the phosphorus phenolate compound and the transition metal compound is not particularly limited. These compounds may be directly mixed or mixed with the use of a solvent. Especially from the viewpoint of achieving uniform mixing, a solvent is preferably used.

In the metal complex thus obtained, the phosphorus phenolate compound becomes a ligand. Therefore, the reaction between the phosphorus phenolate compound and the transition metal compound is generally a ligand exchange reaction. When the metal complex thus obtained is thermodynamically more stable than the transition metal compound, the ligand exchange reaction proceeds by mixing the phosphorus phenolate compound and the transition metal compound at room temperature (15° C. to 30° C.). On the other hand, when the metal complex thus obtained is thermodynamically less stable than the transition metal compound, it is preferable to appropriately heat the mixture so that the ligand exchange reaction occurs sufficiently.

It is estimated that the metal complex obtainable by contacting the compound represented by the general formula [I] or [II] with the transition metal compound containing the transition metal belonging to 9th, 10th or 11th group in the periodic table, has the structure represented by the below-described general formula [III].

However, when the phosphorus phenolate compound is contacted with the transition metal compound containing the transition metal belonging to 9th, 10th or 11th group in the periodic table, there is a possibility that a metal complex having a structure other than the structure represented by the general formula [III] may produce since the compound represented by the general formula [I] or [II] is a bidentate ligand. For example, there may be a case where only $X^1$ in the general formula [I] or [II] forms a bond with the transition metal, or a case where only $E^1$ in the formulae may form a bond with the transition metal. The metal complex represented by the general formula [III] is a 1:1 reaction product of the phosphorus phenolate compound and the transition metal compound. Depending on the type of the transition metal, there may be a case where a reaction product with a different composition ratio is obtained. For example, there may be a case where one or more molecules of phosphorus phenolate compound forms a complex with one transition metal, or there may be a case where one molecule of phosphorus phenolate compound reacts with two or more transition metals to synthesize a polynuclear complex.

In the present disclosure, it is not denied that the metal complex having a structure other than the structure represented by the general formula [III] can be used for the production of, as with the metal complex represented by the general formula [III], an α-olefin (co)polymer.

Hereinafter, $R^1$ to $R^6$, $E^1$ and $X^1$ in the general formulae [I] and [II] and Z and m in the general formula [I] will be described.

$R^1$, $R^2$, $R^3$ and $R^4$ each independently represent (i) hydrogen, (ii) a halogen, (iii) a specific group optionally having one selected from the group consisting of a heteroatom and a group containing a heteroatom, or (iv) a heteroatom-containing substituent group.

As the (ii) halogen, examples include fluorine atom, chlorine atom, bromine atom and iodine atom. Of them, fluorine atom is preferred.

As the heteroatom used in the (iii), examples include oxygen, nitrogen, phosphorus, sulfur, selenium, silicon, halogen and boron. Of these heteroatoms, fluorine and chlorine are preferred.

As the "groups containing a heteroatom" used in the (iii), in particular, there may be mentioned groups similar to the (iv) heteroatom-containing substituent group described below. As the "groups containing a heteroatom", alkoxy group ($OR^9$), ester group ($CO_2R^9$) and the like are provided. $R^9$ is as described below.

For the (iii), the total number of carbon atoms of the substituent groups corresponding to $R^1$ to $R^4$, is preferably from 1 to 30, more preferably from 2 to 25, and still more preferably from 4 to 20.

In light of the above, the (iii) "specific group optionally having one selected from the group consisting of a heteroatom and a group containing a heteroatom" means (iii-A) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, and an alkylaryl group having 7 to 30 carbon atoms, (iii-B) a group in which one or two or more of the heteroatoms are bound to each of the groups in the (iii-A) by substitution, (iii-C) group in which one or two or more of the above-mentioned "groups containing a heteroatom" are bound to each of the groups in the (iii A) by substitution, and (iii-D) a group in which one or two or more of the above-mentioned heteroatoms and one or two or more of the above-mentioned "groups containing a heteroatom" are bound to each of the groups in the (iii-A) by substitution. For the (iii-C), examples include an alkyl group to which an alkoxy group is bound by substitution, and an aryl group to which an ester group is bound by substitution, and the like.

In particular, the (iv) heteroatom-containing substituent group means $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ and an epoxy-containing group. $R^8$ represents hydrogen or a hydrocarbon group having 1 to 20 carbon atoms. $R^9$ represents a hydrocarbon group having 1 to 20 carbon atoms. M' represents an alkali metal, an alkaline earth metal, ammonium, quaternary ammonium or phosphonium. Also, x represents an integer of from 0 to 3, and y represents an integer of from 0 to 2.

A plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur. In this case, the number of ring members is 5 to 8, and the ring optionally has a substituent group thereon.

A plurality of groups contained in $R^1$ may bind to each other to form a ring on $R^1$. The same applies even when any of $R^2$, $R^3$ and $R^4$ contains a plurality of groups.

It is preferable that $R^1$, $R^2$, $R^3$ and $R^4$ each independently represent (i) hydrogen atom; (ii) fluorine atom, chlorine atom, bromine atom; (iii) methyl group, ethyl group, isopropyl group, butyl group, phenyl group, trifluoromethyl group, pentafluorophenyl group, carbazolyl group, naphthyl group, anthracenyl group; (iv) methoxy group, ethoxy group, phenoxy group, nitrile group, trimethylsilyl group, triethylsilyl group, dimethylphenylsilyl group, trimethoxysilyl group, triethoxysilyl group, trimethylsilyloxy group, trimethoxysiloxy group, cyclohexylamino group, sodium sulfonate, potassium sulfonate, sodium phosphate, potassium phosphate, etc.

Especially for $R^1$, preferred are (i) hydrogen atom; (iii) t-butyl group, pentafluorophenyl group, carbazolyl group; (iv) methoxy group, trimethylsilyl group, trimethylsilyloxy group, cyclohexylamino group, etc. For $R^3$, preferred are (i) hydrogen atom or (iii) t-butyl group, etc.

$R^5$ and $R^6$ each independently represent a linear alkyl group having 7 to 30 carbon atoms, a branched acyclic alkyl group having 7 to 30 carbon atoms, an alkenyl group having 7 to 30 carbon atoms, a cycloalkyl group having 7 to 30 carbon atoms and optionally having a side chain, or an arylalkyl group having 7 to 30 carbon atoms, each of the groups optionally having one selected from the group consisting of a heteroatom and a group containing a heteroatom. $R^5$ and $R^6$ may bind to each other to form a ring.

For each, of the linear alkyl group, the branched acyclic alkyl group, the alkenyl group, the cycloalkyl group optionally having a side chain, and the arylalkyl group, the number of carbon atoms is preferably from 7 to 25, more preferably from 8 to 20, and still more preferably from 10 to 15.

$R^5$ and $R^6$ are located in the neighborhood of the metal M and affects M with steric and/or electronic interaction. To have such effect, $R^5$ and $R^6$ are preferably bulky.

Preferred specific examples of $R^5$ and $R^6$ include 5-tricyclo[3.3.1.1$^{3,7}$]deca-1-yl group (1-adamantyl group), 5-methyl-2-(propane-2-yl)cyclohexyl group (menthyl group), 2,6-dimethylheptane-4-yl group, 2,4-dimethylpentane-3-yl group, bicyclo-[2.2.1]-hepta-2-yl group, 2,4-phenylpentane-3-yl group, cycloheptyl group, 2-heptyl group and the like. Of them, 1-adamantyl group and menthyl group are more preferred.

As the heteroatom used as $R^5$ and $R^6$, examples include oxygen, nitrogen, phosphorus, sulfur, selenium, silicon, halogen and boron. Of these heteroatoms, fluorine and chlorine are preferable. Also, groups containing these heteroatoms include: oxygen-containing groups including alkoxy group, aryloxy group, acyl group and ester group; nitrogen-containing groups including amino group and amide group; sulfur-containing groups including thioalkoxy group and thioaryloxy group; phosphorus-containing substituent groups including phosphino group; selenium-containing groups including selenyl group; silicon-containing groups including trialkylsilyl group, dialkylarylsilyl group and alkyldiarylsilyl group; fluorine-containing groups including fluoroalkyl group and fluoroaryl group; and boron-containing groups including alkylboron group and arylboron group. Of these heteroatom-containing groups, alkoxy group or aryloxy group is most preferable.

As the heteroatom contained in the aforementioned heteroatom-containing group, one capable of coordinating to a transition metal is preferable. Specific examples of the heteroatom-containing group containing such a heteroatom that is capable of coordinating to a transition metal, include the following groups.

That is, there may be mentioned oxygen-containing groups including alkoxy groups such as methoxy group, ethoxy group, n-propoxy group, isopropoxy group, n-butoxy group and t-butoxy group, aryloxy groups such as phenoxy group, p-methylphenoxy group and p-methoxyphenoxy group, acyl groups such as acetyl group and benzoyl group, and ester groups such as acetoxy group, carboxyethyl group, carboxy t-butyl group and carboxyphenyl group; nitrogen-containing groups including dialkylamino groups such as dimethylamino group, diethylamino group, di-n-propylamino group and cyclohexylamino group; sulfur-containing groups including thioalkoxy groups such as thiomethoxy group, thioethoxy group, thio-n-propoxy group, thioisopropoxy group, thio-n-butoxy group, thio-t-butoxy group and thiophenoxy group, and thioaryloxy groups such as p-methylthiophenoxy group and p-methoxythiophenoxy group; phosphorus-containing substituent groups including dialkylphosphino groups such as dimethylphosphino group, diethylphosphino group, di-n-propylphosphino group and cyclohexylphosphino group; and selenium-containing groups including selenyl groups such as methylselenyl group, ethylselenyl group, n-propylselenyl group, n-butylselenyl group, t-butylselenyl group and phenylselenyl group.

$E^1$ represents phosphorus, arsenic or antimony. Of them, $E^1$ is preferably phosphorus.

$X^1$ represents oxygen or sulfur. Of them, $X^3$ is preferably oxygen.

Z represents hydrogen or leaving group. Specific examples of Z include hydrogen atom, $R^9SO_2$ group (where $R^9$ is as aforementioned), $CF_3SO_2$ group and the like.

Also, m represents the valence of Z.

The general formula [II] is shown in the form of anion. As the countercation thereof, any cation can be used, so long as the cation does not inhibit the reaction with the transition metal compound of the present disclosure. Specific examples of the countercation include ammonium, quaternary ammonium or phosphonium, and metal ions of 1st to 14th groups of the periodic table. Of these cations, $NH_4^+$, $R^9_4N^+$ (where $R^9$ is as aforementioned, and four $R^9$s may be the same as or different from each other (the same shall apply hereinafter)), $R^9_4P^+$, $Li^+$, $Na^+$, $Mg^{2+}$, $Ca^{2+}$ and $Al^{3+}$ are preferable, and $R^9_4N^+$, $Li^+$, $Na^+$ and $K^+$ are more preferable.

The following Table 1-1 shows specific combinations of the substituent groups in the general formulae [I] and [II] of the present disclosure, etc. Z and m relate to the general formula [I] only. However, specific examples are not limited to the following examples.

TABLE 1-1

| Compound No. | Phenol o-position R1 | R2 | Phenol p-position R3 | R4 | Substituent groups on E1 R5 |
|---|---|---|---|---|---|
| 1 | C6F5 | hydrogen | hydrogen | hydrogen | 5-tricyclo[3.3.1.1(3,7)]dec-1-yl |
| 2 | C6F5 | hydrogen | hydrogen | hydrogen | 5-methyl-2-(propan-2-yl)cyclohexyl |
| 3 | C6F5 | hydrogen | hydrogen | hydrogen | 2,6-dimetylheptan-4-yl |
| 4 | C6F5 | hydrogen | hydrogen | hydrogen | 2,4-dimetylpentan-3-yl |
| 5 | C6F5 | hydrogen | hydrogen | hydrogen | 2,4-phenylpentan-3-yl |
| 6 | hydrogen | hydrogen | hydrogen | hydrogen | bicyclo[2,2,1]hept-2-yl |
| 7 | t-butyl | hydrogen | hydrogen | hydrogen | bicyclo[2,2,1]hept-2-yl |
| 8 | C6F5 | hydrogen | hydrogen | hydrogen | bicyclo[2,2,1]hept-2-yl |
| 9 | carbazolyl | hydrogen | hydrogen | hydrogen | bicyclo[2,2,1]hept-2-yl |
| 10 | SiMe3 | hydrogen | hydrogen | hydrogen | bicyclo[2,2,1]hept-2-yl |
| 11 | OMe | hydrogen | hydrogen | hydrogen | bicyclo[2,2,1]hept-2-yl |
| 12 | OSiMe3 | hydrogen | hydrogen | hydrogen | bicyclo[2,2,1]hept-2-yl |
| 13 | NHC6H11 | hydrogen | hydrogen | hydrogen | bicyclo[2.2.1]hept-2-yl |
| 14 | hydrogen | hydrogen | t-butyl | hydrogen | bicyclo[2.2.1]hept-2-yl |
| 15 | hydrogen | hydrogen | hydrogen | hydrogen | 5-tricyclo[3.3.1.1(3,7)]dec-1-yl |
| 16 | hydrogen | hydrogen | hydrogen | hydrogen | 5-methyl-2-(propan-2-yl)cyclohexyl |
| 17 | hydrogen | hydrogen | hydrogen | hydrogen | 2,6-dimetylheptan-4-yl |
| 18 | hydrogen | hydrogen | hydrogen | hydrogen | 2,4-dimetylpentan-3-yl |
| 19 | hydrogen | hydrogen | hydrogen | hydrogen | 2,4-phenylpentan-3-yl |
| 20 | hydrogen | hydrogen | hydrogen | hydrogen | bicyclo[2,2,1]hept-2-yl |
| 21 | hydrogen | hydrogen | hydrogen | hydrogen | cycloheptyl |
| 22 | hydrogen | hydrogen | hydrogen | hydrogen | 2-heptyl |

TABLE 1-1-continued

| Compound No. | R6 | Substituent groups on E1 | | | |
|---|---|---|---|---|---|
| 23 | t-butyl | hydrogen | hydrogen | hydrogen | 5-methyl-2-(propan-2-yl)cyclohexyl |
| 24 | SiMe3 | hydrogen | hydrogen | hydrogen | 5-methyl-2-(propan-2-yl)cyclohexyl |
| 25 | t-butyl | hydrogen | hydrogen | hydrogen | 5-tricyclo[3.3.1.1(3,7)]dec-1-yl |

| Compound No. | R6 | E1 | X1 | Z | m |
|---|---|---|---|---|---|
| 1 | 5-tricyclo[3.3.1.1(3,7)]dec-1-yl | phosphorous | oxygen | hydrogen | 1 |
| 2 | 5-methyl-2-(propan-2-yl)cyclohexyl | phosphorous | oxygen | hydrogen | 1 |
| 3 | 2,6-dimetylheptan-4-yl | phosphorous | oxygen | hydrogen | 1 |
| 4 | 2,4-dimetylpentan-3-yl | phosphorous | oxygen | hydrogen | 1 |
| 5 | 2,4-phenylpentan-3-yl | phosphorous | oxygen | hydrogen | 1 |
| 6 | bicyclo[2,2,1]hept-2-yl | phosphorous | oxygen | hydrogen | 1 |
| 7 | bicyclo[2,2,1]hept-2-yl | phosphorous | oxygen | hydrogen | 1 |
| 8 | bicyclo[2,2,1]hept-2-yl | phosphorous | oxygen | hydrogen | 1 |
| 9 | bicyclo[2,2,1]hept-2-yl | phosphorous | oxygen | hydrogen | 1 |
| 10 | bicyclo[2,2,1]hept-2-yl | phosphorous | oxygen | hydrogen | 1 |
| 11 | bicyclo[2,2,1]hept-2-yl | phosphorous | oxygen | hydrogen | 1 |
| 12 | bicyclo[2,2,1]hept-2-yl | phosphorous | oxygen | hydrogen | 1 |
| 13 | bicyclo[2,2,1]hept-2-yl | phosphorous | oxygen | hydrogen | 1 |
| 14 | bicyclo[2,2,1]hept-2-yl | phosphorous | oxygen | hydrogen | 1 |
| 15 | 5-tricyclo[3.3.1.1(3,7)]dec-1-yl | phosphorous | oxygen | hydrogen | 1 |
| 16 | 5-methyl-2-(propan-2-yl)cyclohexyl | phosphorous | oxygen | hydrogen | 1 |
| 17 | 2,6-dimetylheptan-4-yl | phosphorous | oxygen | hydrogen | 1 |
| 18 | 2,4-dimetylpentan-3-yl | phosphorous | oxygen | hydrogen | 1 |
| 19 | 2,4-phenylpentan-3-yl | phosphorous | oxygen | hydrogen | 1 |
| 20 | 5-tricyclo[3.3.1.1(3,7)]dec-1-yl | phosphorous | oxygen | hydrogen | 1 |
| 21 | cycloheptyl | phosphorous | oxygen | hydrogen | 1 |
| 22 | 2-heptyl | phosphorous | oxygen | hydrogen | 1 |
| 23 | 5-methyl-2-(propan-2-yl)cyclohexyl | phosphorous | oxygen | hydrogen | 1 |
| 24 | 5-methyl-2-(propan-2-yl)cyclohexyl | phosphorous | oxygen | hydrogen | 1 |
| 25 | 5-tricyclo[3.3.1.1(3,7)]dec-1-yl | phosphorous | oxygen | hydrogen | 1 |

For understanding the structures of the compounds, the structural formula and name of the compound 1 listed in the above Table 1-1 are shown. The compound represented by the structural formula will be referred to as 2-diadamantylphosphanyl-6-pentafluorophenylphenol.

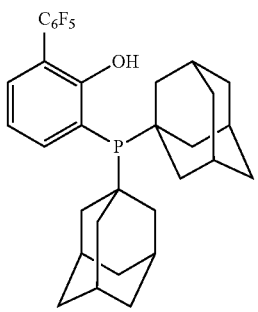

The compounds represented by the general formulae [I] and [II] can be synthesized by a known synthesis method.

The metal complex of the present disclosure represented by the following general formula [III] is included in the reaction product between the compound represented by the general formula [I] or [II] and the transition metal compound containing the transition metal belonging to 9th, 10th or 11th group in the periodic table. However, as described above, the structure of the metal complex obtained by the production method is not limited to the structure represented by the general formula [III].

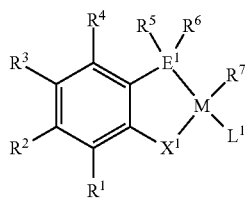

In the general formula [III], $R^1$ to $R^6$, $E^1$ and $X^1$ are as described above. As just described, there are similarities between the complex structure of the metal complex in the reaction product and that of the metal complex represented by the general formula [III], in terms of the main skeleton containing a benzene ring and these substituent groups ($R^1$ to $R^6$, $E^1$ and $X^1$).

Hereinafter, M, $R^7$ and $L^1$ in the general formula [III] will be described.

In the present disclosure, M is a transition metal belonging to 9th, 10th or 11th group in the periodic table. M is preferably nickel, palladium and platinum in 10th group, cobalt and rhodium in 9th group, and copper in 11th group, more preferably nickel, palladium and platinum in 10th group, and most preferably nickel or palladium in 10th group.

The valence of M is preferably divalent. The valence of M means a formal oxidation number used in the organometallic chemistry. That is, when an electron pair in a bond in which certain elements are involved is assigned to an element having greater electronegativity, valence means a number of charge remaining on an atom of the element. For example, in the general formula [III] of the present disclosure, when $E^1$ is phosphorus; $X^1$ is oxygen; M is nickel; $R^7$ is phenyl group; $L^1$ is triethylphosphine; and nickel forms bonds with phosphorus, oxygen, carbon of the phenyl group and phosphorus of triethylphosphine, the formal oxidation number of nickel, that is, the valence of nickel becomes divalent. The reason is as follows: according to the above-described definition, in these bonds, electron pairs are assigned to two phosphori, oxygen and carbon which have greater electro-negativity than nickel, and charge becomes 0 for phosphorus, −1 for oxygen, and −1 for phenyl group, and the complex is electrically neutral as a whole; therefore, charge remaining on nickel becomes +2.

As a divalent transition metal, for example, nickel (II), palladium (II), platinum (II), and cobalt (II) are preferable. As a transition metal other than divalent one, copper (I) or rhodium (III) is also preferable.

In the present disclosure, $R^7$ represents a hydrogen atom or a hydrocarbon group having 1 to 20 carbon atoms and optionally having one selected from the group consisting of a heteroatom and a group containing a heteroatom. Polymerization or copolymerization in the present disclosure is considered to be initiated by inserting the component (a) or component (b) of the present disclosure into the bond of M and $R^7$. Therefore, when the number of carbon atoms of $R^7$ is excessively large, this initiation reaction tends to be inhibited. For this reason, the number of carbon atoms of $R^7$ excluding carbon atoms contained in substituent group, is preferably from 1 to 16, and more preferably from 1 to 10.

Specific examples of $R^7$ include hydride group, methyl group, ethyl group, n-propyl group, isopropyl group, n-butyl group, isobutyl group, n-hexyl group, n-octyl group, n-decyl group, n-dodecyl group, cyclopentyl group, cyclohexyl group, benzyl group, phenyl group, p-methylphenyl group, trimethylsilyl group, triethylsilyl group, triphenylsilyl group and the like.

In the present disclosure, $L^1$ represents a ligand coordinated to M. The ligand $L^1$ in the present disclosure is a hydrocarbon compound having 1 to 20 carbon atoms and having oxygen, nitrogen or sulfur as an atom capable of forming a coordination bond. Also, as $L^1$, a hydrocarbon compound having a carbon-carbon unsaturated bond (and optionally containing a heteroatom) capable of forming a coordination bond with a transition metal, can be used. The number of carbon atoms of $L^1$ is preferably from 1 to 16, and more preferably from 1 to 10. Also, as $L^1$ forming a coordination bond with M in the general formula [III], a compound having no charge is preferable.

In the present disclosure, preferred as $L^1$ are cyclic unsaturated hydrocarbons, phosphines, pyridines, piperidines, alkylethers, arylethers, alkylarylethers, cyclic ethers, alkylnitrile derivative, arylnitrile derivative, alcohols, amides, aliphatic esters, aromatic esters, amines and the like. More preferred as $L^1$ are cyclic olefins, phosphines, pyridines, cyclic ethers, aliphatic esters, aromatic esters and the like. Particularly preferred as $L^1$ are trialkylphosphine, pyridine, lutidine (dimethylpyridine), picoline (methylpyridine) and $R^9CO_2R^8$ (definitions of $R^8$ and $R^9$ are as described above).

$R^7$ and $L^1$ may bind to each other to form a ring. Such an example is cycloocta-1-enyl group, and this group is also a preferable embodiment in the present disclosure.

The following Table 1-2 shows specific combinations of the substituent groups in the general formula [III] in the present disclosure. However, specific examples are not limited to the following examples.

TABLE 1-2

| Complex No. | Phenol o-position R1 | R2 | Phenol p-position R3 | R4 | Substituent groups on E1 R5 |
|---|---|---|---|---|---|
| 1a | C6F5 | hydrogen | hydrogen | hydrogen | 5-tricyclo[3.3.1.1(3,7)]dec-1-yl |
| 1b | C6F5 | hydrogen | hydrogen | hydrogen | 5-tricyclo[3.3.1.1(3,7)]dec-1-yl |
| 2 | C6F5 | hydrogen | hydrogen | hydrogen | 5-methyl-2-(propan-2-yl)cyclohexyl |
| 3 | C6F5 | hydrogen | hydrogen | hydrogen | 2,6-dimetylheptan-4-yl |
| 4 | C6F5 | hydrogen | hydrogen | hydrogen | 2,4-dimetylpentan-3-yl |
| 5 | C6F5 | hydrogen | hydrogen | hydrogen | 2,4-phenylpentan-3-yl |
| 6 | hydrogen | hydrogen | hydrogen | hydrogen | bicyclo[2.2.1]hept-2-yl |
| 7 | t-butyl | hydrogen | hydrogen | hydrogen | bicyclo[2.2.1]hept-2-yl |
| 8 | C6F5 | hydrogen | hydrogen | hydrogen | bicyclo[2.2.1]hept-2-yl |
| 9 | carbazolyl | hydrogen | hydrogen | hydrogen | bicyclo[2.2.1]hept-2-yl |
| 10 | SiMe3 | hydrogen | hydrogen | hydrogen | bicyclo[2.2.1]hept-2-yl |
| 11 | OMe | hydrogen | hydrogen | hydrogen | bicyclo[2.2.1]hept-2-yl |
| 12 | OSiMe3 | hydrogen | hydrogen | hydrogen | bicyclo[2.2.1]hept-2-yl |
| 13 | NHC6H11 | hydrogen | hydrogen | hydrogen | bicyclo[2.2.1]hept-2-yl |
| 14 | hydrogen | hydrogen | t-butyl | hydrogen | bicyclo[2.2.1]hept-2-yl |
| 15 | hydrogen | hydrogen | hydrogen | hydrogen | 5-tricyclo[3.3.1.1(3,7)]dec-1-yl |
| 16 | hydrogen | hydrogen | hydrogen | hydrogen | 5-methyl-2-(propan-2-yl)cyclohexyl |
| 17 | hydrogen | hydrogen | hydrogen | hydrogen | 2,6-dimetylheptan-4-yl |
| 18 | hydrogen | hydrogen | hydrogen | hydrogen | 2,4-dimetylpentan-3-yl |
| 19 | hydrogen | hydrogen | hydrogen | hydrogen | 2,4-phenylpentan-3-yl |
| 20 | hydrogen | hydrogen | hydrogen | hydrogen | bicyclo[2.2.1]hept-2-yl |
| 21 | hydrogen | hydrogen | hydrogen | hydrogen | cycloheptyl |
| 22 | hydrogen | hydrogen | hydrogen | hydrogen | 2-heptyl |
| 23 | t-butyl | hydrogen | hydrogen | hydrogen | 5-methyl-2-(propan-2-yl)cyclohexyl |
| 24 | SiMe3 | hydrogen | hydrogen | hydrogen | 5-methyl-2-(propan-2-yl)cyclohexyl |
| 25 | t-butyl | hydrogen | hydrogen | hydrogen | 5-tricyclo[3.3.1.1(3,7)]dec-1-yl |

| Complex No. | Substituent groups on E1 R6 | E1 | X1 | M | L1 | R7 |
|---|---|---|---|---|---|---|
| 1a | 5-tricyclo[3.3.1.1(3,7)]dec-1-yl | phosphorous | oxygen | nickel | 1,4,5-η-COE | |
| 1b | 5-tricyclo[3.3.1.1(3,7)]dec-1-yl | phosphorous | oxygen | nickel | PEt3 | C6H5 |
| 2 | 5-methyl-2-(propan-2-yl)cyclohexyl | phosphorous | oxygen | nickel | 1,4,5-η-COE | |
| 3 | 2,6-dimetylheptan-4-yl | phosphorous | oxygen | nickel | 1,4,5-η-COE | |
| 4 | 2,4-dimetylpentan-3-yl | phosphorous | oxygen | nickel | 1,4,5-η-COE | |
| 5 | 2,4-phenylpentan-3-yl | phosphorous | oxygen | nickel | 1,4,5-η-COE | |
| 6 | bicyclo[2.2.1]hept-2-yl | phosphorous | oxygen | nickel | 1,4,5-η-COE | |

TABLE 1-2-continued

| | | | | | | |
|---|---|---|---|---|---|---|
| 7 | bicyclo[2.2.1]hept-2-yl | phosphorous | oxygen | nickel | 1,4,5-η-COE |
| 8 | bicyclo[2.2.1]hept-2-yl | phosphorous | oxygen | nickel | 1,4,5-η-COE |
| 9 | bicyclo[2.2.1]hept-2-yl | phosphorous | oxygen | nickel | 1,4,5-η-COE |
| 10 | bicyclo[2.2.1]hept-2-yl | phosphorous | oxygen | nickel | 1,4,5-η-COE |
| 11 | bicyclo[2.2.1]hept-2-yl | phosphorous | oxygen | nickel | 1,4,5-η-COE |
| 12 | bicyclo[2.2.1]hept-2-yl | phosphorous | oxygen | nickel | 1,4,5-η-COE |
| 13 | bicyclo[2.2.1]hept-2-yl | phosphorous | oxygen | nickel | 1,4,5-η-COE |
| 14 | bicyclo[2.2.1]hept-2-yl | phosphorous | oxygen | nickel | 1,4,5-η-COE |
| 15 | 5-tricyclo[3.3.1.1(3,7)]dec-1-yl | phosphorous | oxygen | nickel | 1,4,5-η-COE |
| 16 | 5-methyl-2-(propan-2-yl)cyclohexyl | phosphorous | oxygen | nickel | 1,4,5-η-COE |
| 17 | 2,6-dimetylheptan-4-yl | phosphorous | oxygen | nickel | 1,4,5-η-COE |
| 18 | 2,4-dimetylpentan-3-yl | phosphorous | oxygen | nickel | 1,4,5-η-COE |
| 19 | 2,4-phenylpentan-3-yl | phosphorous | oxygen | nickel | 1,4,5-η-COE |
| 20 | 5-tricyclo[3.3.1.1(3,7)]dec-1-yl | phosphorous | oxygen | nickel | 1,4,5-η-COE |
| 21 | cycloheptyl | phosphorous | oxygen | nickel | 1,4,5-η-COE |
| 22 | 2-heptyl | phosphorous | oxygen | nickel | 1,4,5-η-COE |
| 23 | 5-methyl-2-(propan-2-yl)cyclohexyl | phosphorous | oxygen | nickel | 1,4,5-η-COE |
| 24 | 5-methyl-2-(propan-2-yl)cyclohexyl | phosphorous | oxygen | nickel | 1,4,5-η-COE |
| 25 | 5-tricyclo[3.3.1.1(3,7)]dec-1-yl | phosphorous | oxygen | nickel | 1,4,5-η-COE |

For understanding the structures of the metal complexes, the structural formula and name of the complex 1b listed in the above Table 1-2 are shown. The complex represented by the structural formula will be referred to as (2-diadamantylphosphanyl-6-pentafluorophenylphenolate)phenyl(triethylphosphine)nickel(II)

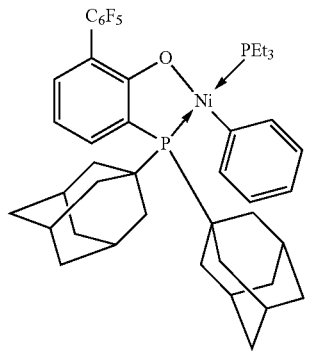

Also, compounds in which the central metal M of the compounds listed in Table 1-2 is changed from nickel to palladium, are exemplified.

As for the transition metal compound used in the present disclosure, those which are capable of being reacted with a compound represented by the general formula [I] or [II] to form a complex having polymerizing ability are used. They are sometimes referred to as precursor.

For example, as the transition metal compound containing nickel, bis(1,5-cyclooctadiene)nickel (0, i.e., zero), a complex represented by the general formula $Ni(CH_2CR^{13}CH_2)_2$ [where $R^{13}$ represents hydrogen atom, halogen atom, hydrocarbon group having 1 to 30 carbon atoms and optionally containing a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^8)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $P(O)(OR^8)_2M'$ or an epoxy-containing group, where $R^8$ represents a hydrocarbon group having 1 to 20 carbon atoms; $R^9$ represents a hydrogen atom or a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2)], bis(cyclopentadienyl)nickel (II), a complex represented by the general formula $Ni(CH_2SiR^{13}_3)_2L^1_2$ (where $R^{13}$ and $L^1$ are as aforementioned), a complex represented by the general formula $NiR^{13}_2L^1_2$ (where $R^{13}$ and $L^1$ are as aforementioned) or the like can be used.

Also, as the transition metal compound containing a transition metal belonging to 9th, 10th or 11th group, the general formula $MR^{13}_pL^1_q$ (where M represents a transition metal of 9th, 10th or 11th group; $R^1$ and $L^1$ are as described herein; and p and q are each an integer of 0 or more satisfying the valence of M) can be used.

Of these transition metal compounds, preferably used are nickel(0)bis(1,5-cyclooctadiene), $NiPhCl(PEt_3)_2$, NiPhCl $(PPh_3)_2$, a complex represented by the general formula $Ni(CH_2CR^{13}CH_2)_2$ (where $R^{13}$ is as aforementioned), a complex represented by the general formula $Ni(CH_2SiR^{13}_3)_2L^1_2$ (where $R^{13}$ and $L^1$ are as aforementioned), a complex represented by the general formula $NiR^{13}_2L^1_2$ (where $R^{13}$ and $L^1$ are as aforementioned), $Pd(dba)_2$, $Pd_2(dba)_3$, $Pd_3(dba)_4$ (where dba represents dibenzylideneacetone), $Pd(OCOCH_3)_2$ and (1,5-cyclooctadiene)Pd(methyl) (chloride).

Particularly preferred are nickel(0)bis(1,5-cyclooctadiene), $NiPhCl(PEt_3)_2$, $NiPhCl(PPh_3)_2$, $Ni(CH_2CHCH_2)_2$, $Ni(CH_2CMeCH_2)_2$, $Ni(CH_2SiMe_3)_2(Py)_2$ (hereinafter, Py represents pyridine), $Ni(CH_2SiMe_3)_2(Lut)_2$ (hereinafter, Lut represents 2,6-lutidine), $NiPh_2(Py)_2$, $NiPh_2(Lut)_2$, $Pd(dba)_2$, $Pd_2(dba)_3$, $Pd_3(dba)_4$ (where dba represents dibenzylideneacetone), $Pd(OCOCH_3)_2$, and (1,5-cyclooctadiene)Pd (methyl) (chloride).

The reaction product of the present disclosure can be obtained by contacting the aforementioned compound represented by the general formula [I] or [III] with the aforementioned transition metal compound [IV], for example, in a molar ratio of [I]+[II]:[IV]=[1:99] to [99:1], in an organic solvent such as toluene or benzene at 0° C. to 100° C. for 1 to 86400 seconds under reduced pressure to increased pressure. When a solution of bis(1,5-cyclooctadiene)nickel(0) $(Ni(COD)_2)$ in toluene or benzene is used as the transition metal compound, formation of the reaction product can be confirmed by change of color of the solution from yellow to, for example, red.

After the present reaction, a component which is constructing the transition metal compound but is other than the transition metal of the compound, is substituted by a part of the general formula [I] excluding Z or the compound represented by the general formula [II] to form the metal complex represented by the general formula [III] of the present disclosure. This substitution reaction preferably proceeds quantitatively; however, in some cases, it may proceed incompletely. After completion of the reaction, in addition to the complex represented by the general formula [III], other components derived from the general formulae [I] and [II] and the transition metal compound are present. These other components may be removed or left when the polymerization reaction or copolymerization reaction of the present disclosure is carried out. Generally, these other components are preferably removed because higher activity can be obtained.

When the reaction is carried out, $L^1$ of the present disclosure may exist together. When nickel or palladium is used as M of the present disclosure, the stability of the purified complex represented by the general formula [III] is sometimes improved by coexistence of $L^1$ having a nature of Lewis base in the system. In such a case, coexistence of $L^1$ is preferable, so long as $L^1$ does not inhibit the polymerization reaction or copolymerization reaction of the present disclosure.

In the present disclosure, the reaction may be carried out in a vessel other than the reactor which is used for polymerization of α-olefin or copolymerization of α-olefin and (meth)acrylate, in advance, and then the thus-obtained complex represented by the general formula [III] may be used for polymerization of α-olefin or copolymerization of α-olefin and (meth)acrylate, or the reaction may be carried out in the presence of these monomers. Also, the reaction may be carried out in the reactor which is used for polymerization of α-olefin or copolymerization of α-olefin and (meth)acrylate. In this case, these monomers may be present or absent. As each of the components represented by the general formulae [I] and [II], a single component may be used, or plural kinds of components may be used in combination. Especially, for the purpose of broadening molecular weight distribution or comonomer content distribution, such combined use of plural kinds of components is useful.

1-2. Method for Producing Metal Complex

In the production method of the first embodiment of the present disclosure, as described above, the metal complex represented by the general formula [III] can be produced by contacting the compound represented by the general formula [I] or [II] with the transition metal compound containing the transition metal belonging to 9th, 10th or 11th group in the periodic table.

1-3. Catalyst Component for Olefin Polymerization

The catalyst component for olefin polymerization according to the first embodiment of the present disclosure, comprises the aforementioned metal complex or a metal complex obtainable by the aforementioned production method.

In the first embodiment of the present disclosure, the metal complex represented by the general formula [III] can be used as a catalyst component for the polymerization or copolymerization. As aforementioned, the metal complex represented by the general formula [III] can be formed by reacting the general formula [I] or [II] with the transition metal complex component. When the metal complex represented by the general formula [III] is used as a catalyst component, isolated one may be used, or one supported on a carrier may be used. Such supporting may be carried out in a reactor which is used for polymerization of α-olefin or copolymerization of α-olefin and (meth)acrylate, in the presence or the absence of these monomers, or may be carried out in a vessel other than the reactor.

As a usable carrier, any carrier can be used so long as the carrier does not impair the scope of the present disclosure. Generally, inorganic oxides and polymer carriers can be suitably used. In particular, there may be mentioned $SiO_2$, $Al_2O_3$, MgO, $ZrO_2$, $TiO_2$, $B_2O_3$, CaO, ZnO, BaO, $ThO_2$ and the like, or a mixture thereof. Also, mixed oxides such as $SiO_2$—$Al_2O_3$, $SiO_2$—$V_2O_5$, $SiO_2$—$TiO_2$, $SiO_2$—MgO and $SiO_2$—$Cr_2O_3$ can be used, and inorganic silicates, polyethylene carrier, polypropylene carrier, polystyrene carrier, polyacrylic acid carrier, polymethacrylic acid carrier, polyacrylic acid ester carrier, polyester carrier, polyamide carrier, polyimide carrier, and the like can be used. As for these carriers, particle diameter, particle diameter distribution, pore volume, specific surface area and the like are not particularly limited, and any carrier can be used.

As the inorganic silicate, clay, clay mineral, zeolite, diatomaceous earth, and the like can be used. For these substances, synthetic material may be used, or naturally occurring mineral may be used. Specific examples of clay and clay mineral include allophane group such as allophane; kaoline group such as dickite, nacrite, kaolinite and anorthite; halloysite group such as metahalloysite and halloysite; serpentine group such as chrysotile, lizardite and artigorite; smectite such as montmorillonite, sauconite, beidellite, nontronite, saponite and hectorite; vermiculite minerals such as vermiculite; mica minerals such as illite, sericite and glauconite; attapulgite; sepiolite; palygorskite; bentnite; Kibushi clay; Gaerome clay; hisingerite; pyrophyllite; and chlorite group. These substances may form a mixed layer. Artificial compounds include synthetic mica, synthetic hectorite, synthetic saponite and synthetic taeniolite. Of these specific examples, preferred are kaoline group such as dickite, nacrite, kaolinite and anorchisite; halloysite group such as metahalloysite and halloysite; serpentine group such as chrysotile, lizardite and antigorite; smectite such as montmorillonite, zaukonite, beidellite, nontronite, saponite and hectorite; vermiculite minerals such as vermiculite; mica minerals such as illite, sericite and glauconite; synthetic mica; synthetic hectorite; synthetic saponite; and synthetic taeniolite. Particularly preferred are smectite such as montmorillonite, zaukonite, beidellite, nontronite, saponite and hectorite; vermiculite minerals such as vermiculite; synthetic mica; synthetic hectorite; synthetic saponite; and synthetic taeniolite.

These carriers may be used as they are, or may be subjected to acid treatment with hydrochloric acid, nitric acid, sulfuric acid or the like, and/or salts treatment with LiCl, NaCl, KCl, $CaCl_2$, $MgCl_2$, $Li_2SO_4$, $MgSO_4$, $ZnSO_4$, $Ti(SO_4)_2$, $Zr(SO_4)_2$, $Al_2(SO_4)_3$ or the like. The treatment may be carried out by mixing corresponding acid and base to form a salt in the reaction system. Also, shape control such as pulverization and granulation or drying treatment may be carried out.

1-4. Catalyst for Olefin Polymerization

The catalyst for olefin polymerization according to the first embodiment of the present disclosure comprises the following components (A) and (B) and, as needed, the following component (C):

the component (A): the aforementioned metal complex or a metal complex obtainable by the aforementioned production method the component (B): a compound reactive with the component (A) to form an ion pair, or an ion-exchange layered silicate the component (C) an organoaluminum compound.

The component (A) is the aforementioned metal complex or a metal complex obtainable by the aforementioned production method. One kind of metal complex may be used alone, or two or more kinds of metal complexes may be used in combination.

An example of the component (B) is an organoaluminum oxy compound. The organoaluminum oxy compound has an Al—O—Al bond in molecule, and the number of the bonds is in a range of generally from 1 to 100, and preferably from 1 to 50. Such an organoaluminum oxy compound is generally a product obtainable by reacting an organoaluminum compound with water.

The reaction of organoaluminum with water is generally carried out in inert hydrocarbon (solvent). As the inert hydrocarbon, aliphatic hydrocarbon, alicyclic hydrocarbon or aromatic hydrocarbon such as pentane, hexane, heptane, cyclohexane, methylcyclohexane, benzene, toluene and xylene, can be used. Aliphatic hydrocarbon or aromatic hydrocarbon is preferably used.

As the organoaluminum compound used for, preparation of the organoaluminum oxy compound, compounds represented by the following general formula are usable. Trialkylaluminum is preferably used.

$$(R^x)_t Al(X^3)_{(3-t)}$$

(where $R^x$ represents a hydrocarbon group such as alkyl group, alkenyl group, aryl group and aralkyl group each having 1 to 18 carbon atoms, preferably 1 to 12 carbon atoms; $X^3$ represents hydrogen atom or halogen atom; and t represents an integer of ($1 \leq t \leq 3$).)

The alkyl group in the trialkylaluminum may be any of methyl group, ethyl group, propyl group, isopropyl group, butyl group, isobutyl group, pentyl group, hexyl group, octyl group, decyl group, dodecyl group and the like. Preferred are methyl group and isobutyl group, and particularly preferred is methyl group. Two or more kinds of the organoaluminum compounds can be mixed and used.

The reaction ratio of the water and the organoaluminum compound (the molar ratio of water/Al) is preferably from 0.25/1 to 1.2/1, and particularly preferably from 0.5/1 to 1/1. The reaction temperature is generally in a range of from −70° C. to 100° C., and preferably from −20° C. to 20° C. The reaction time is generally selected in a range of from 5 minutes to 24 hours, and preferably from 10 minutes to 5 hours. As the water required for the reaction, not only simple water but also hydrated water contained in copper sulfate hydrate, aluminum sulfate hydrate or the like, and a component that can produce water in the reaction system, can be used.

Of the aforementioned organoaluminum oxy compounds, one that is obtainable by reaction of alkylaluminum and water is generally referred to as aluminoxane. Methylaluminoxane (including those substantially composed of methylaluminoxane (MAO)) is particularly preferred as the organoaluminum oxy compound. Dried methylaluminoxane (DMAO) in a solid form, which is obtained by removing a solvent out of a MAO solution, is also preferred.

As the organoaluminum oxy compound, two or more kinds of the aforementioned organoaluminum oxy compounds can be used in combination, or a solution of the organoaluminum oxy compound dissolved or dispersed in the aforementioned inert hydrocarbon solvent, may be used.

A specific example of the component (B) is ion-exchange layered silicate. The ion-exchange layered silicate (hereinafter may be simply referred to as "silicate") is a silicate compound having a crystal structure in which planes formed by ion bonding or the like are positioned in parallel to each other and stacked by binding force, and ions contained therein are exchangeable. As the silicate, various kinds of silicates are known, and the silicate is described in detail in "Nendo Kobutsu Caku", Haruo SHIROZU, Asakura Publishing Co., Ltd. (1995).

In the present disclosure, as the component (B), those belonging to the smectite group are preferably used. Specific examples thereof include montmorillonite, sauconite, beidellite, nontronite, saponite, hectorite, stevensite and the like. Of them, montmorillonite is preferred from the viewpoint of increasing the polymerization activity and molecular weight of the copolymer part.

Most silicates are mainly produced as a major component of natural cray minerals. Therefore, foreign substances (such as quartz and cristobalite) other than the ion-exchange layered silicate are often contained. Foreign substances may be contained in the silicate of the smectite group used in the present disclosure.

The silicate may be subjected to acid treatment and/or salts treatment. The treatment may be carried out by mixing corresponding acid and base to form a salt in the reaction system.

As the component (B), a mixture of the aforementioned organoaluminum oxy compound and the ion-exchange layered silicate may be used. Also, as the organoaluminum oxy compound and ion-exchange layered silicate, one kind of compound and silicate or two or more kinds of compounds and silicates may be used.

An examples of the organoaluminum compound used as the component (C) is represented by the following general formula:

$$Al(R^p)_a X_{(3-a)}$$

where $R^p$ represents a hydrocarbon group having 1 to 20 carbon atoms; X represents hydrogen, halogen, alkoxy group or siloxy group; and a is a number that is more than 0 and equal to or less than 3.

Specific examples of the organoaluminum compound represented by the general formula include trialkylaluminum such as trimethylaluminum, triethylaluminum, tripropylaluminum, triisobutylaluminum and the like, and halogen- or alkoxy-containing alkylaluminum such as diethylaluminum monochloride, diethylaluminum monomethoxide and the like.

Of them, triisobutylaluminum is preferred. Also, two or more kinds of the aforementioned organoaluminum compounds may be used in combination. Also, the aforementioned aluminum compound may be modified with alcohol, phenol or the like for use. As the modifiers, methanol, ethanol, 1-propanol, isopropanol, butanol, phenol, 2,6-dimethylphenol, 2,6-di-t-butylphenol and the like are exemplified. Preferred specific examples are 2,6-dimethylphenol and 2,6-di-t-butylphenol.

In the method for preparing the catalyst for olefin polymerization according to the first embodiment of the present disclosure, the method for contacting the component (A), the component (B) and, as needed, the component (C) is not particularly limited. For example, the following methods can be provided.

Method (i): The component (A) and the component (B) are contacted with each other, and then the component (C) is added.

Method (ii): The component (A) and the component (C) are contacted with each other, and then the component (B) is added.

Method (iii): The component (3) and the component (C) are contacted with each other, and then the component (A) is added.

Method (iv): The components (A), (B) and (C) are contacted with each other at the same time.

Also, each component may be used as a mixture by mixing it with different kinds of components or may be separately contacted in a different order. The contacting may be carried cut not only at the time of catalyst preparation, but also at the time of preliminary polymerization using olefin or at the time of polymerization of olefin.

Also, one component may be divided and contacted with each component, for example, in such a manner that the component (B) and the component (C) are contacted with each other, and then a mixture of the component (A) and the component (C) is added.

The contacting of the components (A), (B) and (C) is preferably carried out in an inert gas atmosphere such as nitrogen and the like and in an inert hydrocarbon solvent such as pentane, hexane, heptane, toluene, xylene and the like. The contacting may be carried out at a temperature between −20° C. and the boiling point of the solvent, and it is particularly preferably carried out at a temperature between room temperature and the boiling point of the solvent.

1-5. Method for Producing α-Olefin Polymer

An embodiment of the method for producing the α-olefin polymer of the first embodiment of the present disclosure, is polymerization or copolymerization of (a) an α-olefin in the presence of the catalyst for polymerization.

The component (a) in the present disclosure is α-olefin represented by the general formula $CH_2=CHR^{10}$. $R^{10}$ is hydrogen atom or hydrocarbon group having 1 to 20 carbon atoms, which may have branch, ring and/or unsaturated bond. When the number of carbon atoms of $R^{10}$ is larger than 20, polymerization activity tends to be less expressed. For this reason, of them, α-olefins in which $R^{10}$ is hydrogen atom or hydrocarbon, group having 1 to 1 carbon atoms, are preferred as the components (a).

Those more preferred as the component (a) include ethylene, propylene, 1-butene, 1-pentene, 1-hexene, 1-octene, 1-decene, 3-methyl-1-butene, 4-methyl-1-pentene, vinylcyclohexene and styrene. As the component (a), a single component may be used, or plural kinds of components may be used in combination.

Another embodiment of the method for producing the α-olefin polymer of the present disclosure is copolymerization of (a) an α-olefin and (b) a (meth)acrylic acid ester monomer, vinyl monomer or allyl monomer in the presence of the aforementioned catalyst for polymerization.

The (meth)acrylic acid ester monomer in the present disclosure is represented by the general formula $CH_2=C(R^{11})CO_2(R^{12})$. $R^{11}$ is hydrogen atom or hydrocarbon group having 1 to 10 carbon atoms, which may have branch, ring and/or unsaturated bond. $R^{12}$ is hydrocarbon group having 1 to carbon atoms, which may have branch, ring and/or unsaturated bond. Also, $R^{12}$ may contain a heteroatom at any position therein.

When the number of carbon atoms of $R^{11}$ is 11 or more, polymerization activity tends to be less expressed. Therefore, $R^{11}$ is hydrogen atom or hydrocarbon group having 1 to 10 carbon atoms, and preferable (meth)acrylic acid esters include one in which $R^{11}$ is hydrogen atom or hydrocarbon group having 1 to 5 carbon atoms. More preferable (meth) acrylic acid ester monomers include methacrylate in which $R^{11}$ is methyl group or acrylate in which $R^{11}$ is hydrogen atom. Similarly, when the number of carbon atoms of $R^{12}$ is larger than 30, polymerization activity tends to be less expressed. Therefore, the number of carbon atoms of $R^{12}$ is from 1 to 30, preferably from 1 to 12, and more preferably from 1 to 8.

Also, as the heteroatom optionally contained in $R^{12}$, oxygen, sulfur, selenium, phosphorus, nitrogen, silicon, fluorine, boron and the like are provided of these heteroatoms, oxygen, silicon and fluorine are preferable, and oxygen is more preferable. In addition, $R^{12}$ containing no heteroatom is also preferable.

Still more preferable (meth)acrylic acid ester monomers include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, hydroxyethyl (meth)acrylate, dimethylaminoethyl (meth)acrylate, diethylaminoethyl (meth)acrylate, (meth)acrylate-2-aminoethyl, (meth)acrylate-2-methoxyethyl, (meth)acrylate-3-methoxypropyl, glycidyl (meth)acrylate, ethyleneoxide (meth)acrylate, trifluoromethyl (meth)acrylate, 2-trifluoromethylethyl (meth)acrylate, perfluoroethyl (meth)acrylate, (meth)acrylamide, (meth)acryldimethylamide, 2-hydroxybutyl (meth)acrylate, 4-hydroxybutyl (meth)acrylate, and the like. A (meth)acrylic acid ester may be used alone, or a plurality of (meth)acrylic acid esters may be used in combination.

The vinyl monomer in the present disclosure is a vinyl monomer containing polar group, such as halogen-containing, nitrogen-containing, oxygen-containing and sulfur-containing vinyl monomers. In particular, it is a vinyl monomer containing halogen, hydroxyl group, amino group, nitro group, carboxyl group, formyl group, ester group, epoxy group, nitrile group or the like. Specific examples thereof include 5-hexene-1-ol, 2-methyl-3-butene-1-ol, ethyl 10-undecenoate, 10-undecene-1-ol, 12-tridecene-2-ol, 10-undecanoic acid, methyl-9-decenate, t-butyl-10-undecenate, 1,1-dimethyl-2-propene-1-ol, 9-decene-1-ol, 3-butenoic acid, 3-butene-1-ol, N-(3-butene-1-yl)phthalimide, 5-hexenoic acid, methyl 5-hexenoate, 5-hexene-2-one, acrylonitrile, methacrylonitrile, vinyl acetate, and the like. Of them, 3-butene-1-ol, ethyl 10-undecenoate and 10-undecene-1-ol are particularly preferred.

As the allyl monomer in the present disclosure, examples include an allyl monomer having 3 carbon atoms (propenyl monomer) and an allyl-based monomer which is an allyl group containing monomer having 4 or more carbon atoms. The allyl monomer is an allyl monomer containing polar group, such as halogen-containing, nitrogen-containing, oxygen-containing and sulfur-containing allyl monomers. In particular, it is an allyl monomer containing halogen, hydroxyl group, amino group, nitro group, carboxyl group, formyl group, ester group, epoxy group, nitrile group or the like. Preferred specific examples thereof include allyl acetate, allyl alcohol, allylamine, N-allylaniline, N-t-butoxycarbonyl-N-allylamine, N-benzyloxycarbonyl-N-allylamine, N-allyl-N-benzylamine, allyl chloride, allyl bromide, allyl ether, diallyl ether, and the like. Of, them, allyl acetate and allyl alcohol are more preferred, and allyl acetate, allyl ether and diallyl ether are still more preferred.

The polymerization reaction in the present disclosure is carried out in the presence or the absence of a liquid which may be: hydrocarbon solvent such as propane, n-butane, isobutane, n-hexane, n-heptane, toluene, xylene, cyclohexane, and methylcyclohexane; or a liquefied α-olefin; or a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol and ethylene glycol. Also, a mixture of liquid compounds described here may be used as a solvent. Furthermore, ionic liquid can also be used as a solvent. The above-described hydrocarbon solvent and ionic liquid are more preferable to obtain higher polymerization activity and high molecular weight.

In the present disclosure, the polymerization reaction can be carried out in the presence or the absence of known additive. As the additive, a polymerization inhibitor to inhibit radical polymerization and an additive having an action to stabilize produced copolymer are preferable. Examples of preferable additives include quinone derivative, hindered phenol derivative and the like. Specifically, hydroquinone monomethyl ether, 2,6-di-t-butyl-4-methylphenol (BHT), reaction product of trimethylaluminium and BHT, reaction product of titanium (IV) alkoxide and BHT, and the like can be used. Also, the polymerization may be carried out in the presence of inorganic and/or organic filler by using such filler as an additive. Also, $L^1$ relating to present disclosure or ionic liquid may be used as an additive.

Preferable additives in the present disclosure include Lewis base. By selecting appropriate Lewis base, activity, molecular weight and copolymerization reactivity of acrylate can be improved. The amount of Lewis base is from 0.0001 to 1000 equivalents, preferably from 0.1 to 100 equivalents, and more preferably from 0.3 to 30 equivalents, relative to the transition metal M in the catalyst component present in the polymerization system. The method for adding Lewis base to the polymerization system is not particularly limited, and any technique can be used. For example, Lewis base may be added by mixing with the catalyst component of the present disclosure, or may be added by mixing with the monomer, or may be added to the polymerization system independently from the catalyst component and monomer. Also, a plurality of Lewis bases may be used in combination. Also, the same Lewis base as $L^1$ relating to present disclosure may be used, or a different Lewis base may be used.

Lewis bases include aromatic amines, aliphatic amines, alkyl ethers, aryl ethers, alkyl aryl ethers, cyclic ethers, alkyl nitriles, aryl nitriles, alcohols, amides, aliphatic esters, aromatic esters, phosphates, phosphites, thiophenes, thianthrenes, thiazoles, oxazoles, morpholines, cyclic unsaturated hydrocarbons, and the like. Of them, preferred Lewis bases are aromatic amines, aliphatic amines, cyclic ethers, aliphatic esters and aromatic esters, and particularly preferred Lewis bases are pyridine derivative, pyrimidine derivative, piperidine derivative, imidazole derivative, aniline derivative, piperidine derivative, triazine derivative, pyrrole derivative and furan derivative.

Specific Lewis base compounds include pyridine, pentafluoropyridine, 2,6-lutidine, 2,4-lutidine, 3,5-lutidine, pyrimidine, N,N-dimethylaminopyridine, N-methylimidazole, 2,2'-bipyridine, aniline, piperidine, 1,3,5-triazine, tris(trifluoromethyl)-1,3,5-triazine, 2,4,6-tris(2-pyridyl)-s-triazine, quinoline, 8-methylquinoline, phenazine, 1,10-phenanthroline, N-methylpyrrole, 1,8-diazabicyclo-[5.4.0]-undeca-7-ene, 1,4-diazabicyclo-[2.2.2]-octane, triethylamine, benzonitrile, picoline, triphenylamine, N-methyl-2-pyrrolidone, 4-methylmorpholine, benzoxazole, benzothiazole, furan, 2,5-dimethylfuran, dibenzofuran, xanthene, 1,4-dioxane, 1,3,5-trioxane, dibenzothiophene, thianthrene, triphenylphosphonium cyclopentadienide, triphenylphosphite, triphenylphosphate, tripyrrolizinophosphine, tris(pyrrolizino)borane, and the like.

In the present disclosure, polymerization style is not particularly limited. Slurry polymerization in which at least a part of the produced polymer takes a form of slurry in a medium; bulk polymerization in which liquefied monomer itself is used as a medium; gas phase polymerization in which polymerization is carried out in a vaporized monomer; or high pressure ion polymerization in which at least a part of the produced polymer dissolves in a monomer liquefied at high temperature and high pressure; and the like are preferably used. Also, any type of batch polymerization, semi-batch polymerization and continuous polymerization may be used. Also, living polymerization or a polymerization occurring in conjunction with chain transfer may be carried out. Also, chain shuttling or coordinative chain transfer polymerization (CCTP) may be carried out by using so-called chain transfer agent (CSA) in combination.

Unreacted monomer and medium may be used by separating them from the produced copolymer and recycling them. In recycling, these monomer and medium may be reused with or without purification. For separation of the produced copolymer from unreacted monomer and medium, a hitherto known method can be used. For example, a method such as filtration, centrifugation, solvent extraction or reprecipitation with poor solvent can be used.

Polymerization temperature, polymerization pressure and polymerization time are not particularly limited. Generally, optimum setting can be done from the following ranges considering productivity and process capacity. That is, polymerization temperature can be selected from a range of generally from −20° C. to 290° C., and preferably from 0° C. to 250° C.; copolymerization pressure can be selected form a range of from 0.1 MPa to 300 MPa, and preferably from 0.3 MPa to 250 Mpa; and polymerization time can be selected from a range of from 0.1 minute to 10 hours, preferably from 0.5 minute to 7 hours, and more preferably from 1 minute to 6 hours.

In the present disclosure, polymerization is generally carried out under an inert gas atmosphere. For example, nitrogen atmosphere, argon atmosphere or carbon dioxide atmosphere can be used, and nitrogen atmosphere is preferably used. Commingling of a small amount of oxygen or air is allowable.

Supply of the catalyst and monomer to a polymerization reactor is also not particularly limited, and various supplying methods can be employed corresponding to each purpose. For example, in the case of batch polymerization, such a technique can be employed that a predetermined amount of monomer is supplied into a polymerization reactor in advance, followed by supplying the catalyst. In this case, additional monomer or additional catalyst may be supplied to the polymerization reactor. In the case of continuous polymerization, such a technique can be employed that predetermined amounts of monomer and catalyst are supplied to the polymerization reactor continuously or intermittently to carry out polymerization reaction continuously.

As for control of the composition of the copolymer, generally, such a method can be used that a plurality of monomers are supplied to the reactor, and a ratio of the supplied monomers is varied. In addition, a method in which the copolymerization composition is controlled by utilizing a difference in monomer reactivity ratios depending on difference in catalyst structures, and a method in which the copolymerization composition is controlled by utilizing polymerization temperature dependency of monomer reactivity ratio, are provided.

For controlling the molecular weight of the polymer, a hitherto known method can be used. That is, a method in which the molecular weight is controlled by controlling polymerization temperature, a method in which the molecular weight is controlled by controlling monomer concentrations, a method in which the molecular weight is controlled by using a chain transfer agent, a method in which the molecular weight is controlled by controlling ligand structure in the transition metal complex, and the like are provided. When a chain transfer agent is used, a hitherto known chain transfer agent can be used. For example, hydrogen, metalalkyl, and the like can be used.

Also, when the component (b) itself works as a kind of chain transfer agent, molecular weight adjustment is possible by controlling the ratio of the component (b) to the component (a) or controlling the concentration of the component (b). When molecular weight adjustment is carried out by controlling ligand structure in the transition metal complex, such a tendency can be utilized that molecular weight is generally improved by controlling the type, number and configuration of the heteroatom-containing groups in the aforementioned $R^2$ and $R^3$, by arranging a bulky substituent group around the metal M, or by introducing a heteroatom into the aforementioned $R^6$. An electron-donating group such as aryl group and heteroatom-containing substituent group is preferably arranged so that the electron-donating group can have an interaction to the metal M. It can be generally judged whether such an electron-donating group can have an interaction with the metal M or not, by measuring a distance between the electron-donating group and the metal M using a molecule model or molecular orbital calculation.

Especially, the copolymer obtained by the present disclosure expresses superior painting characteristic, printability, antistatic performance, inorganic filler dispersibility, adhesive property to other resins, compatibility with other resins, and the like, by the effect based on the polar group of the copolymer. Utilizing such properties, the copolymer of the present disclosure can be used for various applications. For example, the copolymer can be used for film, sheet, adhesive resin, hinder, compatibilizing agent, wax, and the like.

2. Second Embodiment

In the second embodiment of the present disclosure, there are, provided a reaction product obtainable by contacting a compound represented by a general formula [I] or [II] with a transition metal compound containing a transition metal belonging to 9th, 10th or 11th group in the periodic table such as nickel, palladium, cobalt, copper or rhodium, that is, a metal complex represented by a general formula (hereinafter may be referred to as metal complex [III]), and a method for producing a polymer or copolymer of (a) α-olefin and a method for producing a copolymer of (a) α-olefin and (b) (meth acrylic acid ester monomer, vinyl monomer or allyl monomer, both in the presence of the metal complex as a catalyst component.

In the present disclosure, "polymerization" collectively means homopolymerization of one kind of monomer and copolymerization of plural kinds of monomers, and both cases are simply described as "polymerization" especially when both cases need not to be distinguished. Also in the present disclosure, "(meth)acrylic acid ester" encompasses both acrylic ester and methacrylic ester.

2-1. Metal Complex

The metal complex of the second embodiment of the present disclosure is obtainable by contacting a compound represented by the following general formula [I] or [II] with a transition metal compound containing a transition metal belonging to 9th, 10th or 11th group in the periodic table:

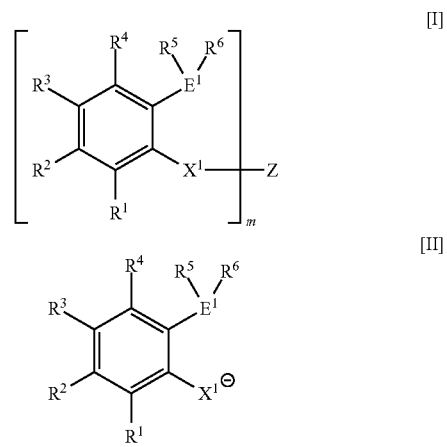

In the present disclosure, "contact" means that compounds represented by the general formulae [I] and [II] (hereinafter, they may be collectively referred to as phosphorus phenolate compound) and the transition metal compound are present very closely to each other so that $E^1$ in the general formula [I] or [II] can form a coordination bond with the transition metal, and/or $X^1$ in the general formulae can form a single bond with the transition metal. Also, contacting the phosphorus phenolate compound with the transition metal compound means that these compounds are mixed so that these compounds are present very closely to each other and can form at least one of the two kinds of bonds.

The condition for mixing the phosphorus phenolate compound and the transition metal compound is not particularly limited. These compounds may be directly mixed or mixed with the use of a solvent. Especially from the viewpoint of achieving uniform mixing, a solvent is preferably used.

In the metal complex thus obtained, the phosphorus phenolate compound becomes a ligand. Therefore, the reaction between the phosphorus phenolate compound and the transition metal compound is generally a ligand exchange reaction. When the metal complex thus obtained is thermodynamically more stable than the transition metal compound, the ligand exchange reaction proceeds by mixing the phosphorus phenolate compound and the transition metal compound at room temperature (15° C. to 30° C.). On the other hand, when the metal complex thus obtained is thermodynamically less stable than the transition metal compound, it is preferable to appropriately heat the mixture so that the ligand exchange reaction occurs sufficiently.

It is estimated that the metal complex obtainable by contacting the compound represented by the general formula [I] or [II] with the transition metal compound containing the transition metal belonging to 9th, 10th or 11th group in the periodic table, has the structure represented by the below-described general formula [III].

However, when the phosphorus phenolate compound is contacted with the transition metal compound containing the transition metal belonging to 9th, 10th or 11th group in the periodic table, there is a possibility that a metal complex having a structure other than the structure represented by the general formula [III] may produce since the compound represented by the general formula [I] or [II] is a bidentate ligand. For example, there may be a case where only $X^1$ in the general formula [I] or [II] forms a bond with the transition metal, or a case where only $E^1$ in the formulae may form a bond with the transition metal. The metal complex represented by the general formula [III] is a 1:1 reaction product of the phosphorus phenolate compound and the transition metal compound. Depending on the type of the transition metal, there may be a case where a reaction product with a different composition ratio is obtained. For example, there may be a case where one or more molecules of phosphorus phenolate compound forms a complex with one transition metal, or there may be a case where one molecule of phosphorus phenolate compound reacts with two or more transition metals to synthesize a polynuclear complex.

In the present disclosure, it is not denied that the metal complex having a structure other than the structure represented by the general formula [III] can be used for the production of, as with the metal complex represented by the general formula [III], an α-olefin (co)polymer.

Hereinafter, $R^1$ to $R^6$, $E^1$ and $X^1$ in the general formulae [I] and [II] and Z and m in the general formula will be described.

$R^2$, $R^3$ and $R^4$ each independently represent (i) hydrogen, (ii) a halogen, (iii) a specific group optionally having one selected from the group consisting of a heteroatom and a group containing a heteroatom, or (iv) a heteroatom-containing substituent group.

As the (ii) halogen, examples include fluorine atom, chlorine atom, bromine atom and iodine atom. Of them, fluorine atom is preferred.

As the heteroatom used in the (iii), examples include oxygen, nitrogen, phosphorus, sulfur, selenium, silicon, halogen and boron. Of these heteroatoms, fluorine and chlorine are preferred.

As the "groups containing a heteroatom" used in the (iii), in particular, there may be mentioned groups similar to the (iv) heteroatom-containing substituent group described below. As the "groups containing a heteroatom", alkoxy group ($OR^9$), ester group ($CO_2R^9$) and the like are provided. $R^9$ is as described below.

For the (iii), the total number of carbon atoms of the substituent groups corresponding to $R^2$ to $R^4$, is preferably from 1 to 30, more preferably from 2 to 25, and still more preferably 4 to 20.

In light of the above, the (iii) "specific group optionally having one selected from the group consisting of a heteroatom and a group containing a heteroatom" means (iii-A) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, and an alkylaryl group having 7 to 30 carbon atoms, (iii-B) a group in which one or two or more of the heteroatoms are bound to each of the groups in the (iii-A) by substitution, (iii-C) a group in which one or two or more of the above-mentioned "groups containing a heteroatom" are bound to each of the groups in the (iii-A) by substitution, and (iii-D) a group in which one or two or more of the above-mentioned heteroatoms and one or two or more of the above-mentioned "groups containing a heteroatom" are bound to each of the groups in the (iii-A) by substitution. For the (iii-C), examples include an alkyl group to which an alkoxy group is bound by substitution, and an aryl group to which an ester group is bound by substitution, and the like.

In particular, the (iv) heteroatom-containing substituent group means $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ and an epoxy-containing group. $R^8$ represents hydrogen or a hydrocarbon group having 1 to 20 carbon atoms. $R^9$ represents a hydrocarbon group having 1 to 20 carbon atoms. M' represents an alkali metal, an alkaline earth metal, ammonium, quaternary ammonium or phosphonium. Also, x represents an integer of from 0 to 3, and y represents an integer of from 0 to 2.

It is preferable that $R^2$, $R^3$ and $R^4$ each independently represent (i) hydrogen atom; (ii) fluorine atom, chlorine atom, bromine atom; (iii) methyl group, ethyl group, isopropyl group, butyl group, phenyl group, trifluoromethyl group, pentafluorophenyl group, naphthyl group, anthracenyl group; (iv) methoxy group, ethoxy group, phenoxy group, nitrile group, trimethylsilyl group, triethylsilyl group, dimethylphenylsilyl group, trimethoxysilyl group, triethoxysilyl group, trimethylsilyloxy group, trimethoxysiloxy group, cyclohexylamino group, sodium sulfonate, potassium sulfonate, sodium phosphate, potassium phosphate, etc.

Of them, particularly preferred are (i) hydrogen atom; (iii) t-butyl group, pentafluorophenyl group; (iv) methoxy group, trimethylsilyl group, trimethylsilyloxy group, cyclohexylamino group, etc. Especially, $R^2$ is preferably hydrogen or a linear alkyl group having 1 to 30 carbon atoms and having a substituent group containing a heteroatom, and $R^3$ is more preferably hydrogen.

$R^1$ represents (v) a specific group having one selected from the group consisting of a heteroatom and a group containing a heteroatom, or (vi) a heteroatom-containing substituent group.

In particular, the (v) specific group having one selected from the group consisting of a heteroatom and a group containing a heteroatom means a hydrocarbon group which is selected from the group consisting of a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, and an alkylaryl group having 7 to 30 carbon atoms, and to which a substituent group containing a heteroatom is bound by substitution. Of them, $R^1$ is preferably an aryl group having 6 to 30 carbon atoms and having one selected from the group consisting of a heteroatom and a group containing a heteroatom.

For each of the linear alkyl group, the branched acyclic alkyl group, the alkenyl group, the cycloalkyl group optionally having a side chain, the aryl group, the arylalkyl group and the alkylaryl group, the upper limit of the number of carbon atoms is preferably 25, more preferably 20, and still more preferably 15.

In particular, the (vi) heteroatom-containing substituent group represents $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ and an epoxy-containing group. $R^8$, $R^9$, M', x and y are the same as the case of the aforementioned $R^2$ to $R^4$. Of them, R' is preferably $Si(OR^8)_{3-x}(R^8)_x$.

As $R^1$, more preferred are (v) trifluoromethyl group, pentafluorophenyl group, carbazolyl group and (vi) methoxy group, ethoxy group, phenoxy group, nitrile group, trimethylsilyl group, triethylsilyl group, dimethylphenylsilyl group, trimethoxysilyl group, triethoxysilyl group, trimethylsilyloxy group, trimethoxysiloxy group, cyclohexylamino group, sodium sulfonate, potassium sulfonate, sodium phosphate, potassium phosphate, etc.

Of them, particularly preferred are (v) pentafluorophenyl group, carbazolyl group, and (vi) methoxy group, trimethylsilyl group, trimethylsilyloxy group, cyclohexylamino group, etc.

A plurality of groups appropriately selected from $R^1$, $R^2$, $R^3$ and $R^4$ optionally bind to each other to form an aliphatic ring, an aromatic ring, or a heterocyclic ring containing a heteroatom selected from the group consisting of oxygen, nitrogen and sulfur. In this case, the number of ring members is 5 to 2, and the ring optionally has a substituent group thereon.

A plurality of groups contained in $R^1$ may bind to each other to form a ring on $R^1$. The same applies even when any of $R^2$, $R^3$ and $R^4$ contains a plurality of groups.

$R^5$ and $R^6$ each independently represent a linear alkyl group having 1 to 6 carbon atoms, a branched acyclic alkyl group having 3 to 6 carbon atoms, or an alkenyl group having 2 to 6 carbon atoms, each of the groups optionally having one selected from the group consisting of a heteroatom and a group containing a heteroatom;

$R^5$ and $R^6$ optionally bind to each other to form an aliphatic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ are located in the neighborhood of the metal N and affects M with steric and/or electronic interaction. To have such effect, $R^5$ and $R^6$ are preferably bulky.

Preferred specific examples of $R^5$ and $R^6$ include isobutyl group, t-butyl group, cyclohexyl group, neopentyl group, pentane-3-yl group, and the like. Of them, t-butyl group is more preferred.

As the heteroatom used as $R^5$ and $R^6$, examples include oxygen, nitrogen, phosphorus, sulfur, selenium, silicon, halogen and boron. Of these heteroatoms, fluorine and chlorine are preferable. Also, groups containing these heteroatoms include: oxygen-containing groups including alkoxy group, aryloxy group, acyl group and ester group; nitrogen-containing groups including amino group and amide group; sulfur-containing groups including thioalkoxy group and thioaryloxy group; phosphorus-containing substituent groups including phosphino group; selenium-containing groups including selenyl group; silicon-containing groups including trialkylsilyl group, dialkylarylsilyl group and alkyldiarylsilyl group; fluorine-containing groups including fluoroalkyl group and fluoroaryl group; and boron-containing groups including alkylboron group and arylboron group. Of these heteroatom-containing groups, alkoxy group or aryloxy group is most preferable.

As the heteroatom contained in the aforementioned heteroatom-containing group, one capable of coordinating to a transition metal is preferable. Specific examples of the heteroatom-containing group containing such a heteroatom that is capable of coordinating to a transition metal, include the following groups.

That is, there may be mentioned oxygen-containing groups including alkoxy groups such as methoxy group, ethoxy group, n-propoxy group, isopropoxy group, n-butoxy group and t-butoxy group, aryloxy groups such as phenoxy group, p-methylphenoxy group and p-methoxyphenoxy group, acyl groups such as acetyl group and benzoyl group, and ester groups such as acetoxy group, carboxyethyl group, carboxy t-butyl group and carboxyphenyl group; nitrogen-containing groups including dialkylamino groups such as dimethylamino group, diethylamino group, di-n-propylamino group and cyclohexylamino group; sulfur-containing groups including thioalkoxy groups such as thiomethoxy group, thioethoxy group, thio-n-propoxy group, thioisopropoxy group, thio-n-butoxy group, thio-t-butoxy group and thiophenoxy group, and thioaryloxy groups such as p-methylthiophenoxy group and p-methoxythiophenoxy group; phosphorus-containing substituent groups including dialkylphosphino groups such as dimethylphosphino group, diethylphosphino group, di-n-propylphosphino group and cyclohexylphosphino group; and selenium-containing groups including selenyl groups such as methylselenyl group, ethylselenyl group, n-propylselenyl group, n-butylselenyl group, t-butylselenyl group and phenylselenyl group.

$E^1$ represents phosphorus, arsenic or antimony. Of them, $E^1$ is preferably phosphorus.

$X^1$ represents oxygen or sulfur. Of them, X is preferably oxygen.

Z represents hydrogen or a leaving group. Specific examples of Z include hydrogen atom, $R^9SO_2$ group (where $R^2$ is as aforementioned), $CF_3SO_2$ group and the like.

Also, m represents the valence of Z.

The general formula [II] is shown in the form of anion. As the countercation thereof, any cation can be used, so long as the cation does not inhibit the reaction with the transition metal compound of the present disclosure. Specific examples of the countercation include ammonium, quaternary ammonium or phosphonium, and metal ions of 1st to 14th groups of the periodic table. Of these cations, $NH_4^+$, $R^9_4N^+$ (where $R^9$ is as aforementioned, and four $R^9$s may be the same as or different from each other (the same shall apply hereinafter)), $R^9_4P^+$, $Li^+$, $Na^+$, $K^+$, $Mg^{2+}$, $Ca^{2+}$ and $Al^{3+}$ are preferable, and $R^9_4N^+$, $Li^+$, $Na^+$ and $K^+$ are more preferable.

The following Table 2-1 shows specific combinations of the substituent groups in the general formulae [I] and [II] in the present disclosure. Z and m relate to the general formula [I] only. However, specific examples are not limited to the following examples.

TABLE 2-1

| | Phenol o-position | | Phenol p-position | | Substituent groups on E1 | | | | | |
|---|---|---|---|---|---|---|---|---|---|---|
| Compound No. | R1 | R2 | R3 | R4 | R5 | R6 | E1 | X1 | Z | m |
| 1 | C6F5 | hydrogen | hydrogen | hydrogen | t-butyl | t-butyl | phosphorous | oxygen | hydrogen | 1 |
| 2 | carbazolyl | hydrogen | hydrogen | hydrogen | t-butyl | t-butyl | phosphorous | oxygen | hydrogen | 1 |
| 3 | SiMe3 | hydrogen | hydrogen | hydrogen | t-butyl | t-butyl | phosphorous | oxygen | hydrogen | 1 |
| 4 | OMe | hydrogen | hydrogen | hydrogen | t-butyl | t-butyl | phosphorous | oxygen | hydrogen | 1 |
| 5 | OSiMe3 | hydrogen | hydrogen | hydrogen | t-butyl | t-butyl | phosphorous | oxygen | hydrogen | 1 |
| 6 | NHC6H11 | hydrogen | hydrogen | hydrogen | t-butyl | t-butyl | phosphorous | oxygen | hydrogen | 1 |
| 7 | C6F5 | hydrogen | hydrogen | hydrogen | i-butyl | i-butyl | phosphorous | oxygen | hydrogen | 1 |
| 8 | carbazolyl | hydrogen | hydrogen | hydrogen | i-butyl | i-butyl | phosphorous | oxygen | hydrogen | 1 |

TABLE 2-1-continued

| Compound No. | Phenol o-position R1 | R2 | Phenol p-position R3 | R4 | Substituent groups on E1 R5 | R6 | E1 | X1 | Z | m |
|---|---|---|---|---|---|---|---|---|---|---|
| 9 | SiMe3 | hydrogen | hydrogen | hydrogen | i-butyl | i-butyl | phosphorous | oxygen | hydrogen | 1 |
| 10 | OMe | hydrogen | hydrogen | hydrogen | i-butyl | i-butyl | phosphorous | oxygen | hydrogen | 1 |
| 11 | OSiMe3 | hydrogen | hydrogen | hydrogen | i-butyl | i-butyl | phosphorous | oxygen | hydrogen | 1 |
| 12 | NHC6H11 | hydrogen | hydrogen | hydrogen | i-butyl | i-butyl | phosphorous | oxygen | hydrogen | 1 |
| 13 | C6F5 | hydrogen | hydrogen | hydrogen | cyclohexyl | cyclohexyl | phosphorous | oxygen | hydrogen | 1 |
| 14 | carbazolyl | hydrogen | hydrogen | hydrogen | cyclohexyl | cyclohexyl | phosphorous | oxygen | hydrogen | 1 |
| 15 | SiMe3 | hydrogen | hydrogen | hydrogen | cyclohexyl | cyclohexyl | phosphorous | oxygen | hydrogen | 1 |
| 16 | OMe | hydrogen | hydrogen | hydrogen | cyclohexyl | cyclohexyl | phosphorous | oxygen | hydrogen | 1 |
| 17 | OSiMe3 | hydrogen | hydrogen | hydrogen | cyclohexyl | cyclohexyl | phosphorous | oxygen | hydrogen | 1 |
| 18 | NHC6H11 | hydrogen | hydrogen | hydrogen | cyclohexyl | cyclohexyl | phosphorous | oxygen | hydrogen | 1 |
| 19 | C6F5 | hydrogen | hydrogen | hydrogen | cyclohexyl | i-butyl | phosphorous | oxygen | hydrogen | 1 |
| 20 | carbazolyl | hydrogen | hydrogen | hydrogen | cyclohexyl | i-butyl | phosphorous | oxygen | hydrogen | 1 |
| 21 | SiMe3 | hydrogen | hydrogen | hydrogen | cyclohexyl | i-butyl | phosphorous | oxygen | hydrogen | 1 |
| 22 | OMe | hydrogen | hydrogen | hydrogen | cyclohexyl | i-butyl | phosphorous | oxygen | hydrogen | 1 |
| 23 | OSiMe3 | hydrogen | hydrogen | hydrogen | cyclohexyl | i-butyl | phosphorous | oxygen | hydrogen | 1 |
| 24 | NHC6H11 | hydrogen | hydrogen | hydrogen | cyclohexyl | i-butyl | phosphorous | oxygen | hydrogen | 1 |
| 25 | C6F5 | hydrogen | hydrogen | hydrogen | neopentyl | neopentyl | phosphorous | oxygen | hydrogen | 1 |
| 26 | carbazolyl | hydrogen | hydrogen | hydrogen | neopentyl | neopentyl | phosphorous | oxygen | hydrogen | 1 |
| 27 | SiMe3 | hydrogen | hydrogen | hydrogen | neopentyl | neopentyl | phosphorous | oxygen | hydrogen | 1 |
| 28 | OMe | hydrogen | hydrogen | hydrogen | neopentyl | neopentyl | phosphorous | oxygen | hydrogen | 1 |
| 29 | OSiMe3 | hydrogen | hydrogen | hydrogen | neopentyl | neopentyl | phosphorous | oxygen | hydrogen | 1 |
| 30 | NHC6H11 | hydrogen | hydrogen | hydrogen | neopentyl | neopentyl | phosphorous | oxygen | hydrogen | 1 |
| 31 | C6F5 | hydrogen | hydrogen | hydrogen | pentan-3-yl | pentan-3-yl | phosphorous | oxygen | hydrogen | 1 |
| 32 | carbazolyl | hydrogen | hydrogen | hydrogen | pentan-3-yl | pentan-3-yl | phosphorous | oxygen | hydrogen | 1 |
| 33 | SiMe3 | hydrogen | hydrogen | hydrogen | pentan-3-yl | pentan-3-yl | phosphorous | oxygen | hydrogen | 1 |
| 34 | OMe | hydrogen | hydrogen | hydrogen | pentan-3-yl | pentan-3-yl | phosphorous | oxygen | hydrogen | 1 |
| 35 | OSiMe3 | hydrogen | hydrogen | hydrogen | pentan-3-yl | pentan-3-yl | phosphorous | oxygen | hydrogen | 1 |
| 36 | NHC6H11 | hydrogen | hydrogen | hydrogen | pentan-3-yl | pentan-3-yl | phosphorous | oxygen | hydrogen | 1 |

For understanding the st structures of the compounds, the structural formula and name of the compound 1 listed in the above Table 2-1 are shown. The compound represented by the structural formula will be referred to as 2-(di-t-butylphosphanyl)-6-pentafluorophenylphenol.

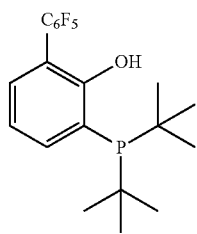

The compounds represented by the general formulae [I] and [II] can be synthesized by a known synthesis method.

The metal complex of the second embodiment of the present disclosure represented by the following general formula [III] is included in the reaction product between the compound represented by the general formula [I] or [II] and the transition metal compound containing the transition metal belonging to 9th, 10th or 11th group in the periodic table. However, as described above, the structure of the metal complex obtained by the production method is not limited to the structure represented by the general formula [III].

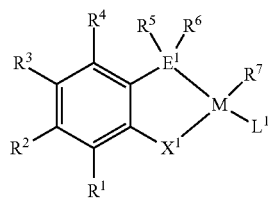

[III]

In the general formula [III], $R^1$ to $R^6$, $E^1$ and $X^1$ are as described above. As just described, there are similarities between the complex structure of the metal complex in the reaction product and that of the metal complex represented by the general formula [III], in terms of the main skeleton containing a benzene ring and these substituent groups ($R^1$ to $R^6$, $E^1$ and $X^2$).

Hereinafter, M, $R^7$ and $L^2$ in the general formula [III] will be described.

In the second embodiment of the present disclosure, M is a transition metal belonging to 9th, 10th or 11th group in the periodic table. M is preferably nickel, palladium and platinum in 10th group, cobalt and rhodium in 9th group, and copper in 11th group, more preferably nickel, palladium and platinum in 10th group, and most preferably nickel or palladium in 10th group.

The valence of M is preferably divalent. The valence of M means a formal oxidation number used in the organometallic chemistry. That is, when an electron pair in a bond in which certain elements are involved is assigned to an element having greater electronegativity, valence means a number of charge remaining on an atom of the element. For example, in the general formula [III] of the second embodiment of the present disclosure, when $E^1$ is phosphorus; $X^1$ is oxygen; M is nickel; $R^7$ is phenyl group; $L^1$ is pyridine; and nickel forms bonds with phosphorus, oxygen, carbon of the phenyl group and nitrogen of pyridine, the formal oxidation number of nickel, that is, the valence of nickel becomes divalent. The reason is as follows: according to the above-described definition, in these bonds, electron pairs are assigned to phosphorus, oxygen, carbon and nitrogen which have greater electronegativity than nickel, and charge becomes 0 for phosphorus, −1 for oxygen, −1 for phenyl group, and 0 for pyridine, and the complex is electrically neutral as a whole; therefore, charge remaining on nickel becomes +2.

As a divalent transition metal, for example, nickel (II), palladium (II), platinum (II), and cobalt (II) are preferable. As a transition metal other than divalent one, copper (I) or rhodium (III) is also preferable.

In the second embodiment of the present disclosure, $R^7$ represents a hydrogen atom or a hydrocarbon group having to 20 carbon atoms and optionally having one selected from the group consisting of a heteroatom and a group containing a heteroatom. Polymerization or copolymerization in the present disclosure is considered to be initiated by inserting the component (a) or component (b) of the present disclosure into the bond of M and $R^7$. Therefore, when the number of carbon atoms of $R^7$ is excessively large, this initiation reaction tends to be inhibited. For this reason, the number of carbon atoms of $R^7$ excluding carbon atoms contained in substituent group, is preferably from 1 to 15, and more preferably from 1 to 10.

Specific examples of $R^7$ include hydride group, methyl group, ethyl group, n-propyl group, isopropyl group, n-butyl group, isobutyl group, n-hexyl group, n-octyl group, n-decyl group, n-dodecyl group, cyclopentyl group, cyclohexyl group, benzyl group, phenyl group, p-methylphenyl group, trimethylsilyl group, triethylsilyl group, triphenylsilyl group and the like.

In the present disclosure, $L^1$ represents a ligand coordinated to M. The ligand $L^1$ in the present disclosure is a hydrocarbon compound having 1 to 20 carbon atoms and having oxygen, nitrogen or sulfur as an atom capable of forming a coordination bond. Also, as $L^1$, a hydrocarbon compound having a carbon-carbon unsaturated bond (and optionally containing a heteroatom) capable of forming a coordination bond with a transition metal, can be used. The number of carbon atoms of $L^1$ is preferably from 1 to 16, and more preferably from 1 to 10. Also, as $L^1$ forming a coordination bond with M in the general formula [III], a compound having no charge is preferable.

In the present disclosure, preferred as $L^1$ are cyclic unsaturated hydrocarbons, phosphines, pyridines, piperidines, alkylethers, arylethers, alkylarylethers, cyclic ethers, alkylnitrile derivative, arylnitrile derivative, alcohols, amides, aliphatic esters, aromatic esters, amines and the like. More preferred as $L^1$ are cyclic olefins, phosphines, pyridines, cyclic ethers, aliphatic esters, aromatic esters and the like. Particularly preferred as $L^1$ are trialkylphosphine, pyridine, lutidine (dimethylpyridine), picoline (methylpyridine) and $R^3CO_2R^8$ (definitions of $R^8$ and $R^9$ are as described above).

$R^7$ and $L^1$ may bind to each other to form a ring. Such an example is cycloocta-1-enyl group, and this group is also a preferable embodiment in the present disclosure.

The following Table 2-2 shows specific combinations of the substituent groups in the general formula [III] in the present disclosure. However, specific examples are not limited to the following examples.

TABLE 2-2

| Complex No. | Phenol o-position R1 | R2 | Phenol p-position R3 | R4 | Substituent groups on E1 R5 | R6 | E1 | X1 | M | L1 | R7 |
|---|---|---|---|---|---|---|---|---|---|---|---|
| 1a | C6F5 | hydrogen | hydrogen | hydrogen | t-butyl | t-butyl | phosphorus | oxygen | nickel | 1,4,5-η-COE | |
| 1b | C6F5 | hydrogen | hydrogen | hydrogen | t-butyl | t-butyl | phosphorus | oxygen | nickel | PEt3 | C6H5 |
| 2 | carbazolyl | hydrogen | hydrogen | hydrogen | t-butyl | t-butyl | phosphorus | oxygen | nickel | 1,4,5-η-COE | |
| 3a | SiMe3 | hydrogen | hydrogen | hydrogen | t-butyl | t-butyl | phosphorus | oxygen | nickel | 1,4,5-η-COE | |
| 3b | SiMe3 | hydrogen | hydrogen | hydrogen | t-butyl | t-butyl | phosphorus | oxygen | nickel | Py | C6H5 |
| 4 | OMe | hydrogen | hydrogen | hydrogen | t-butyl | t-butyl | phosphorus | oxygen | nickel | 1,4,5-η-COE | |
| 5 | OSiMe3 | hydrogen | hydrogen | hydrogen | t-butyl | t-butyl | phosphorus | oxygen | nickel | 1,4,5-η-COE | |
| 6 | NHC6H11 | hydrogen | hydrogen | hydrogen | t-butyl | t-butyl | phosphorus | oxygen | nickel | 1,4,5-η-COE | |
| 7 | C6F5 | hydrogen | hydrogen | hydrogen | i-butyl | i-butyl | phosphorus | oxygen | nickel | 1,4,5-η-COE | |
| 8 | carbazolyl | hydrogen | hydrogen | hydrogen | i-butyl | i-butyl | phosphorus | oxygen | nickel | 1,4,5-η-COE | |
| 9 | SiMe3 | hydrogen | hydrogen | hydrogen | i-butyl | i-butyl | phosphorus | oxygen | nickel | 1,4,5-η-COE | |
| 10 | OMe | hydrogen | hydrogen | hydrogen | i-butyl | i-butyl | phosphorus | oxygen | nickel | 1,4,5-η-COE | |
| 11 | OSiMe3 | hydrogen | hydrogen | hydrogen | i-butyl | i-butyl | phosphorus | oxygen | nickel | 1,4,5-η-COE | |
| 12 | NHC6H11 | hydrogen | hydrogen | hydrogen | i-butyl | i-butyl | phosphorus | oxygen | nickel | 1,4,5-η-COE | |
| 13 | C6H5 | hydrogen | hydrogen | hydrogen | cyclohexyl | cyclohexyl | phosphorus | oxygen | nickel | 1,4,5-η-COE | |
| 14 | carbazolyl | hydrogen | hydrogen | hydrogen | cyclohexyl | cyclohexyl | phosphorus | oxygen | nickel | 1,4,5-η-COE | |
| 15 | SiMe3 | hydrogen | hydrogen | hydrogen | cyclohexyl | cyclohexyl | phosphorus | oxygen | nickel | 1,4,5-η-COE | |
| 16 | OMe | hydrogen | hydrogen | hydrogen | cyclohexyl | cyclohexyl | phosphorus | oxygen | nickel | 1,4,5-η-COE | |
| 17 | OSiMe3 | hydrogen | hydrogen | hydrogen | cyclohexyl | cyclohexyl | phosphorus | oxygen | nickel | 1,4,5-η-COE | |
| 18 | NHC6H11 | hydrogen | hydrogen | hydrogen | cyclohexyl | cyclohexyl | phosphorus | oxygen | nickel | 1,4,5-η-COE | |
| 19 | C6H5 | hydrogen | hydrogen | hydrogen | cyclohexyl | i-butyl | phosphorus | oxygen | nickel | 1,4,5-η-COE | |
| 20 | carbazolyl | hydrogen | hydrogen | hydrogen | cyclohexyl | i-butyl | phosphorus | oxygen | nickel | 1,4,5-η-COE | |
| 21 | SiMe3 | hydrogen | hydrogen | hydrogen | cyclohexyl | i-butyl | phosphorus | oxygen | nickel | 1,4,5-η-COE | |
| 22 | OMe | hydrogen | hydrogen | hydrogen | cyclohexyl | i-butyl | phosphorus | oxygen | nickel | 1,4,5-η-COE | |
| 23 | OSiMe3 | hydrogen | hydrogen | hydrogen | cyclohexyl | i-butyl | phosphorus | oxygen | nickel | 1,4,5-η-COE | |
| 24 | NHC6H11 | hydrogen | hydrogen | hydrogen | cyclohexyl | i-butyl | phosphorus | oxygen | nickel | 1,4,5-η-COE | |
| 25 | C6H5 | hydrogen | hydrogen | hydrogen | neopentyl | neopentyl | phosphorus | oxygen | nickel | 1,4,5-η-COE | |
| 26 | carbazolyl | hydrogen | hydrogen | hydrogen | neopentyl | neopentyl | phosphorus | oxygen | nickel | 1,4,5-η-COE | |
| 27 | SiMe3 | hydrogen | hydrogen | hydrogen | neopentyl | neopentyl | phosphorus | oxygen | nickel | 1,4,5-η-COE | |
| 28 | OMe | hydrogen | hydrogen | hydrogen | neopentyl | neopentyl | phosphorus | oxygen | nickel | 1,4,5-η-COE | |
| 29 | OSiMe3 | hydrogen | hydrogen | hydrogen | neopentyl | neopentyl | phosphorus | oxygen | nickel | 1,4,5-η-COE | |

TABLE 2-2-continued

| Complex No. | Phenol o-position R1 | R2 | Phenol p-position R3 | R4 | Substituent groups on E1 | | E1 | X1 | M | L1 | R7 |
|---|---|---|---|---|---|---|---|---|---|---|---|
| | | | | | R5 | R6 | | | | | |
| 30 | NHC6H11 | hydrogen | hydrogen | hydrogen | neopentyl | neopentyl | phosphorus | oxygen | nickel | 1,4,5-η-COE |
| 31 | C6F5 | hydrogen | hydrogen | hydrogen | pentan-3-yl | pentan-3-yl | phosphorus | oxygen | nickel | 1,4,5-η-COE |
| 32 | carbazolyl | hydrogen | hydrogen | hydrogen | pentan-3-yl | pentan-3-yl | phosphorus | oxygen | nickel | 1,4,5-η-COE |
| 33 | SiMe3 | hydrogen | hydrogen | hydrogen | pentan-3-yl | pentan-3-yl | phosphorus | oxygen | nickel | 1,4,5-η-COE |
| 34 | OMe | hydrogen | hydrogen | hydrogen | pentan-3-yl | pentan-3-yl | phosphorus | oxygen | nickel | 1,4,5-η-COE |
| 35 | OSiMe3 | hydrogen | hydrogen | hydrogen | pentan-3-yl | pentan-3-yl | phosphorus | oxygen | nickel | 1,4,5-η-COE |
| 36 | NHC6H11 | hydrogen | hydrogen | hydrogen | pentan-3-yl | pentan-3-yl | phosphorus | oxygen | nickel | 1,4,5-η-COE |

For understanding the structures of the metal complexes, the structural formula and name of the complex 1b listed in the above Table 2-2 are shown. The compound represented by the structural formula will be referred to as (2-(di-t-butylphosphanyl)-6-pentafluorophenylphenolate)phenyl(triethylphosphine)nickel(II)

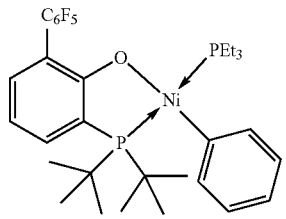

Also, compounds in which the central metal M of the compounds listed in Table 2-2 is changed from nickel to palladium, are exemplified.

As for the transition metal compound used in the present disclosure, those which are capable of being reacted with a compound represented by the general formula [I] or [II] to form a complex having polymerizing ability are used. They are sometimes referred to as precursor.

For example, as the transition metal compound containing nickel, bis(1,5-cyclooctadiene)nickel (0, i.e., zero), a complex represented by the general formula $Ni(CH_2CR^{13}CH_2)_2$ [where $R^{13}$ represents hydrogen atom, halogen atom, hydrocarbon group having 1 to 30 carbon atoms and optionally containing a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $P(O)(OR^8)_2M'_2$ or an epoxy-containing group (where $R^8$ represents a hydrocarbon group having 1 to 20 carbon atoms; $R^9$ represents a hydrogen atom or a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2)], bis(cyclopentadienyl)nickel (II), a complex represented by the general formula $Ni(CH_2SiR^{13}_3)_2L^1_2$ (where $R^{13}$ and $L^1$ are as aforementioned), a complex represented by the general formula $NiR^{13}_2L^1_2$ (where $R^{13}$ and $L^1$ are as aforementioned) or the like can be used.

Also, as the transition metal compound containing a transition metal belonging to 9th, 10th or 11th group, the general formula $MR^{13}_pL^1_q$ (where M represents a transition metal of 9th, 10th or 11th group; $R^{13}$ and $L^1$ are as described herein; and p and q are each an integer of 0 or more satisfying the valence of M) can be used.

Of these transition metal compounds, preferably used are nickel(0)bis(1,5-cyclooctadiene), $NiPhCl(PEt_3)_2$, $NiPhCl(PPh_3)_2$, NiPhCl(TMEDA) (hereinafter TMEDA represents tetramethylethylenediamine), a complex represented by the general formula $Ni(CH_2CR^{13}CH_2)_2$ (where $R^{13}$ is as aforementioned), a complex represented by, the general formula $Ni(CH_2SiR^{13}_3)_2L^1_2$ (where $R^{13}$ and $L^1$ are as aforementioned), a complex represented by the general formula $NiR^{13}_2L^1_2$ (where $R^{13}$ and $L^1$ are as aforementioned), $Pd(dba)_2$, $Pd_2(dba)_3$, $Pd_3(dba)_4$ (where dba represents dibenzylideneacetone), $Pd(OCOCH_3)_2$ and (1,5-cyclooctadiene)Pd(methyl) (chloride).

Particularly preferred are nickel(0)bis(1,5-cyclooctadiene), $NiPhCl(PEt_3)_2$, $NiPhCl(PPh_3)_2$, NiPhCl(TMEDA), $Ni(CH_2CHCH_2)_2$, $Ni(CH_2CMeCH_2)_2$, $Ni(CH_2SiMe_3)_2(Py)_2$ (hereinafter, Py represents pyridine), $Ni(CH_2SiMe_3)_2(Lut)_2$ (hereinafter, Lut represents 2,6-lutidine), $NiPh_2(Py)_2$, $NiPh_2(Lut)_2$, $Pd(dba)_2$, $Pd_2(dba)_3$, $Pd_3(dba)_4$ (where dba represents dibenzylideneacetone), $Pd(OCOCH_3)_2$, and (1,5-cyclooctadiene)Pd(methyl)(chloride).

The reaction product of the present disclosure can be obtained by contacting the aforementioned compound represented by the general formula [I] or [II] with the aforementioned transition metal compound [IV], for example, in a molar ratio of [I]+[II]:[IV]=[1:99] to [99:1], in an organic solvent such as toluene or benzene at 0° C. to 100° C. for 1 to 86400 seconds under reduced pressure to increased pressure. When a solution of bis(1,5-cyclooctadiene)nickel(0) $(Ni(COD)_2)$ in toluene or benzene is used as the transition metal compound, formation of the reaction product can be confirmed by change of color of the solution from yellow to, for example, red.

After the present reaction, a component which is constructing the transition metal compound but is other than the transition metal of the compound, is substituted by a part of the general formula [I] excluding Z or the compound represented by the general formula [II] to form the metal complex represented by the general formula [III] of the present disclosure. This substitution reaction preferably proceeds quantitatively; however, in some cases, it may proceed incompletely. After completion of the reaction, in addition to the complex represented by the general formula [III], other components derived from the general formulae [I] and [II] and the transition metal compound are present. These other components may be removed or left when the polymerization reaction or copolymerization reaction of the present disclosure is carried out. Generally, these other components are preferably removed because higher activity can be obtained.

When the reaction is carried out, $L^1$ of the present disclosure may exist together. When nickel or palladium is used as M of the present disclosure, the stability of the purified complex represented by the general formula [III] is sometimes improved by coexistence of $L^1$ having a nature of Lewis base in the system. In such a case, coexistence of $L^1$ is preferable, so long as $L^1$ does not inhibit the polymerization reaction or copolymerization reaction of the present disclosure.

In the present disclosure, the reaction may be carried out in a vessel other than the reactor which is used for polymerization of α-olefin or copolymerization of α-olefin and (meth)acrylate, in advance, and then the thus-obtained complex represented by the general formula [III] may be used for polymerization of α-olefin or copolymerization of α-olefin and (meth)acrylate, or the reaction may be carried out in the presence of these monomers. Also, the reaction may be carried out in the reactor which is used for polymerization of α-olefin or copolymerization of α-olefin and (meth)acrylate. In this case, these monomers may be present or absent. As each of the components represented by the general formulae [I] and [II], a single component may be used, or plural kinds of components may be used in combination. Especially, for the purpose of broadening molecular weight distribution or comonomer content distribution, such combined use of plural kinds of components is useful.

2-2. Method for Producing Metal Complex

In the production method of the second embodiment of the present disclosure, as described above, the metal complex represented by the general formula [III] can be produced by contacting the compound represented by the general formula [I] or [II] with the transition metal compound containing the transition metal belonging to 9th, 10th or 11th group in the periodic table.

2-3. Catalyst Component for Olefin Polymerization

The catalyst component for olefin polymerization according to the second embodiment of the present disclosure, comprises the aforementioned metal complex or a metal complex obtainable by the aforementioned production method.

In the second embodiment of the present disclosure, the metal complex represented by the general formula [III] can be used as a catalyst component for the polymerization or copolymerization. As aforementioned, the metal complex represented by the general formula [III] can be formed by reacting the general formula [I] or [II] with the transition metal complex component. When the metal complex represented by the general formula [III] is used as a catalyst component, isolated one may be used, or one supported on a carrier may be used. Such supporting may be carried out in a reactor which is used for polymerization of α-olefin or copolymerization of α-olefin and (meth)acrylate, in the presence or the absence of these monomers, or may be carried out in a vessel other than the reactor.

As a usable carrier, any carrier can be used so long as the carrier does not impair the scope of the present disclosure. Generally, inorganic oxides and polymer carriers can be suitably used. In particular, there may be mentioned $SiO_2$, $Al_2O_3$, MgO, $ZrO_2$, $TiO_2$, $B_2O_3$, CaO, ZnO, BaO, $ThO_2$ and the like, or a mixture thereof. Also, mixed oxides such as $SiO_2$—$Al_2O_3$, $SiO_2$—$V_2O_5$, $SiO_2$—$TiO_2$, $SiO_2$—MgO and $SiO_2$—$Cr_2O_3$ can be used, and inorganic silicates, polyethylene carrier, polypropylene carrier, polystyrene carrier, polyacrylic acid carrier, polymethacrylic acid carrier, polyacrylic acid ester carrier, polyester carrier, polyimide carrier, polyimide carrier, and the like can be used. As for these carriers, particle diameter, particle diameter distribution, pore volume, specific surface area and the like are not particularly limited, and any carrier can be used.

As the inorganic silicate, clay, clay mineral, zeolite, diatomaceous earth, and the like can be used. For these substances, synthetic material may be used, or naturally occurring mineral may be used. Specific examples of clay and clay mineral include allophane group such as allophane; kaoline group such as dickite, nacrite, kaolinite and anorthite; halloysite group such as metahalloysite and halloysite; serpentine group such as chrysotile, lizardite and antigorite; smectite such as montmorillonite, sauconite, beidellite, nontronite, saponite and hectorite; vermiculite minerals such as vermiculite; mica minerals such as illite, sericite and glauconite; attapulgite; sepiolite; palygorskite; bentnite; Kibushi clay; Gaerome clay; hisingerite; pyrophyllite; and chlorite group. These substances may form a mixed layer. Artificial compounds include synthetic mica, synthetic hectorite, synthetic saponite and synthetic taeniolite. Of these specific examples, preferred are kaoline group such as dickite, nacrite, kaolinite and anorthite; halloysite group such as metahalloysite and halloysite; serpentine group such as chrysotile, lizardite and antigorite; smectite such as montmorillonite, zaukonite, beidellite, nontronite, saponite and hectorite; vermiculite minerals such as vermiculite; mica minerals such as illite, sericite and glauconite; synthetic mica; synthetic hectorite; synthetic saponite; and synthetic taeniolite. Particularly preferred are smectite such as montmorillonite, zaukonite, beidellite, nontronite, saponite and hectorite; vermiculite minerals such as vermiculite; synthetic mica; synthetic hectorite; synthetic saponite; and synthetic taeniolite.

These carriers may be used as they are, or may be subjected to acid treatment with hydrochloric acid, nitric acid, sulfuric acid or the like, and/or salts treatment with LiCl, NaCl, KCl, $CaCl_2$, $MgCl_2$, $Li_2SO_4$, $MgSO_4$, $ZnSO_4$, $Ti(SO_4)_2$, $Zr(SO_4)_2$, $Al_2(SO_4)_3$ or the like. The treatment may be carried out by mixing corresponding acid and base to form a salt in the reaction system. Also, shape control such as pulverization and granulation or drying treatment may be carried out.

2-4. Catalyst for Olefin Polymerization

The catalyst for olefin polymerization according to the second embodiment of the present disclosure, comprises the following components (A) and (B) and, as needed, the following component (C):

the component (A): the aforementioned metal complex or a metal complex obtainable by the aforementioned production method the component (B): a compound reactive with the component (A) to form an ion pair, or an ion-exchange layered silicate the component (C): an organoaluminum compound.

The component (A) is the aforementioned metal complex or a metal complex obtainable by the aforementioned production method. One kind of metal complex may be used alone, or two or more kinds of metal complexes may be used in combination.

An example of the component (3) is an organoaluminum oxy compound. The organoaluminum oxy compound has an Al—O—Al bond in molecule, and the number of the bonds is in a range of generally from 1 to 100, and preferably from 1 to 50. Such an organoaluminum oxy compound is generally a product obtainable by reacting an organoaluminum compound with water.

The reaction of organoaluminum with water is generally carried out in inert hydrocarbon (solvent). As the inert hydrocarbon, aliphatic hydrocarbon, alicyclic hydrocarbon and aromatic hydrocarbon such as pentane, hexane, heptane; cyclohexane, methylcyclohexane, benzene, toluene and xylene can be used. Aliphatic hydrocarbon or aromatic hydrocarbon are preferably used.

As the organoaluminum compound used for preparation of the organoaluminum oxy compound, compounds represented by the following general formula are usable. Trialkylaluminum is preferably used.

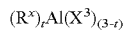

(where $R^x$ represents a hydrocarbon group such as alkyl group, alkenyl group, aryl group and aralkyl group each having 1 to 18 carbon atoms, preferably 1 to 12 carbon atoms; $X^3$ represents hydrogen atom or halogen atom; and t represents an integer of $1 \leq t \leq 3$.)

The alkyl group in the trialkylaluminum may be any of methyl group, ethyl group, propyl group, isopropyl group, butyl group, isobutyl group, pentyl group, hexyl group, octyl group, decyl group, dodecyl group and the like. Preferred are methyl group and isobutyl group, and particularly preferred is methyl group. Two or more kinds of the organoaluminum compounds can be mixed and used.

The reaction ratio of the water and the organoaluminum compound (the molar ratio of water/Al) is preferably from 0:25/1 to 1.2/1, and particularly preferably from 0.5/1 to 1/1. The reaction temperature is generally in a range of from −70° C. to 100° C., and preferably from −20° C. to 20° C. The reaction time is generally selected in a range of from 5 minutes to 24 hours, and preferably from 10 minutes to 5 hours. As the water required for the reaction, not only simple water but also hydrated water contained in copper sulfate hydrate, aluminum sulfate hydrate or the like, and a component that can produce water in the reaction system, can be used.

Of the aforementioned organoaluminum oxy compounds, one that is obtainable by reaction of alkylaluminum and water is generally referred to as aluminoxane. Methylaluminoxane (including those substantially composed of methylaluminoxane (MAO)) is particularly preferred as the organoaluminum oxy compound. Dried methylaluminoxane (DMAO) in a solid form, which is obtained by removing a solvent out of a MAO solution, is also preferred.

As the organoaluminum oxy compound, two or more kinds of the aforementioned organoaluminum oxy compounds can be used in combination, or a solution of the organoaluminum oxy compound dissolved or dispersed in the aforementioned inert hydrocarbon solvent, may be used.

A specific example of the component (B) is ion-exchange layered silicate. The ion-exchange layered silicate (hereinafter may be simply referred to as "silicate") is a silicate compound having such a crystal structure in which planes formed by ion bonding or the like are positioned in parallel to each other and stacked by binding force, and ions contained therein, are exchangeable. As the silicate, various kinds of conventionally known silicates are known, and the silicate is described in detail in "Nendo Kobutsu Gaku", Haruo SHIROZU, Asakura Publishing Co., Ltd. (1995).

In the present disclosure, as the component (B), those belonging to the smectite group are preferably used. Specific examples thereof include montmorillonite, sauconite, beidellite, nontronite, saponite, hectorite, stevensite and the like. Of them, montmorillonite is preferred from the viewpoint of increasing the polymerization activity and molecular weight of the copolymer part.

Most silicates are mainly produced as a major component of natural tray minerals. Therefore, foreign substances (such as quartz and cristobalite) other than the ion-exchange layered silicate are often contained. Foreign substances may be contained in the silicate of the smectite group used in the present disclosure.

The silicate may be subjected to acid treatment and/or salts treatment. The treatment may be carried out by mixing corresponding acid and base to form a salt in the reaction system.

As the component (B), a mixture of the aforementioned organoaluminum oxy compound and the ion-exchange layered silicate may be used. Also, as the organoaluminum oxy compound and ion-exchange layered silicate, one kind of compound and silicate or two or more kinds of compounds and silicates may be used.

An examples of the organoaluminum compound used as the component (C) is represented by the following general formula

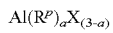

where $R^p$ represents a hydrocarbon group having 1 to 20 carbon atoms; X represents hydrogen, halogen, alkoxy group or siloxy group; and a is a number that is more than 0 and equal to or less than 3.

Specific examples of the organoaluminum compound represented by the general formula include trialkylaluminum such as trimethylaluminum, triethylaluminum, tripropylaluminum, triisobutylaluminum and the like, and halogen- or alkoxy-containing alkylaluminum such as diethylaluminum monochloride, diethylaluminum monomethoxide and the like.

Of them, triisobutylaluminum is preferred. Also, two or more kinds of the aforementioned organoaluminum compounds may be used in combination. Also, the aforementioned aluminum compound may be modified with alcohol, phenol or the like for use. As the modifiers, methanol, ethanol, 1-propanol, isopropanol, butanol, phenol, 2,6-dimethylphenol, 2,6-di-t-butylphenol and the like are exemplified. Preferred specific examples are 2,6-dimethylphenol and 2,6-di-t-butylphenol.

In the method for preparing the catalyst for olefin polymerization according to the second embodiment of the present disclosure, the method for contacting the component (A), the component (B) and, as needed, the component (C) is not particularly limited. For example, the following methods can be provided.

Method (i): The component (A) and the component (B) are contacted with each other, and then the component (C) is added.

Method (ii): The component (A) and the component (C) are contacted with each other, and then the component (B) is added.

Method (iii): The component (E) and the component (C) are contacted with each other, and then the component (A) is added.

Method (iv): The components (A), (B) and (C) are contacted with each other at the same time.

Also, each component may be used as a mixture by mixing it with different kinds of components or may be separately contacted in a different order. The contacting may be carried out not only at the time of catalyst preparation, but also at the time of preliminary polymerization using olefin or at the time of polymerization of olefin.

Also, one component may be divided and contacted with each component, for example, in such a manner that the component (B) and the component (C) are contacted with each other, and then a mixture of the component (A) and the component (C) is added.

The contacting of the components (A), (B) and (C) preferably carried out in an inert gas atmosphere such as nitrogen and the like and in an inert hydrocarbon solvent such as pentane, hexane, heptane, toluene, xylene and the like. The contacting may be carried out at a temperature between −20° C. and the boiling point of the solvent, and it is particularly preferably carried out at a temperature between room temperature and the boiling point of the solvent.

2-5. Method for Producing α-Olefin Polymer

An embodiment of the method for producing the α-olefin polymer of the second embodiment of the present disclosure, is polymerization or copolymerization of (a) an α-olefin in the presence of the catalyst for polymerization.

The component (a) in the present disclosure is α-olefin represented by the general formula $CH_2=CHR^{10}$. $R^{10}$ is hydrogen atom or hydrocarbon group having 1 to 20 carbon atoms, which may have branch, ring and/or unsaturated bond. When the number of carbon atoms of $R^{10}$ is larger than 20, polymerization activity tends to be less expressed. For this reason, of them, α-olefins in which $R^{10}$ is hydrogen atom or hydrocarbon group having 1 to 10 carbon atoms, are preferred as the components (a).

Those more preferred as the component (a) include ethylene, propylene, 1-butene, 1-pentene, 1-hexene, 1-octene, 1-decene, 3-methyl-1-butene, 4-methyl-1-pentene, vinylcyclohexene and styrene. As the component (a), a single component may be used, or plural kinds of components may be used in combination.

Another embodiment of the method for producing the α-olefin polymer of the present disclosure is copolymerization of (a) an α-olefin and (b) a (meth)acrylic acid ester monomer, vinyl monomer or allyl monomer in the presence of the aforementioned catalyst for polymerization.

The (meth)acrylic acid ester monomer in the present disclosure is represented by the general formula $CH_2=C(R^{11})CO_2(R^{12})$. $R^{11}$ is hydrogen atom or hydrocarbon group having 1 to 10 carbon atoms, which may have branch, ring and/or unsaturated bond. $R^{12}$ is hydrocarbon group having 1 to carbon atoms, which may have branch, ring and/or unsaturated bond. Also, $R^{12}$ may contain a heteroatom at any position therein.

When the number of carbon atoms of $R^{11}$ is 11 or more, polymerization activity tends to be less expressed. Therefore, $R^{11}$ is hydrogen atom or hydrocarbon group having 1 to 10 carbon atoms, and preferable (meth)acrylic acid esters include one in which $R^{11}$ is hydrogen atom or hydrocarbon group having 1 to 5 carbon atoms. More preferable (meth)acrylic acid ester monomers include methacrylate in which $R^{11}$ is methyl group or acrylate in which $R^{11}$ is hydrogen atom. Similarly, when the number of carbon atoms of $R^{12}$ is larger than 30, polymerization activity tends to be less expressed. Therefore, the number of carbon atoms of $R^{12}$ is from 1 to 30, preferably from 1 to 12, and more preferably from 1 to 8.

Also, as the heteroatom optionally contained in $R^{12}$, oxygen, sulfur, selenium, phosphorus, nitrogen, silicon, fluorine, boron and the like are provided. Of these heteroatoms, oxygen, silicon and fluorine are preferable, and oxygen is more preferable. In addition, $R^{12}$ containing no heteroatom is also preferable.

Still more preferable (meth)acrylic acid ester monomers include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, hydroxyethyl (meth)acrylate, dimethylaminoethyl (meth)acrylate, diethylaminoethyl (meth)acrylate, (meth)acrylate-2-aminoethyl, (meth)acrylate-2-methoxyethyl, (meth)acrylate-3-methoxypropyl, glycidyl (meth)acrylate, ethyleneoxide (meth)acrylate, trifluoromethyl (meth)acrylate, 2-trifluoromethylethyl (meth) acrylate, perfluoroethyl (meth)acrylate, (meth)acrylamide, (meth)acryldimethylamide, 2-hydroxybutyl (meth)acrylate, 4-hydroxybutyl (meth)acrylate, and the like. A (meth)acrylic acid ester may be used alone, or a plurality of (meth)acrylic acid esters may be used in combination.

The vinyl monomer in the present disclosure is a vinyl monomer containing polar group, such as halogen-containing, nitrogen-containing, oxygen-containing and sulfur-containing vinyl monomers. In particular, it is a vinyl monomer containing halogen, hydroxyl group, amino group, nitro group, carboxyl group, formyl group, ester group, epoxy group, nitrile group or the like. Specific examples thereof include 5-hexene-1-ol, 2-methyl-3-butene-1-ol, ethyl 10-undecenoate, 10-undecene-1-ol, 12-tridecene-2-ol, 10-undecanoic acid, methyl-9-decenate, t-butyl-10-undecenate, 1,1-dimethyl-2-propene-1-ol, 9-decene-1-ol, 3-butenoic acid, 3-butene-1-ol, N-(3-butene-1-yl)phthalimide, 5-hexenoic acid, methyl 5-hexenoate, 5-hexene-2-one, acrylonitrile, methacrylonitrile, vinyl acetate, triethoxyvinylsilane, and the like. Of them, 3-butene-1-ol, ethyl 10-undecenoate, 10-undecene-1-ol, and triethoxyvinylsilane are particularly preferred.

As the allyl monomer in the present disclosure, examples include an allyl monomer having 3 carbon atoms (propenyl monomer) and an allyl-based monomer which is an allyl group containing monomer having 4 or more carbon atoms and allyl group. The allyl monomer is an allyl monomer containing polar group, such as halogen-containing, nitrogen-containing, oxygen-containing and sulfur-containing allyl monomers. In particular, it is an allyl vinyl monomer containing halogen, hydroxyl group, amino group, nitro group, carboxyl group, formyl group, ester group, epoxy group, nitrile group or the like. Preferred specific examples thereof include allyl acetate, allyl alcohol, allylamine, N-allylaniline, N-t-butoxycarbonyl-N-allylamine, N-benzyloxycarbonyl-N-allylamine, N-allyl-N-benzylamine, allyl chloride, allyl bromide, allyl ether, diallyl ether, and the like. Of them, allyl acetate and allyl alcohol are more preferred, and allyl acetate, allyl ether and diallyl ether are still more preferred.

The polymerization reaction in the present disclosure is carried out in the presence or the absence of a liquid which may be: hydrocarbon solvent such as propane, n-butane, isobutane, n-hexane, n-heptane, toluene, xylene, cyclohexane, and methylcyclohexane; or a liquefied α-olefin; or a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol and ethylene glycol. Also, a mixture of liquid compounds described here may be used as a solvent. Furthermore, ionic liquid can also be used as a solvent. The above-described hydrocarbon solvent and ionic liquid are more preferable to obtain higher polymerization activity and high molecular weight.

In the present disclosure, the polymerization reaction can be carried out in the presence or the absence of known additive. As the additive, a polymerization inhibitor to inhibit radical polymerization and an additive having an action to stabilize produced copolymer are preferable. Examples of preferable additives include quinone derivative, hindered phenol derivative and the like. Specifically, hydroquinone monomethyl ether, 2,6-di-t-butyl-4-methylphenol (BHT), reaction product of trimethylaluminium and BHT, reaction product of titanium (IV) alkoxide and BHT, and the like can be used. Also, the polymerization may be carried out in the presence of inorganic and/or organic filler by using such filler as an additive. Also, $L^1$ relating to the present disclosure or ionic liquid may be used as an additive.

Preferable additives in the present disclosure include Lewis base. By selecting appropriate Lewis base, activity, molecular weight and copolymerization reactivity of acrylate can be improved. The amount of Lewis base is from 0.0001 to 1000 equivalents, preferably from 0.1 to 100 equivalents, and more preferably from 0.3 to 30 equivalents, relative to the transition metal M in the catalyst component present in the polymerization system. The method for adding Lewis base to the polymerization system is not particularly limited, and any technique can be used. For example, Lewis base may be added by mixing with the catalyst component of the present disclosure, or may be added by mixing with the monomer, or may be added to the polymerization system independently from the catalyst component and monomer. Also, a plurality of Lewis bases may be used in combination. Also, the same Lewis base as $L^1$ relating to the present disclosure may be used, or a different Lewis base may be used.

Lewis bases include aromatic amines, aliphatic amines, alkyl ethers, aryl ethers, alkyl aryl ethers, cyclic ethers, alkyl nitriles, aryl nitriles, alcohols, amides, aliphatic esters, aromatic esters, phosphates, phosphites, thiophenes, thianthrenes, thiazoles, oxazoles, morpholines, cyclic unsaturated hydrocarbons, and the like. Of them, preferred Lewis bases are aromatic amines, aliphatic amines, cyclic ethers, aliphatic esters and aromatic esters, and particularly preferred Lewis bases are pyridine derivative, pyrimidine derivative, piperidine derivative, imidazole derivative, aniline derivative, piperidine derivative, triazine derivative, pyrrole derivative and furan derivative.

Specific Lewis base compounds include pyridine, pentafluoropyridine, 2,6-lutidine, 2,4-lutidine, 3,5-lutidine, pyrimidine, N,N-dimethylaminopyridine, N-methylimidazole, 2,2'-bipyridine, aniline, piperidine, 1,3,5-triazine, 2,4,6-tris(trifluoromethyl)-1,3,5-triazine, 2,4,6-tris(2-pyridyl)-s-triazine, quinoline, 8-methylquinoline, phenazine, 1,10-phenanthroline, N-methylpyrrole, 1,8-diazabicyclo-[5.4.0]-undeca-7-ene, 1,4-diazabicyclo-[2.2.2]-octane, triethylamine, benzonitrile, picoline, triphenylamine, N-methyl-2-pyrrolidone, 4-methylmorpholine, benzoxazole, benzothiazole, furan, 2,5-dimethylfuran, dibenzofuran, xanthene, 1,4-dioxane, 1,3,5-trioxane, dibenzothiophene, thianthrene, triphenylphosphonium cyclopentadienide, triphenylphosphite, triphenylphosphate, tripyrrolizinophosphine, tris(pyrrolizino)borane, and the like.

In the present disclosure, polymerization style is not particularly limited. Slurry polymerization in which at least a part of the produced polymer takes a form of slurry in a medium; bulk polymerization in which liquefied monomer itself is used as a medium; gas phase polymerization in which polymerization is carried out in a vaporized monomer; or high pressure ion polymerization in which at least a part of the produced polymer dissolves in a monomer liquefied at high temperature and high pressure; and the like are preferably used. Also, any type of batch polymerization, semi-batch polymerization and continuous polymerization may be used. Also, living polymerization or a polymerization occurring in conjunction with chain transfer may be carried out. Also, chain shuttling or coordinative chain transfer polymerization (CCTP) may be carried out by using so-called chain transfer agent (CSA) in combination.

Unreacted monomer and medium may be used by separating them from the produced copolymer and recycling them. In recycling, these monomer and medium may be reused with or without purification. For separation of the produced copolymer from unreacted monomer and medium, a hitherto known method can be used. For example, a method such as filtration, centrifugation, solvent extraction or reprecipitation with poor solvent can be used.

Polymerization temperature, polymerization pressure and polymerization time are not particularly limited. Generally, optimum setting can be done from the following ranges considering productivity and process capacity. That is, polymerization temperature can be selected from a range of generally from −20° C. to 290° C., and preferably from 0° C. to 250° C.; copolymerization pressure can be selected form a range of from 0.1 MPa to 300 MPa, and preferably from 0.3 MPa to 250 Mpa; and polymerization time can be selected from a range of from 0.1 minute to 10 hours, preferably from 0.5 minute to 7 hours, and more preferably from 1 minute to 6 hours.

In the present disclosure, polymerization is generally carried out under an inert gas atmosphere. For example, nitrogen atmosphere, argon atmosphere or carbon dioxide atmosphere can be used, and nitrogen atmosphere is preferably used. Commingling of a small amount of oxygen or air is allowable.

Supply of the catalyst and monomer to a polymerization reactor is also not particularly limited, and various supplying methods can be employed corresponding to each purpose. For example, in the case of batch polymerization, such a technique can be employed that a predetermined amount of monomer is supplied into a polymerization reactor in advance, followed by supplying the catalyst. In this case, additional monomer or additional catalyst may be supplied to the polymerization reactor. In the case of continuous polymerization, such a technique can be employed that predetermined amounts of monomer and catalyst are supplied to the polymerization reactor continuously or intermittently to carry out polymerization reaction continuously.

As for control of the composition of the copolymer, generally, such a method can be used that a plurality of monomers are supplied to the reactor, and a ratio of the supplied monomers is varied. In addition, a method in which the copolymerization composition is controlled by utilizing a difference in monomer reactivity ratios depending on difference in catalyst structures, and a method in which the copolymerization composition is controlled by utilizing polymerization temperature dependency of monomer reactivity ratio, are provided.

For controlling the molecular weight of the polymer, a hitherto known method can be used. That is, a method in which the molecular weight is controlled by controlling polymerization temperature, a method in which the molecular weight is controlled by controlling monomer concentrations, a method in which the molecular weight is controlled by using a chain transfer agent, a method in which the molecular weight is controlled by controlling ligand structure in the transition metal complex, and the like are provided. When a chain transfer agent is used, a hitherto known chain transfer agent can be used. For example, hydrogen, metalalkyl, and the like can be used.

Also, when the component (b) itself works as a kind of chain transfer agent, molecular weight adjustment is possible by controlling the ratio of the component (b) to the component (a) or controlling the concentration of the component (b). When molecular weight adjustment is carried out by controlling ligand structure in the transition metal complex, such a tendency can be utilized that molecular weight is generally improved by controlling the type, number and configuration of the heteroatom-containing groups in the aforementioned $R^2$ and $R^3$, by arranging a bulky substituent group around the metal M, or by introducing a heteroatom into the aforementioned $R^6$. An electron-donating group such as aryl group and heteroatom-containing substituent group is preferably arranged so that the electron-donating group can have an interaction to the metal M. It can be generally judged whether such an electron-donating group can have an interaction with the metal M or not, by measuring a distance between the electron-donating group and the metal M using a molecule model or molecular orbital calculation.

Especially, the copolymer obtained by the present disclosure expresses superior painting characteristic, printability, antistatic performance, inorganic filler dispersibility, adhesive property to other resins, compatibility with other resins, and the like, by the effect based on the polar group of the copolymer. Utilizing such properties, the copolymer of the present disclosure can be used for various applications. For example, the copolymer can be used for film, sheet, adhesive resin, binder, compatibilizing agent, wax, and the like.

3. Third Embodiment

In the third embodiment of the present disclosure, there are provided a reaction product obtainable by contacting a compound represented by a general formula [I] or [II] with a transition metal compound containing a transition metal belonging to 9th, 10th or 11th group in the periodic table such as nickel, palladium, cobalt, copper or rhodium, that is, a metal complex represented by a general formula [III] (hereinafter may be referred to as metal complex [III]), and a method for producing a polymer or copolymer of (a) α-olefin and a method for producing a copolymer of (a) α-olefin and (b) (meth)acrylic acid ester monomer, vinyl monomer or allyl monomer, both in the presence of the metal complex as a catalyst component.

In the present disclosure, "polymerization" collectively means homopolymerization of one kind of monomer and copolymerization of plural kinds of monomers, and both cases are simply described as "polymerization" especially when both cases need not to be distinguished. Also in the present disclosure, "(meth)acrylic acid ester" encompasses both acrylic ester and methacrylic ester.

3-1. Metal Complex

The metal complex of the third embodiment of the present disclosure is obtainable by contacting a compound represented by the following general formula [I] or [II] with a transition metal compound containing a transition metal belonging to 9th, 10th or 11th group in the periodic table:

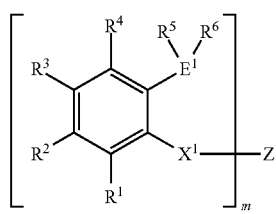

[I]

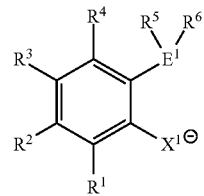

[II]

In the present disclosure, "contact" means that compounds represented by the general formulae [I] and [II] (hereinafter, they may be collectively referred to as phosphorus phenolate compounds) and the transition metal compound are present very closely to each other so that $E^1$ in the general formula [I] or [II] can form a coordination bond with the transition metal, and/or $X^1$ in the general formulae can form a single bond with the transition metal. Also, contacting the phosphorus phenolate compounds with the transition metal compound means that these compounds are mixed so that these compounds are present very closely to each other and can form at least one of the two kinds of bonds.

The condition for mixing the phosphorus phenolate compound and the transition metal compound is not particularly limited. These compounds may be directly mixed or mixed with the use of a solvent. Especially from the viewpoint of achieving uniform mixing, a solvent is preferably used.

In the metal complex thus obtained, the phosphorus phenolate compound becomes a ligand. Therefore, the reaction between the phosphorus phenolate compound and the transition metal compound is generally a ligand exchange reaction. When the metal complex thus obtained is thermodynamically more stable than the transition metal compound, the ligand exchange reaction proceeds by mixing the phosphorus phenolate compound and the transition metal compound at room temperature (15° C. to 30° C.). On the other hand, when the metal complex thus obtained is thermodynamically less stable than the transition metal compound, it is preferable to appropriately heat the mixture so that the ligand exchange reaction occurs sufficiently.

It is estimated that the metal complex obtainable by contacting the compound represented by the general formula [I] or [II] with the transition metal compound containing the transition metal belonging to 9th, 10th or 11th group in the periodic table, has the structure represented by the below-described general formula [III].

However, when the phosphorus phenolate compound is contacted with the transition metal compound containing the transition metal belonging to 9th, 10th or 11th group in the periodic table, there is a possibility that a metal complex having a structure other than the structure represented by the general formula [III] may produce since, the compound represented by the general formula [I] or [II] is a bidentate ligand. For example, there may be a case where only $X^1$ in the general formula [I] or [II] forms a bond with the transition metal, or a case where only $E^1$ in the formulae may form a bond with the transition metal. The metal complex represented by the general formula [III] is a 1:1 reaction product of the phosphorus phenolate compound and the transition metal compound. Depending on the type of the transition metal, there may be a case where a reaction product with a different composition ratio is obtained. For example, there may be a case where one or more molecules of phosphorus phenolate compound forms a complex with one transition metal, or there may be a case where one molecule of phosphorus phenolate compound reacts with two or more transition metals to synthesize a polynuclear complex.

In the present disclosure, it is not denied that the metal complex having a structure other than the structure represented by the general formula [III] can be used for the production of, as with the metal complex represented by the general formula [III], an α-olefin (co)polymer.

Hereinafter, $R^1$ to $R^6$, $E^1$ and $X^1$ in the general formulae [I] and [II] and Z and m in the general formula [I] will be described.

$R^1$ represents a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms. Of them, preferred are the linear alkyl group, the branched acyclic alkyl group, the cycloalkyl group optionally having a side chain, the aryl group, and the arylalkyl group.

For each of the linear alkyl group, the branched acyclic alkyl group, the alkenyl group, the cycloalkyl group optionally having a side chain, the aryl group, the arylalkyl group and the alkylaryl group, the upper limit of the number of carbon atoms is preferably 25, more preferably 20, and still more preferably 15.

Of the examples of $R^2$, as the linear alkyl group having 1 to 30 carbon atoms, a linear alkyl group having 1 to 10 carbon atoms is more preferred, such as methyl group, ethyl group, n-propyl group, n-butyl group, n-pentyl group, n-hexyl group, n-heptyl group, n-octyl group, n-nonyl group, n-decyl group and the like, and a linear alkyl group having 1 to 4 carbon atoms is still more preferred.

Of the examples of $R^2$, as the branched acyclic alkyl group having 3 to 30 carbon atoms, a branched acyclic alkyl group having 3 to 10 carbon atoms is more preferred, such as isopropyl group, isobutyl group, tert-butyl group (t-butyl group), sec-butyl group, isopentyl group (3-methylbutyl group), t-pentyl group (1,1-dimethylpropyl group), sec-pentyl group (1-methylbutyl group), 2-methylbutyl group, neopentyl group (2,2-dimethylpropyl group), 1,2-dimethylpropyl group, isohexyl group (4-methylpentyl group) and the like, and a branched acyclic alkyl group having 3 to 8 carbon atoms is still more preferred.

Of the examples of $R^1$, as the alkenyl group having 2 to carbon atoms, vinyl group, allyl group, butenyl group, pentenyl group, hexenyl group, styryl group, and cinnamyl group are provided. An alkenyl group having 3 to 8 carbon atoms is preferred, such as allyl group, butenyl group, pentenyl group, hexenyl group, styryl group, and the like. An alkenyl group having 4 to 8 carbon atoms is more preferred, such as butenyl group, pentenyl group, hexenyl group, styryl group and the like.

Of the examples of $R^1$, as the cycloalkyl group having 3 to 30 carbon atoms and optionally having a side chain, a cycloalkyl group having 3 to 10 carbon atoms and optionally having a side chain is more preferred, such as cyclopropyl group, cyclobutyl group, cyclopentyl group, 2-methylcyclopentyl group, 3-methylcyclopentyl group, cyclohexyl group, 4-methylcyclohexyl group, 4-ethylcyclohexyl group, cyclooctyl group, decahydronaphthyl group (bicyclo[4,4,0]decyl group) and the like, and a cycloalkyl group having 3 to 6 carbon atoms and optionally having a side chain is still more preferred.

Of the examples of $R^2$, as the aryl group having 6 to 30 carbon atoms, an aryl group having 6 to 18 carbon atoms is more preferred, such as phenyl group, naphthyl group, azulenyl group, biphenyl group, anthracenyl group, terphenyl group, phenanthrenyl group, triphenylenyl group, chrysenyl group, pyrenyl group, tetracenyl group and the like, and an aryl group having 6 to 12 carbon atoms is still more preferred.

Of the examples of $R^1$, as the arylalkyl group having 7 to 30 carbon atoms, an arylalkyl group having 7 to 15 carbon atoms is more preferred, such as benzyl group, phenethyl group (2-phenylethyl group), 9-fluorenyl group, naphthylmethyl group, 1-tetralinyl group, and the like, and an arylalkyl group having 7 to 1.0 carbon atoms is still more preferred.

Of the examples of $R^1$, as the alkylaryl group having 7 to 30 carbon atoms, an alkylaryl group having 7 to 20 carbon atoms is preferred, such as tolyl group, xylyl group, ethylphenyl group, propylphenyl group, butylphenyl group, pentylphenyl group, hexylphenyl group, heptylphenyl group, octylphenyl group, nonylphenyl group, decylphenyl group, undecylphenyl group, dodecylphenyl group, and the like, and an alkylaryl group having 7 to 15 carbon atoms is more preferred, such as tolyl group, xylyl group, ethylphenyl group, propylphenyl group, butylphenyl group, pentylphenyl group and the like.

Of them, methyl group, ethyl group, n-propyl group, n-butyl group, isopropyl group, isobutyl group, t-butyl group, cyclohexyl group, phenyl group, benzyl group and the like are more preferred, and $R^1$ is more preferably t-butyl group.

$R^2$, $R^3$ and $R^4$ each independently represent (i) hydrogen, (ii) a halogen, (iii) a specific group optionally having one selected from the group consisting of a heteroatom and a group containing a heteroatom, or (iv) a heteroatom-containing substituent group.

As the (ii) halogen, examples include fluorine atom, chlorine atom, bromine atom and iodine atom. Of them, fluorine atom is preferred.

As the heteroatom used in the (iii), examples include oxygen, nitrogen, phosphorus, sulfur, selenium, silicon, halogen and boron. Of these heteroatoms, fluorine and chlorine are preferred.

As the "groups containing a heteroatom" used in the (iii), in particular, there may be mentioned groups similar to the (iv) heteroatom-containing substituent group described below. As the "groups containing a heteroatom", alkoxy group ($OR^9$), ester group ($CO_2R^9$) and the like are provided. $R^9$ is as described below.

For the (iii), the total number of carbon atoms of the substituent groups corresponding to $R^2$ to $R^4$, is preferably from 1 to 30, more preferably from 2 to 25, and still more preferably from 4 to 20.

In light of the above, the (iii) "specific group optionally having one selected from the group consisting of a heteroatom and a group containing a heteroatom" means (iii-A) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, and an alkylaryl group having 7 to 30 carbon atoms, (iii-B) a group in which one or two or more of the heteroatoms are bound to each of the groups in the (iii-A) by substitution, (iii-C) a group in which one or two or more of the above-mentioned "groups containing a heteroatom" are bound to each of the groups in the (iii-A) by substitution, and (iii-D) a group in which one or two or more of the above-mentioned heteroatoms and one or two or more of the above-mentioned "groups containing a heteroatom" are bound to each of the groups in the (iii-A) by substitution. For the (iii-C), examples include an alkyl group to which an alkoxy group is bound by substitution, and an aryl group to which an ester group is bound by substitution, and the like.

In particular, the (iv) heteroatom-containing substituent group means $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ and an epoxy-containing group. $R^8$ represents hydrogen or a hydrocarbon group having 1 to 20 carbon atoms. $R^9$ represents a hydrocarbon group having 1 to 20 carbon atoms. M' represents an alkali metal, an alkaline earth metal, ammonium, quaternary ammonium or phosphonium. Also, x represents an integer of from 0 to 3, and y represents an integer of from 0 to 2.

It is preferable that $R^2$, $R^3$ and $R^4$ each independently represent (i) hydrogen atom; (ii) fluorine atom, chlorine atom, bromine atom; (iii) methyl group, ethyl group, isopropyl group, butyl group, phenyl group, trifluoromethyl group, pentafluorophenyl group, naphthyl group, anthracenyl group; (iv) methoxy group, ethoxy group, phenoxy group, nitrile group, trimethylsilyl group, triethylsilyl group, dimethylphenylsilyl group, trimethoxysilyl group, triethoxysilyl group, trimethylsilyloxy group, trimethoxysiloxy group, cyclohexylamino group, sodium sulfonate, potassium sulfonate, sodium phosphate, potassium phosphate, etc.

Of them, particularly preferred are (i) hydrogen atom; (iii) methyl group, isobutyl group, tert-butyl group (t-butyl group), sec-butyl group, pentafluorophenyl group; and (iv) methoxy group, trimethylsilyl group, trimethylsilyloxy group, cyclohexylamino group, etc. Especially, $R^3$ is preferably hydrogen, methyl group or t-butyl group, and $R^3$ is more preferably hydrogen or t-butyl group.

A plurality of groups appropriately selected from $R^2$, $R^3$ and $R^4$ optionally bind to each other to form an alicyclic ring, an aromatic ring, or a heterocyclic ring containing a heteroatom selected from the group consisting of oxygen, nitrogen and sulfur. In this case, the number of ring members is 5 to 8, and the ring optionally has a substituent group thereon.

A plurality of groups contained in $R^2$ may bind to each other to form a ring on $R^2$. The same applies even when any of $R^3$ and $R^4$ contains a plurality of groups.

$R^5$ and $R^6$ each independently represent a linear alkyl group having 4 to 6 carbon atoms, a secondary alkyl group having 4 to 6 carbon atoms, a tertiary alkyl group having 4 to carbon atoms, or an alkenyl group having 4 to 6 carbon atoms, each of the groups optionally having one selected from the group consisting of a heteroatom and a group containing a heteroatom. In the present disclosure, both the secondary alkyl group and the tertiary alkyl group encompass an alkyl group having an alicyclic ring.

$R^5$ and $R^6$ are located in the neighborhood of the metal M and affects M with steric and/or electronic interaction. To have such effect, $R^5$ and $R^6$ preferably have a branched structure within the ranges of the aforementioned carbon numbers. The branched structure as used herein encompasses a cyclic structure.

Of the examples of $R^5$ and $R^6$, as the linear alkyl group having 4 to 6 carbon atoms, n-propyl group, n-butyl group, n-pentyl group and n-hexyl group are provided. Of them, a linear alkyl group having 4 to 5 carbon atoms is preferred.

Of the examples of $R^5$ and $R^6$, as the secondary alkyl group having 4 to 6 carbon atoms, isopropyl group, isobutyl group, pentane-2-yl group, pentane-3-yl group, 3-methyl-2-pentyl group, 2-methyl-3-pentyl group, 2-methylcyclopentyl group, 3-methylcyclopentyl group, cyclohexyl group and the like are provided. Of them, a secondary alkyl group having 4 to 5 carbon atoms is preferred.

Of the examples of $R^5$ and $R^6$, as the tertiary alkyl group having 4 to 6 carbon atoms, tert-butyl group (t-butyl group), t-pentyl group (1,1-dimethylpropyl group), 2-methyl-2-pentyl group, 3-methyl-3-pentyl group, t-hexyl group (1,1-dimethylbutyl group), 1,2-dimethylcyclobutyl group, 1-methylcyclopentyl group and the like are provided. Of them, a tertiary alkyl group having 4 to 5 carbon atoms is preferred.

Of the examples of $R^5$ and $R^6$, as the alkenyl group having 4 to 6 carbon atoms, butenyl group, pentenyl group and hexenyl group are provided. Of them, an alkenyl group having 4 to 5 carbon atoms is preferred.

Of them, particularly preferred are tert-butyl group (t-butyl group), t-pentyl group (1,1-dimethylpropyl group), 2-methyl-2-pentyl group, 3-methyl-3-pentyl group, 1-methylcyclopentyl group and the like. Of them, it is preferable that any one of re and $R^6$ is a t-butyl group, and it is more preferable that both $R^5$ and $R^6$ are t-butyl groups.

As the heteroatom used as $R^5$ and $R^6$, examples include oxygen, nitrogen, phosphorus, sulfur, selenium, silicon, halogen and boron. Of these heteroatoms, fluorine and chlorine are preferable. Also, groups containing these heteroatoms include: oxygen-containing groups including alkoxy group, aryloxy group, acyl group and ester group; nitrogen-containing groups including amino group and amide group; sulfur-containing groups including thioalkoxy group and thioaryloxy group; phosphorus-containing substituent groups including phosphino group; selenium-containing groups including selenyl group; silicon-containing groups including trialkylsilyl group, dialkylarylsilyl group and alkyldiarylsilyl group; fluorine-containing groups including fluoroalkyl group and fluoroaryl group; and boron-containing groups including alkylboron group and arylboron group. Of these heteroatom-containing groups, alkoxy group or aryloxy group is most preferable.

As the heteroatom contained in the aforementioned heteroatom-containing group, one capable of coordinating to a transition metal is preferable. Specific examples of the heteroatom-containing group containing such a heteroatom, that is capable of coordinating to a transition metal, include the following groups.

That is, there may be mentioned oxygen-containing groups including alkoxy groups such as methoxy group, ethoxy group, n-propoxy group, isopropoxy group, n-butoxy group and t-butoxy group, aryloxy groups such as phenoxy group, p-methylphenoxy group and p-methoxyphenoxy group, acyl groups such as acetyl group and benzoyl group, and ester groups such as acetoxy group, carboxyethyl group, carboxy t-butyl group and carboxyphenyl group; nitrogen-containing groups including dialkylamino groups such as dimethylamino group, diethylamino group, di-n-propylamino group and cyclohexylamino group; sulfur-containing groups including thioalkoxy groups such as thiomethoxy group, thioethoxy group, thio-n-propoxy group, thioisopropoxy group, thio-n-butoxy group, thio-t-butoxy group and thiophenoxy group, and thioaryloxy groups such as p-methylthiophenoxy group and p-methoxythiophenoxy group; phosphorus-containing substituent groups including dialkylphosphino groups such as dimethylphosphino group, diethylphosphino group, di-n-propylphosphino group and cyclohexylphosphino group; and selenium-containing groups including selenyl groups such as methylselenyl group, ethylselenyl group, n-propylselenyl group, n-butylselenyl group, t-butylselenyl group and phenylselenyl group.

E¹ represents phosphorus, arsenic or antimony. Of them, E¹ is preferably phosphorus.

X¹ represents oxygen or sulfur. Of them, X¹ is preferably oxygen.

Z represents hydrogen or a leaving group. Specific examples of Z include hydrogen atom, $R^9SO_2$ group (where $R^9$ is as aforementioned), $CF_3SO_2$ group and the like.

Also, m represents the valence of Z.

The general formula [II] is shown in the form of anion. As the countercation thereof, any cation can be used, so long as the cation does not inhibit the reaction with the transition metal compound of the present disclosure. Specific examples of the countercation include ammonium, quaternary ammonium or phosphonium, and metal ions of 1st to 14th groups of the periodic table. Of these cations, $NH_4^+$, $R^9{}_4N^+$ (where $R^9$ is as aforementioned, and four $R^9$s may be the same as or different from each other (the same shall apply hereinafter)), $R^9{}_4P^+$, $Li^+$, $Na^+$, $K^+$, $Mg^{2+}$, $Ca^{2+}$ and $Al^{3+}$ are preferable, and $R^9{}_4N^+$, $Li^+$, $Na^+$ and $K^+$ are more preferable.

The following Table 3-1 shows specific combinations of the substituent groups in the general formulae [I] and [II] in the present disclosure. Z and m relate to the general formula [I] only. However, specific examples are not limited to the following examples.

The compounds represented by the general formulae [I] and [II] can be synthesized by a known synthesis method.

The metal complex of the present disclosure represented by the following general formula [III] is included in the reaction product between the compound represented by the general formula [I] or [II] and the transition metal compound containing the transition metal belonging to 9th, 10th or 11th group in the periodic table. However, as described above, the structure of the metal complex obtained by the production method is not limited to the structure represented by the general formula [III].

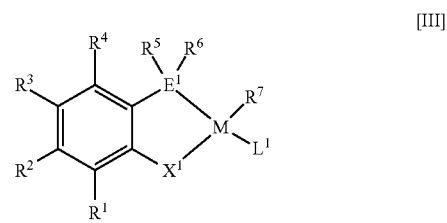

[III]

In the general formula [III], R¹ to R⁶, E¹ and X¹ are as described above. As just described, there are similarities

TABLE 3-1

| | Phenol o-position | Phenol p-position | | | Substituent groups on E1 | | | | | |
|---|---|---|---|---|---|---|---|---|---|---|
| Compound No. | R1 | R2 | R3 | R4 | R5 | R6 | E1 | X1 | Z | m |
| 1 | methyl | hydrogen | hydrogen | hydrogen | t-butyl | t-butyl | phosphorus | oxygen | hydrogen | 1 |
| 2 | ethyl | hydrogen | hydrogen | hydrogen | t-butyl | t-butyl | phosphorus | oxygen | hydrogen | 1 |
| 3 | n-propyl | hydrogen | hydrogen | hydrogen | t-butyl | t-butyl | phosphorus | oxygen | hydrogen | 1 |
| 4 | isopropyl | hydrogen | hydrogen | hydrogen | t-butyl | t-butyl | phosphorus | oxygen | hydrogen | 1 |
| 5 | n-butyl | hydrogen | hydrogen | hydrogen | t-butyl | t-butyl | phosphorus | oxygen | hydrogen | 1 |
| 6 | isobutyl | hydrogen | hydrogen | hydrogen | t-butyl | t-butyl | phosphorus | oxygen | hydrogen | 1 |
| 7 | t-butyl | hydrogen | hydrogen | hydrogen | t-butyl | t-butyl | phosphorus | oxygen | hydrogen | 1 |
| 8 | phenyl | hydrogen | hydrogen | hydrogen | t-butyl | t-butyl | phosphorus | oxygen | hydrogen | 1 |
| 9 | cyclohexyl | hydrogen | hydrogen | hydrogen | t-butyl | t-butyl | phosphorus | oxygen | hydrogen | 1 |
| 10 | benzyl | hydrogen | hydrogen | hydrogen | t-butyl | t-butyl | phosphorus | oxygen | hydrogen | 1 |
| 11 | t-butyl | hydrogen | t-butyl | hydrogen | t-butyl | t-butyl | phosphorus | oxygen | hydrogen | 1 |
| 12 | phenyl | hydrogen | t-butyl | hydrogen | t-butyl | t-butyl | phosphorus | oxygen | hydrogen | 1 |
| 13 | cyclohexyl | hydrogen | t-butyl | hydrogen | t-butyl | t-butyl | phosphorus | oxygen | hydrogen | 1 |
| 14 | benzyl | hydrogen | t-butyl | hydrogen | t-butyl | t-butyl | phosphorus | oxygen | hydrogen | 1 |
| 15 | phenyl | hydrogen | hydrogen | hydrogen | t-penyl | t-penyl | phosphorus | oxygen | hydrogen | 1 |
| 16 | phenyl | hydrogen | hydrogen | hydrogen | 2-methyl-2-pentyl | 2-methyl-2-pentyl | phosphorus | oxygen | hydrogen | 1 |
| 17 | phenyl | hydrogen | hydrogen | hydrogen | 3-methyl-3-pentyl | 3-methyl-3-pentyl | phosphorus | oxygen | hydrogen | 1 |
| 18 | phenyl | hydrogen | Hydrogen | Hydrogen | 1-methylcyclopentyl | 1-methylcyclopentyl | phosphorus | oxygen | hydrogen | 1 |

For understanding the structures of the compounds, the structural formula and name of the compound 7 listed in the above Table 3-1 are shown. The compound represented by the structural formula will be referred to as 2-(di-t-butylphosphanyl)-6-t-butylphenol.

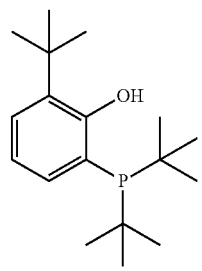 [SMILES: CC(C)(C)c1cccc(P(C(C)(C)C)C(C)(C)C)c1O]

between the complex structure of the metal complex in the reaction product and that of the metal complex represented by the general formula [III], in terms of the main skeleton containing a benzene ring and these substituent groups (R¹ to R⁶, E¹ and X¹).

Hereinafter, M, R⁷ and L¹ in the general formula [III] will be described.

In the present disclosure, M is a transition metal belonging to 9th, 10th or 11th group in the periodic table. M is preferably nickel, palladium and platinum in 10th group, cobalt and rhodium in 9th group, and copper in 11th group, more preferably nickel, palladium and platinum in 10th group, and most preferably nickel or palladium in 10th group.

The valence of M is preferably divalent. The valence of M means a formal oxidation number used in the organometallic chemistry. That is, when an electron pair in a band in which certain elements are involved is assigned to an element having greater electronegativity, valence means a number of charge remaining on an atom of the element. For example, in the general formula [III] of the present disclosure, when $E^1$ is phosphorus; $X^1$ is oxygen; M is nickel; $R^7$ is phenyl group; $L^1$ is pyridine; and nickel forms bonds with phosphorus, oxygen, carbon of the phenyl group and nitrogen of pyridine, the formal oxidation number of nickel, that is, the valence of nickel becomes divalent. The reason is as follows: according to the above-described definition, in these bonds, electron pairs are assigned to phosphorus, oxygen, carbon and nitrogen which have greater electronegativity than nickel, and charge becomes 0 for phosphorus, −1 for oxygen, −1 for phenyl group, and 0 for pyridine, and the complex is electrically neutral as a whole; therefore, charge remaining on nickel becomes +2.

As a divalent transition metal, for example, nickel (II), palladium (II), platinum (II), and cobalt (II) are preferable. As a transition metal other than divalent one, copper (I) or rhodium (III) is also preferable.

In the present disclosure, $R^7$ represents a hydrogen atom or a hydrocarbon group having 1 to 20 carbon atoms and optionally having one selected from the group consisting of a heteroatom and a group containing a heteroatom. Polymerization or copolymerization in the present disclosure is considered to be initiated by inserting the component (a) or component (b) of the present disclosure into the bond of M and $R^7$. Therefore, when the number of carbon atoms of $R^7$ is excessively large, this initiation reaction tends to be inhibited. For this reason, the number of carbon atoms of $R^7$ excluding carbon atoms contained in substituent group, is preferably from 1 to 16, and more preferably from 1 to 10.

Specific examples of $R^7$ include hydride group, methyl group, ethyl group, n-propyl group, isopropyl group, n-butyl group, isobutyl group, n-hexyl group, n-octyl group, n-decyl group, n-dodecyl group, cyclopentyl group, cyclohexyl group, benzyl group, phenyl group, p-methylphenyl group, trimethylsilyl group, triethylsilyl group, triphenylsilyl group and the like.

In the present disclosure, represents a ligand coordinated to M. The ligand $L^1$ in the present disclosure is a hydrocarbon compound having 1 to 20 carbon atoms and having oxygen, nitrogen or sulfur as an atom capable of forming a coordination bond. Also, as $L^1$, a hydrocarbon compound having a carbon-carbon unsaturated bond (and optionally containing a heteroatom) capable of forming a coordination bond with a transition metal, can be used. The number of carbon atoms of $L^1$ is preferably from 1 to 16, and more preferably from 1 to 10. Also, as $L^1$ forming a coordination bond with M in the general formula [III], a compound having no charge is preferable.

In the present disclosure, preferred as $L^1$ are cyclic unsaturated hydrocarbons, phosphines, pyridines, piperidines, alkylethers, arylethers, alkylarylethers, cyclic ethers, alkylnitrile derivative, arylnitrile derivative, alcohols, amides, aliphatic esters, aromatic esters, amines and the like. More preferred as $L^1$ are cyclic olefins, phosphines, pyridines, cyclic ethers, aliphatic esters, aromatic esters and the like. Particularly preferred as $L^1$ are trialkylphosphine, pyridine, lutidine (dimethylpyridine), picoline (methylpyridine) and $R^9CO_2R^8$ (definitions of $R^8$ and $R^9$ are as described above).

$R^7$ and $L^1$ may bind to each other to form a ring. Such an example is cycloocta-1-enyl group, and this group is also a preferable embodiment in the present disclosure.

The following Table 3-2 shows specific combinations of the substituent groups in the general formula [III] in the present disclosure. However, specific examples are not limited to the following examples.

TABLE 3-2

| Complex No. | Phenol o-position R1 | R2 | Phenol p-position R3 | R4 | Substituent groups on E1 R5 |
|---|---|---|---|---|---|
| 1 | methyl | hydrogen | hydrogen | hydrogen | t-butyl |
| 2 | ethyl | hydrogen | hydrogen | hydrogen | t-butyl |
| 3 | n-propyl | hydrogen | hydrogen | hydrogen | t-butyl |
| 4 | isopropyl | hydrogen | hydrogen | hydrogen | t-butyl |
| 5 | n-butyl | hydrogen | hydrogen | hydrogen | t-butyl |
| 6 | isobutyl | hydrogen | hydrogen | hydrogen | t-butyl |
| 7a | t-butyl | hydrogen | hydrogen | hydrogen | t-butyl |
| 7b | t-butyl | hydrogen | hydrogen | hydrogen | t-butyl |
| 8 | phenyl | hydrogen | hydrogen | hydrogen | t-butyl |
| 9 | cyclohexyl | hydrogen | hydrogen | hydrogen | t-butyl |
| 10 | benzyl | hydrogen | hydrogen | hydrogen | t-butyl |
| 11 | t-butyl | hydrogen | t-butyl | hydrogen | t-butyl |
| 12 | phenyl | hydrogen | t-butyl | hydrogen | t-butyl |
| 13 | cyclohexyl | hydrogen | t-butyl | hydrogen | t-butyl |
| 14 | benzyl | hydrogen | t-butyl | hydrogen | t-butyl |
| 15 | phenyl | hydrogen | hydrogen | hydrogen | t-pentyl |
| 16 | phenyl | hydrogen | hydrogen | hydrogen | 2-methyl-2-pentyl |
| 17 | phenyl | hydrogen | hydrogen | hydrogen | 3-methyl-3-pentyl |
| 18 | phenyl | hydrogen | hydrogen | hydrogen | 1-methylcyclopentyl |

| Complex No. | Substituent groups on E1 R6 | E1 | X1 | M | L1 | R7 |
|---|---|---|---|---|---|---|
| 1 | t-butyl | phosphorus | oxygen | nickel |  | 1,4,5-η-COE |
| 2 | t-butyl | phosphorus | oxygen | nickel |  | 1,4,5-η-COE |
| 3 | t-butyl | phosphorus | oxygen | nickel |  | 1,4,5-η-COE |
| 4 | t-butyl | phosphorus | oxygen | nickel |  | 1,4,5-η-COE |
| 5 | t-butyl | phosphorus | oxygen | nickel |  | 1,4,5-η-COE |
| 6 | t-butyl | phosphorus | oxygen | nickel |  | 1,4,5-η-COE |
| 7a | t-butyl | phosphorus | oxygen | nickel |  | 1,4,5-η-COE |
| 7b | t-butyl | phosphorus | oxygen | nickel | Py | 4-Fluorophenyl |
| 8 | t-butyl | phosphorus | oxygen | nickel |  | 1,4,5-η-COE |
| 9 | t-butyl | phosphorus | oxygen | nickel |  | 1,4,5-η-COE |

TABLE 3-2-continued

| | | | | | |
|---|---|---|---|---|---|
| 10 | t-butyl | phosphorus | oxygen | nickel | 1,4,5-η-COE |
| 11 | t-butyl | phosphorus | oxygen | nickel | 1,4,5-η-COE |
| 12 | t-butyl | phosphorus | oxygen | nickel | 1,4,5-η-COE |
| 13 | t-butyl | phosphorus | oxygen | nickel | 1,4,5-η-COE |
| 14 | t-butyl | phosphorus | oxygen | nickel | 1,4,5-η-COE |
| 15 | t-pentyl | phosphorus | oxygen | nickel | 1,4,5-η-COE |
| 16 | 2-methyl-2-pentyl | phosphorus | oxygen | nickel | 1,4,5-η-COE |
| 17 | 3-methyl-3-pentyl | phosphorus | oxygen | nickel | 1,4,5-η-COE |
| 18 | 1-methylcyclopentyl | phosphorus | oxygen | nickel | 1,4,5-η-COE |

For understanding the structures of the metal complexes, the structural formula and name of the complex 7a listed in the above Table 3-2 are shown. The compound represented by the structural formula will be referred to as (2-(di-t-butylphosphanyl)-6-t-butylphenylphenolate) ((1,4,5-η)-4-cyclooctene-1-yl) nickel (II)

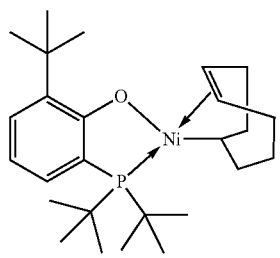

Also, compounds in which the central metal M of the compounds listed in Table 3-2 is changed from nickel to palladium, are exemplified.

As for the transition metal compound used in the present disclosure, those which are capable of being reacted with a compound represented by the general formula [I] or [II] to form a complex having polymerizing ability are used. They are sometimes referred to as precursor.

For example, as the transition metal compound containing nickel, bis (1,5-cyclooctadiene)nickel (0, i.e., zero), a complex represented by the general formula $Ni(CH_2CR^{13}OH_2)_2$ [where $R^{13}$ represents hydrogen atom, halogen atom, hydrocarbon group having 1 to 30 carbon atoms and optionally containing a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $P(O)(OR^8)_2M'$ or an epoxy-containing group, where $R^8$ represents a hydrocarbon group having 1 to 20 carbon atoms; $R^8$ represents a hydrogen atom or a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2)], bis(cyclopentadienyl)nickel (II), a complex represented by the general formula $Ni(CH_2SiR^{13}_3)_2L^1_2$ (where $R^{13}$ and $L^1$ are as aforementioned) a complex represented by the general formula $NiR^{13}_2L^1_2$ (where $R^{13}$ and $L^1$ are as aforementioned) or the like can be used.

Also, as the transition metal compound containing a transition metal belonging to 9th, 10th or 11th group, the general formula $MR^{13}_pL^1_q$ (where M represents a transition metal of 9th, 10th or 11th group; $R^{13}$ and $L^1$ are as described herein; and p and q are each an integer of 0 or more satisfying the valence of M) can be used.

Of these transition metal compounds, preferably used are nickel(0)bis(1,5-cyclooctadiene), $NiPhCl(PEt_3)_2$, NiPhCl $(PPh_3)_2$, NiPhCl(TMEDA) (hereinafter, TMEDA represents tetramethylethylenediamine), NiArBr(TMEDA) (where Ar is 4-fluorophenyl), a complex represented by the general formula $Ni(CH_2CR^{13}CH_2)_2$ (where $R^{13}$ is as aforementioned), a complex represented by the general formula $Ni(CH_2SiR^{13}_3)_2L^1_2$ (where $R^{13}$ and $L^1$ are as aforementioned), a complex represented by the general formula $NiR^{13}_2L^1_2$ (where $R^{13}$ and $L^1$ are as aforementioned), $Pd(dba)_2$, $Pd_2(dba)_3$, $Pd_3(dba)_4$ (where dba represents dibenzylideneacetone), $Pd(OCOCH_3)_2$ and (1,5-cyclooctadiene) Pd(methyl)(chloride).

Particularly preferred are nickel(0)bis(1,5-cyclooctadiene), $NiPhCl(PEt_3)_2$, $NiPhCl(PPh_3)_2$, NiPhCl(TMEDA), NiArBr(TMEDA) (where Ar is 4-fluorophenyl), $Ni(CH_2CHCH_2)_2$, $Ni(CH_2CMeCH_2)_2$, $Ni(CH_2SiMe_3)_2(Py)_2$ (hereinafter, Py represents pyridine), $Ni(CH_2SiMe_3)_2(Lut)_2$ (hereinafter, Lut represents 2,6-lutidine), $NiPh_2(Py)_2$, $NiPh_2(Lut)_2$, $Pd(dba)_2$, $Pd_2(dba)_3$, $Pd_3(dba)_4$ (where dba represents dibenzylideneacetone), $Pd(OCOCH_3)_2$, and (1,5-cyclooctadiene)Pd(methyl)(chloride).

The reaction product of the present disclosure can be obtained by contacting the aforementioned compound represented by the general formula [I] or [II] with the aforementioned transition metal compound [IV], for example, in a molar ratio of [I]+[II]:[IV]=[1:99] to [99:1], in an organic solvent such as toluene or benzene at 0° C. to 100° C. for 1 to 86400 seconds under reduced pressure to increased pressure. When a solution of bis(1,5-cyclooctadiene)nickel(0) $(Ni(COD)_2)$ in toluene or benzene is used as the transition metal compound, formation of the reaction product can be confirmed by change of color of the solution from yellow to, for example, red.

After the present reaction, a component which is constructing the transition metal compound but is other than the transition metal of the compound, is substituted by a part of the general formula [I] excluding Z or the compound represented by the general formula [II] to form the metal complex represented by the general formula [III] of the present disclosure. This substitution reaction preferably proceeds quantitatively; however, in some cases, it may proceed incompletely. After completion of the reaction, in addition to the complex represented by the general formula [III], other components derived from the general formulae [I] and [II] and the transition metal compound are present. These other components may be removed or left when the polymerization reaction or copolymerization reaction of the Present disclosure is carried out. Generally, these other components are preferably removed because higher activity can be obtained.

When the reaction is carried out, $L^1$ relating to the present disclosure may exist together. When nickel or palladium is used as M relating to the present disclosure, the stability of the formed complex represented by the general formula [III] is sometimes improved by coexistence of $L^1$ having a nature of Lewis base in the system. In such a case, coexistence of $L^1$ is preferable, so long as $L^1$ does not inhibit the polymerization reaction or copolymerization reaction of the present disclosure.

In the present disclosure, the reaction may be carried out in a vessel other than the reactor which is used for polymerization of α-olefin or copolymerization of α-olefin and (meth)acrylate, in advance, and then the thus-obtained complex represented by the general formula [III] may be used for polymerization of α-olefin or copolymerization of α-olefin and (meth)acrylate, or the reaction may be carried out in the presence of these monomers. Also, the reaction may be carried out in the reactor which is used for polymerization of α-olefin or copolymerization of α-olefin and (meth)acrylate. In this case, these monomers may be present or absent. As each of the components represented by the general formulae [I] and [II], a single component may be used, or plural kinds of components may be used in combination. Especially, for the purpose of broadening molecular weight distribution or comonomer content distribution, such combined use of plural kinds of components is useful.

3-2. Method for Producing Metal Complex

In the production method of the third embodiment of the present disclosure, as described above, the metal complex represented by the general formula [III] can be produced by contacting the compound represented by the general formula [I] or [II] with the transition metal compound containing the transition metal belonging to 9th, 10th or 11th Group in the periodic table.

3-3. Catalyst Component for Olefin Polymerization

The catalyst component for olefin polymerization according to the third embodiment of the present disclosure, comprises the aforementioned metal complex or a metal complex obtainable by the aforementioned production method.

In the third embodiment of the present disclosure, the metal complex represented by the general formula [III] can be used as a catalyst component for the polymerization or copolymerization. As aforementioned, the metal complex represented by the general formula [III] can be formed by reacting the general formula [I] or [II] with the transition metal complex component. When the metal complex represented by the general formula [III] is used as a catalyst component, isolated one may be used, or one supported on a carrier may be used. Such supporting may be carried out in a reactor which is used for, polymerization of α-olefin or copolymerization of α-olefin and (meth)acrylate, in the presence or the absence of these monomers, or may be carried out in a vessel other than the reactor.

As a usable carrier, any carrier can be used so long as the carrier does not impair the scope of the present disclosure. Generally, inorganic oxides and polymer carriers can be suitably used. In particular, there may be mentioned $SiO_2$, $Al_2O_3$, MgO, $ZrO_2$, $TiO_2$, $B_2O_3$, CaO, ZnO, BaO, $ThO_2$ and the like, or a mixture thereof. Also, mixed oxides such as $SiO_2$—$Al_2O_3$, $SiO_2$—$V_2O_5$, $SiO_2$—$TiO_2$, $SiO_2$—MgO and $SiO_2$—$Cr_2O_3$ can be used, and inorganic silicates, polyethylene carrier, polypropylene carrier, polystyrene carrier, polyacrylic acid carrier, polymethacrylic acid carrier, polyacrylic acid ester carrier, polyester carrier, polyamide carrier, polyimide carrier, and the like can be used. As for these carriers, particle diameter, particle diameter distribution, pore volume, specific surface area and the like are not particularly limited, and any carrier can be used.

As the inorganic silicate, clay, clay mineral, zeolite, diatomaceous earth, and the like can be used. For these substances, synthetic material may be used, or naturally occurring mineral may be used. Specific examples of clay and clay mineral include allophane group such as allophane; kaoline group such as dickite, nacrite, kaolinite and anorthite; halloysite group such as metahalloysite and halloysite; serpentine group such as chrysotile, lizardite and antigorite; smectite such as montmorillonite, sauconite, beidellite, nontronite, saponite and hectorite; vermiculite minerals such as vermiculite; mica minerals such as illite, sericite and glauconite; attapulgite; sepiolite; palygorskite; bentnite; Kibushi clay; Gaerome clay; hisingerite; pyrophyllite; and chlorite group. These substances may form a mixed layer. Artificial compounds include synthetic mica, synthetic hectorite, synthetic saponite and synthetic taeniolite. Of these specific examples, preferred are kaoline group such as dickite, nacrite, kaolinite and anorthite; halloysite group such as metahalloysite and halloysite; serpentine group such as chrysotile, lizardite and antigorite; smectite such as montmorillonite, zaukonite, beidellite, nontronite, saponite and hectorite; vermiculite minerals such as vermiculite; mica minerals such as illite, sericite and glauconite; synthetic mica; synthetic hectorite; synthetic saponite; and synthetic taeniolite. Particularly preferred are smectite such as montmorillonite, zaukonite, beidellite, nontronite, saponite and hectorite; vermiculite minerals such as vermiculite; synthetic mica; synthetic hectorite; synthetic saponite; and synthetic taeniolite.

These carriers may be used as they are, or may be subjected to acid treatment with hydrochloric acid, nitric acid, sulfuric acid or the like, and/or salts treatment with LiCl, NaCl, KCl, $CaCl_2$, $MgCl_2$, $Li_2SO_4$, $MgSO_4$, $ZnSO_4$, $Ti(SO_4)_2$, $Zr(SO_4)_2$, $Al_2(SO_4)_3$ or the like. The treatment may be carried out by mixing corresponding acid and base to form a salt in the reaction system. Also, shape control such as pulverization and granulation or drying treatment may be carried out.

3-4. Catalyst for Olefin Polymerization

The catalyst for olefin polymerization according to the third embodiment of the present disclosure, comprises the following components (A) and (B) and, as needed, the following component (C):

the component (A): the aforementioned metal complex or a metal complex obtainable by the aforementioned production method the component (B): a compound reactive with the component (A) to form an ion pair, or an ion-exchange layered silicate the component (C): an organoaluminum compound.

The component (A) is the aforementioned metal complex or a metal complex obtainable by the aforementioned production method. One kind of metal complex may be used alone, or two or more kinds of metal complexes may be used in combination.

An example of the component (B) is an organoaluminum oxy compound. The organoaluminum oxy compound has an Al—O—Al bond in molecule, and the number of the bonds is in a range of generally from 1 to 100, and preferably from 1 to 50. Such an organoaluminum oxy compound is generally a product obtainable by reacting an organoaluminum compound with water.

The reaction of organoaluminum with water is generally carried out in inert hydrocarbon (solvent). As the inert hydrocarbon, aliphatic hydrocarbon, alicyclic hydrocarbon and aromatic hydrocarbon such as pentane, hexane, heptane, cyclohexane, methyl cyclohexane, benzene, toluene and xylene can be used. Aliphatic hydrocarbon or aromatic hydrocarbon are preferably used.

As the organoaluminum compound used for preparation of the organoaluminum oxy compound, compounds represented by the following general formula are usable. Trialkylaluminum is preferably used.

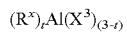

(where $R^x$ represents a hydrocarbon group such as alkyl group, alkenyl group, aryl group and aralkyl group each having 1 to 18 carbon atoms, preferably 1 to 12 carbon atoms; $X^3$ represents hydrogen atom or halogen atom; and t represents an integer of $1 \leq t \leq 3$.)

The alkyl group in the trialkylaluminum may be any of methyl group, ethyl group, propyl group, isopropyl group, butyl group, isobutyl group, pentyl group, hexyl group, octyl group, decyl group, dodecyl group and the like. Preferred are methyl group and isobutyl group, and particularly preferred is methyl group. Two or more kinds of the organoaluminum compounds can be mixed and used.

The reaction ratio of the water and the organoaluminum compound (the molar ratio of water/Al) is preferably from 0.25/1 to 1.2/1, and particularly preferably from 0.5/1 to 1/1. The reaction temperature is generally in a range of from −70° C. to 100° C., and preferably from −20° C. to 20° C. The reaction time is generally selected in a range of from 5 minutes to 24 hours, and preferably from 10 minutes to 5 hours. As the water required for the reaction, not only simple water but also hydrated water contained in copper sulfate hydrate, aluminum sulfate hydrate or the like, and a component that can produce water in the reaction system, can be used.

Of the aforementioned organoaluminum oxy compounds, one that is obtainable by reaction of alkylaluminum and water is generally referred to as aluminoxane. Methylaluminoxane (including those substantially composed of methylaluminoxane (MAO)) is particularly preferred as the organoaluminum oxy compound. Dried methylaluminoxane (DMAO) in a solid form, which is obtained by removing a solvent out of a MAO solution, is also preferred.

As the organoaluminum oxy compound, two or more kinds of the aforementioned organoaluminum oxy compounds can be used in combination, or a solution of the organoaluminum oxy compound dissolved or dispersed in, the aforementioned inert hydrocarbon solvent, may be used.

A specific example of the component (B) is ion-exchange layered silicate. The ion-exchange layered silicate (hereinafter may be simply referred to as "silicate") is a silicate compound having a crystal structure in which planes formed by ion bonding or the like are positioned in parallel to each other and stacked by binding force, and ions contained therein are exchangeable. As the silicate, various kinds of silicates are known, and the silicate is described in detail in "Nendo Kobutsu Gaku", Haruo SHIROZU, Asakura Publishing Co., Ltd. (1995).

In the present disclosure, as the component (B), those belonging to the smectite group are preferably used. Specific examples thereof include montmorillonite, sauconite, beidellite, nontronite, saponite, hectorite, stevensite and the like. Of them, montmorillonite is preferred from the viewpoint of increasing the polymerization activity and molecular weight of the copolymer part.

Most silicates are mainly produced as a major component of natural cray minerals. Therefore, foreign substances (such as quartz and cristobalite) other than the ion-exchange layered silicate are often contained. Foreign substances may be contained in the silicate of the smectite group used in the present disclosure.

The silicate may be subjected to acid treatment and/or salts treatment. The treatment may be carried out by mixing corresponding acid and base to form a salt in the reaction system.

As the component (B), a mixture of the aforementioned organoaluminum oxy compound and the ion-exchange layered silicate may be used. Also, as the organoaluminum oxy compound and ion-exchange layered silicate, one kind of compound and silicate or two or more kinds of compounds and silicates may be used.

An examples of the organoaluminum compound used as the component (C) is represented by the following general formula:

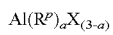

where $R^p$ represents a hydrocarbon group having 1 to 20 carbon atoms; X represents hydrogen, halogen, alkoxy group or siloxy group; and a is a number that is more than 0 and equal to or less than 3.

Specific examples of the organoaluminum compound represented by the general formula include trialkylaluminum such as trimethylaluminum, triethylaluminum, tripropylaluminum, triisobutylaluminum and the like, and halogen- or alkoxy-containing alkylaluminum such as diethylaluminum monochloride, diethylaluminum monomethoxide and the like.

Of them, triisobutylaluminum is preferred. Also, two or more kinds of the aforementioned organoaluminum compounds may be used in combination. Also, the aforementioned aluminum compound may be modified with alcohol, phenol or the like for use. As the modifiers, methanol, ethanol, 1-propanol, isopropanol, butanol, phenol, 2,6-dimethylphenol, 2,6-di-t-butylphenol and the like are exemplified. Preferred specific examples are 2,6-dimethylphenol and 2,6-di-t-butylphenol.

In the method for preparing the catalyst for olefin polymerization according to the third embodiment of the present disclosure, the method for contacting the component (A), the component (B) and, as needed, the component (C) is not particularly limited. For example, the following methods can be provided.

Method (i): The component (A) and the component (B) are contacted with each other, and then the component (C) is added.

Method (ii): The component (A) and the component (C) are contacted with each other, and then the component (B) is added.

Method (iii): The component (B) and the component (C) are contacted with each other, and then the component (A) is added.

Method (iv): The components (A), (B) and (C) are contacted with each other at the same time.

Also, each component may be used as a mixture by mixing it with different kinds of components or may be separately contacted in a different order. The contacting may be carried out not only at the time of catalyst preparation, but also at the time of preliminary polymerization using olefin or at the time of polymerization of olefin.

Also, one component may be divided and contacted with each component, for example, in such a manner that the component (B) and the component (C) are contacted with each other, and then a mixture of the component (A) and the component (C) is added.

The contacting of the components (A), (B) and (C) is preferably carried out in an inert gas atmosphere such as nitrogen and the like and in an inert hydrocarbon solvent such as pentane, hexane, heptane, toluene, xylene and the like. The contacting may be carried out at a temperature between −20° C. and the boiling point of the solvent, and it is particularly preferably carried out at a temperature between room temperature and the boiling point of the solvent.

3-5. Method for Producing α-Olefin Polymer

An embodiment of the method for producing the α-olefin polymer of the third embodiment of the present disclosure, is polymerization or copolymerization of (a) an α-olefin in the presence of the catalyst for polymerization.

The component (a) in the present disclosure is α-olefin represented by the general formula $CH_2=CHR^{10}$. $R^{10}$ is hydrogen atom or hydrocarbon group having 1 to 20 carbon atoms, which may have branch, ring and/or unsaturated bond. When the number of carbon atoms of $R^{10}$ is larger than 20, polymerization activity tends to be less expressed. For this reason, of them, α-olefins in which $R^{10}$ is hydrogen atom or hydrocarbon group having 1 to 10 carbon atoms, are preferred as the components (a).

Those more preferred as the component (a) include ethylene, propylene, 1-butene, 1-pentene, 1-hexene, 1-octene, 1-decene, 3-methyl-1-butene, 4-methyl-1-pentene, vinylcyclohexane and styrene. As the component (a), a single component may be used, or plural kinds of components may be used in combination.

In the method for producing the α-olefin polymer and the method for producing the α-olefin copolymer of the present disclosure, the (a) α-olefin is particularly preferably propylene.

Another embodiment of the method for producing the α-olefin polymer of the present disclosure is copolymerization of (a) an α-olefin and (b) a (meth)acrylic acid ester monomer, vinyl monomer or allyl monomer in the presence of the aforementioned catalyst for polymerization.

The (meth)acrylic acid ester monomer in the present disclosure is represented by the general formula $CH_2=C(R^{11})CO_2(R^{12})$. $R^{11}$ is hydrogen atom or hydrocarbon group having 1 to 10 carbon atoms, which may have branch, ring and/or unsaturated bond. $R^{12}$ is hydrocarbon group having 1 to carbon atoms, which may have branch, ring and/or unsaturated bond. Also, $R^{12}$ may contain a heteroatom at any position therein.

When the number of carbon atoms of $R^{11}$ is 11 or more, polymerization activity tends to be less expressed. Therefore, $R^{11}$ is hydrogen atom or hydrocarbon group having 1 to 10 carbon atoms, and preferable (meth)acrylic acid esters include one in which $R^{11}$ is hydrogen atom or hydrocarbon group having 1 to 5 carbon atoms. More preferable (meth) acrylic acid ester monomers include methacrylate in which $R^{11}$ is methyl group or acrylate in which $R^{11}$ is hydrogen atom. Similarly, when the number of carbon atoms of $R^{12}$ is larger than 30, polymerization activity tends to be less expressed. Therefore, the number of carbon atoms of $R^{12}$ is from 1 to 30, preferably from 1 to 12, and more preferably from 1 to 8.

Also, as the heteroatom optionally contained in $R^{12}$, oxygen, sulfur, selenium, phosphorus, nitrogen, silicon, fluorine, boron and the like are provided. Of these heteroatoms, oxygen, silicon and fluorine are preferable, and oxygen is more preferable. In addition, $R^{12}$ containing no heteroatom is also preferable.

Still more preferable (meth)acrylic acid ester monomers include methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, pentyl (meth)acrylate, hexyl (meth)acrylate, cyclohexyl (meth)acrylate, octyl (meth)acrylate, 2-ethylhexyl (meth) acrylate, nonyl (meth)acrylate, decyl (meth)acrylate, dodecyl (meth)acrylate, phenyl (meth)acrylate, toluoyl (meth)acrylate, benzyl (meth)acrylate, hydroxyethyl (meth) acrylate, dimethylaminoethyl (meth)acrylate, diethylaminoethyl (meth)acrylate, (meth)acrylate-2-aminoethyl, (meth) acrylate-2-methoxyethyl, (meth)acrylate-3-methoxypropyl, glycidyl (meth)acrylate, ethyleneoxide (meth)acrylate, trifluoromethyl (meth)acrylate, 2-trifluoromethylethyl (meth) acrylate, perfluoroethyl (meth)acrylate, (meth)acrylamide, (meth)acryldimethylamide, 2-hydroxybutyl (meth)acrylate, 4-hydroxybutyl (meth)acrylate, and the like. A (meth)acrylic acid ester may be used alone, or a plurality of (meth)acrylic acid esters may be used in combination.

The vinyl monomer in the present disclosure is a vinyl monomer containing polar group, such as halogen-containing, nitrogen-containing, oxygen-containing and sulfur-containing vinyl monomers. In particular, it is a vinyl monomer containing halogen, hydroxyl group, amino group, nitro group, carboxyl group, formyl group, ester group, epoxy group, nitrile group or the like. Specific examples thereof include 5-hexene-1-ol, 2-methyl-3-butene-1-ol, ethyl 10-undecenoate, 10-undecene-1-ol, 12-tridecene-2-ol, 10-undecanoic acid, methyl-9-decenate, t-butyl-10-undecenate, 1,1-dimethyl-2-propene-1-ol, 9-decene-1-ol, 3-butenoic acid, 3-butene-1-ol, N-(3-butene-1-yl)phthalimide, 5-hexenoic acid, methyl 5-hexenoate, 5-hexene-2-one, acrylonitrile, methacrylonitrile, vinyl acetate, and the like. Of them, 3-butene-1-ol, ethyl 10-undecenoate and 10-undecene-1-ol are particularly preferred.

As the allyl monomer in the present disclosure, examples include an allyl monomer having 3 carbon atoms (propenyl monomer) and an allyl-based monomer which is an allyl group containing monomer having 4 or more carbon atoms. The allyl monomer is an allyl monomer containing polar group, such as halogen-containing, nitrogen-containing, oxygen-containing and sulfur-containing allyl monomers. In particular, it is an allyl monomer containing halogen, hydroxyl group, amino group, nitro group, carboxyl group, formyl group, ester group, epoxy group, nitrile group or the like. Preferred specific examples thereof include allyl acetate, allyl alcohol, allylamine, N-allylaniline, N-t-butoxycarbonyl-N-allylamine, N-benzyloxycarbonyl-N-allylamine, N-allyl-N-benzylamine, allyl chloride, allyl bromide, allyl ether, diallyl ether, and the like. Of them, allyl acetate and allyl alcohol are more preferred, and allyl acetate, allyl ether and diallyl ether are still more preferred.

The polymerization reaction in the present disclosure is carried out in the presence or the absence of a liquid which may be: hydrocarbon solvent such as propane, n-butane, isobutane, n-hexane, n-heptane, toluene, xylene, cyclohexane, and methyl cyclohexane; or a liquefied α-olefin; or a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol and ethylene glycol. Also, a mixture of liquid compounds described here may be used as a solvent. Furthermore, ionic liquid can also be used as a solvent. The above-described hydrocarbon solvent and ionic liquid are more preferable to obtain higher polymerization activity and high molecular weight.

In the present disclosure, the polymerization reaction can be carried out in the presence or the absence of known additive. As the additive, a polymerization inhibitor to inhibit radical polymerization and an additive having an action to stabilize produced copolymer are preferable. Examples of preferable additives include quinone derivative, hindered phenol derivative and the like. Specifically, hydroquinone monomethyl ether, 2,6-di-t-butyl-4-methylphenol (BHT), reaction product of trimethylaluminium and BHT, reaction product of titanium (IV) alkoxide and BHT, and the like can be used. Also, the polymerization may be carried out in the presence of inorganic and/or organic filler by using such filler as an additive. Also, $L^1$ relating to the present disclosure or ionic liquid may be used as an additive.

Preferable additives in the present disclosure include Lewis base. By selecting appropriate Lewis base, activity, molecular weight and copolymerization reactivity of acrylate can be improved. The amount of Lewis base is from 0.0001 to 1000 equivalents, preferably from 0.1 to 100 equivalents, and more preferably from 0.3 to 30 equivalents, relative to the transition metal M in the catalyst component present in the polymerization system. The method for adding Lewis base to the polymerization system is not particularly limited, and any technique can be used. For example, Lewis base may be added by mixing with the catalyst component of the present disclosure, or may be added by mixing with the monomer, or may be added to the polymerization system independently from the catalyst component and monomer. Also, a plurality of Lewis bases may be used in combination. Also, the same Lewis base as $L^1$ relating to the present disclosure may be used, or a different Lewis base may be used.

Lewis bases include aromatic amines, aliphatic amines, alkyl ethers, aryl ethers, alkyl aryl ethers, cyclic ethers, alkyl nitriles, aryl nitriles, alcohols, amides, aliphatic esters, aromatic esters, phosphates, phosphites, thiophenes, thianthrenes, thiazoles, oxazoles, morpholines, cyclic unsaturated hydrocarbons, and the like. Of them, preferred Lewis bases are aromatic amines, aliphatic amines, cyclic ethers, aliphatic esters and aromatic esters, and particularly preferred Lewis bases are pyridine derivative, pyrimidine derivative, piperidine derivative, imidazole derivative, aniline derivative, piperidine derivative, triazine derivative, pyrrole derivative and furan derivative.

Specific Lewis base compounds include pyridine, pentafluoropyridine, 2,6-lutidine, 2,4-lutidine, 3,5-lutidine, pyrimidine, N,N-dimethylaminopyridine, N-methylimidazole, 2,2'-bipyridine, aniline, piperidine, 1,3,5-triazine, tris(trifluoromethyl)-1,3,5-triazine, 2,4,6-tris(2-pyridyl)-s-triazine, quinoline, 8-methylquinoline, phenazine, 1,10-phenanthroline, N-methylpyrrole, 1,8-diazabicyclo-[5.4.0]-undeca-7-ene, 1,4-diazabicyclo-[2.2.2]-octane, triethylamine, benzonitrile, picoline, triphenylamine, N-methyl-2-pyrrolidone, 4-methylmorpholine, benzoxazole, benzothiazole, furan, 2,5-dimethylfuran, dibenzofuran, xanthene, 1,4-dioxane, 1,3,5-trioxane, dibenzothiophene, thianthrene, triphenylphosphonium cyclopentadienide, triphenylphosphite, triphenylphosphate, tripyrrolizinophosphine, tris(pyrrolizino)borane, and the like.

In the present disclosure, polymerization style is not particularly limited. Slurry polymerization in which at least a part of the produced polymer takes a form of slurry in medium; bulk polymerization in which liquefied monomer itself is used as a medium; gas phase polymerization in which polymerization is carried out in a vaporized monomer; or high pressure ion polymerization in which at least a part of the produced polymer dissolves in a monomer liquefied at high temperature and high pressure; and the like are preferably used. Also, any type of batch polymerization, semi-batch polymerization and continuous polymerization may be used. Also, living polymerization or a polymerization occurring in conjunction with chain transfer may be carried out. Also, chain shuttling or coordinative chain transfer polymerization (CCTP) may be carried out by using so-called chain transfer agent (CSA) in combination.

Unreacted monomer and medium may be used by separating them from the produced copolymer and recycling them. In recycling, these monomer and medium may be reused with or without purification. For separation of the produced copolymer from unreacted monomer and medium, a hitherto known method can be used. For example, a method such as filtration, centrifugation, solvent extraction or reprecipitation with poor solvent can be used.

Polymerization temperature, polymerization pressure and polymerization time are not particularly limited. Generally, optimum setting can be done from the following ranges considering productivity and process capacity. That is, polymerization temperature can be selected from a range of generally from −20° C. to 290° C., and preferably from 0° C. to 250° C.; copolymerization pressure can be selected form a range of from 0.1 MPa to 300 MPa, and Preferably from 0.3 MPa to 250 Mpa; and polymerization time can be selected from a range of from 0.1 minute to 10 hours, preferably from 0.5 minute to 7 hours, and more preferably from 1 minute to 6 hours.

In the present disclosure, polymerization is generally carried out under an inert gas atmosphere. For example, nitrogen atmosphere, argon atmosphere or carbon dioxide atmosphere can be used, and nitrogen atmosphere is preferably used. Commingling of a small amount of oxygen or air is allowable.

Supply of the catalyst and monomer to a polymerization reactor is also not particularly limited, and various supplying methods can be employed corresponding to each purpose. For example, in the case of batch polymerization, such a technique can be employed that a predetermined amount of monomer is supplied into a polymerization reactor in advance, followed by supplying the catalyst. In this case, additional monomer or additional catalyst may be supplied to the polymerization reactor. In the case of continuous polymerization, such a technique can be employed that Predetermined amounts of monomer and catalyst are supplied to the polymerization reactor continuously or intermittently to carry out polymerization reaction continuously.

As for control of the composition of the copolymer, generally, such a method can be used that a plurality of monomers are supplied to the reactor, and a ratio of the supplied monomers is varied. In addition, a method in which the copolymerization composition is controlled by utilizing a difference in monomer reactivity ratios depending on difference in catalyst structures, and a method in which the copolymerization composition is controlled by utilizing polymerization temperature dependency of monomer reactivity ratio, are provided.

For controlling the molecular weight of the polymer, a hitherto known method can be used. That is, a method in which the molecular weight is controlled by controlling polymerization temperature, a method in which the molecular weight is controlled, by controlling monomer concentrations, a method in which the molecular weight is controlled by using a chain transfer agent, a method in which the molecular weight is controlled by controlling ligand structure in the transition metal complex, and the like are provided. When a chain transfer agent is used, a hitherto known chain transfer agent can be used. For example, hydrogen, metalalkyl, and the like can be used.

Also, when the component (b) itself works as a kind of chain transfer agent, molecular weight adjustment is possible by controlling the ratio of the component (b) to the component (a) or controlling the concentration of the component (b). When molecular weight adjustment is carried out by controlling ligand structure in the transition metal complex, such a tendency can be utilized that molecular weight is generally improved by controlling the type, number and configuration of the heteroatom-containing groups in the aforementioned $R^2$ and $R^3$, by arranging a bulky substituent group around the metal M, or by introducing a heteroatom into the aforementioned $R^6$. An electron-donating group such as aryl group and heteroatom-containing substituent group is preferably arranged so that the electron-donating group can have an interaction to the metal M. It can be generally judged whether such an electron-donating group can have an interaction with the metal M or not, by measuring a distance between the electron-donating group and the metal M using a molecule model or molecular orbital calculation.

Especially, the copolymer obtained by the present disclosure expresses superior painting characteristic, printability, antistatic performance, inorganic filler dispersibility, adhesive property to other resins, compatibility with other resins, and the like, by the effect based on the polar group of the copolymer. Utilizing such properties, the copolymer of the present disclosure can be used for various applications. For example, the copolymer can be used for film, sheet, adhesive resin, binder, compatibilizing agent, wax, and the like.

EXAMPLES

The present disclosure is explained in detail in the following Examples and Comparative Examples. However, the present disclosure is not limited thereto.

In the following Synthesis Examples, unless otherwise noted, operations were carried out under a purified nitrogen atmosphere, and dewatered and deoxygenated solvents were used.

First Embodiment of the Present Disclosure 1-1. Evaluation Method
(1) Weight Average Molecular Weight Mw, Number Average Molecular Weight Mn and Molecular Weight Distribution Mw/Mn: Determined by the Following GPC Measurement.

First, a sample (about 20 mg) was collected in a vial for the pretreatment unit PL-SP 260VS for the high temperature GPC manufactured by Polymer Laboratories Ltd, and O-Dichlorobenzene containing BHT as a stabilizer (concentration of BHT=0.5 g/L) was added thereto to adjust the polymer concentration to 0.1% by mass. The polymer was dissolved by heating at 135° C. in the above-described pretreatment unit PL-SP 260VS for the high temperature GPC, and filtered with a glass filter to prepare a sample solution. No polymer was seized by the glass filter in GPC measurement of the present disclosure. Next, GPC measurement was carried out using GPCV 2000 manufactured by Waters Corporation equipped with TSKgel GMH-HT (30 cm×4 pieces) manufactured by Tosoh Corporation as a column and RI detector. The following measuring conditions were employed: injection amount of sample solution: about 520 μL; column temperature: 135° C.; solvent: o-dichlorobenzene; and flow rate: 1.0 mL/min. Calculation of molecular weight was carried out as follows. That is, commercially available monodisperse polystyrene was used as a standard sample, and a calibration curve on retention time versus molecular weight was prepared from viscosity formulae of the polystyrene standard sample and an ethylene polymer, and calculation of molecular weight was carried out based on the calibration curve. As a viscosity formula, $[\eta]=K \times M\alpha$ was used, and K=1.38E-4, α=0.70 for polystyrene, and K=4.77E-4, α=0.70 for ethylene polymer were used. For propylene polymer, K=1.03E-4, α=0.78 were used.

1-2. Synthesis of Ligands

Synthesis Example 1-1

Synthesis of Ligand B-350

Ligand B-350 was synthesized according to the following scheme.

In chemical formulae mentioned below, —OMOM represents methoxymethoxy group (—OCH$_2$OCH$_3$).

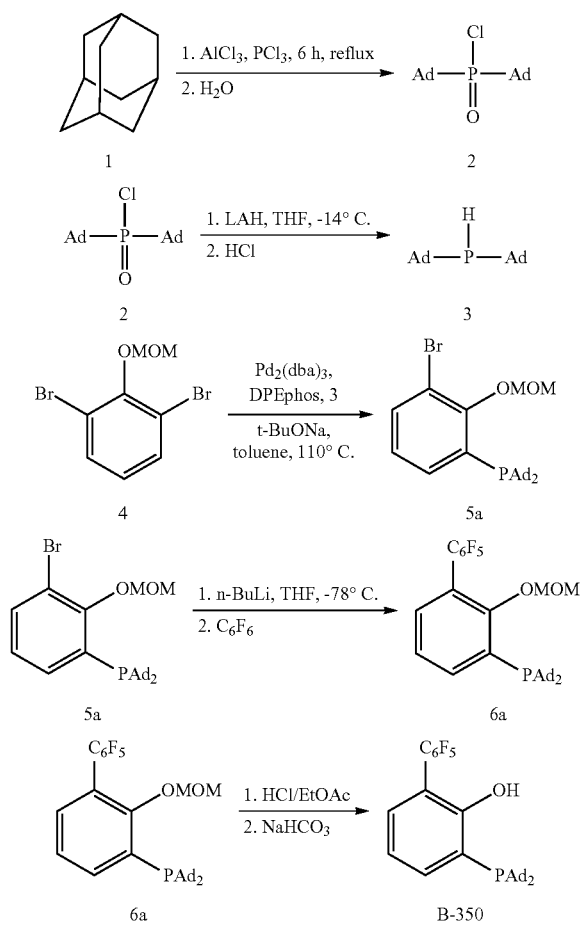

(1) Synthesis of Compound 2

Under an argon atmosphere, a mixture of compound 1 (10.0 g, 73.4 mmol), aluminum chloride (10.47 g, 78.6 mmol) and phosphorus trichloride (50.7 g, 369.2 mmol, 32.5 mL) was stirred at 80° C. for 12 hours to obtain an orange suspension. Then, excess phosphorus trichloride was removed from the suspension by distillation at atmospheric pressure and the remaining suspension was filtered through celite. A filtrate was poured into water (150 mL) and extracted with dichloromethane (150 mL×2). An organic phase was dried with anhydrous sodium sulfate and then concentrated, thereby obtaining compound 2.

(2) Synthesis of Compound 3

Aluminum hydride (3.3 g, 86.9 mmol) was added at −14° C. to a 150 mL solution of the compound 2 (13.0 g, 36.8 mmol) in THF over a period of 60 minutes. After heated to 30° C., the mixture was stirred for 12 hours to obtain a gray suspension. The suspension was cooled to −14° C., and aqueous HCl solution (1 M, 100 mL) was slowly added thereto in a dropwise manner with a syringe. Of two layers thus formed, the upper layer was separated with a separating funnel and extracted with ethyl acetate (100 mL). An organic phase was dried with anhydrous sodium sulfate and then concentrated, thereby obtaining compound 3.

(3) Synthesis of Compound 5a

Under an argon atmosphere, toluene (500 mL) was added at 30° C. to the mixture of the compound 3 (5.8 g, 19.2 mmol), the compound 4 (5.7 g, 19.2 mmol), sodium-tert-butoxide (3.7 g, 38.4 mmol), bis[2-(diphenylphosphino)phenyl]ether (DPEPhos, 2.1 g, 3.84 mmol) and tris(dibenzylideneacetone)dipalladium (1.8 g, 1.9 mmol). A reaction product was stirred at 110° C. for 12 hours to obtain a gray suspension. A reaction solution was cooled to 30° C. and filtered through celite. A filtrate was poured into water (150 mL) and extracted with ethyl acetate (150 mL×2). An organic phase was dried with anhydrous sodium sulfate and then concentrated, thereby obtaining orange residue. The residue was purified through a silica gel column (petroleum ether/ethyl acetate-0:1-50:1 as eluent) to obtain compound 5a (3.0 g, 5.8 mmol, yield 30.2%).

(4) Synthesis of Compound 6a

Under an argon atmosphere, n-butyllithium (2.5 M, 2.8 mL, 7.0 mmol) was added at −78° C. to a 20 mL solution of the compound 5a (3.0 g, 5.8 mmol) in THF. A reaction solution was stirred at −78° C. for 2 hours to obtain an orange suspension. Hexafluorobenzene (1.6 g, 8.7 mmol, 1.00 mL) was added thereto at −78° C. and stirred at 30° C. for 12 hours. A reaction solution was poured into ice-cooled saturated ammonium chloride aqueous solution and extracted with ethyl acetate (100 mL×2). An organic phase was dried with anhydrous sodium sulfate and concentrated, thereby obtaining yellow residue. The residue was purified through a silica gel column (petroleum ether:ethyl acetate=1:0-30:1 as eluent) to obtain compound 6a (1.3 g, 2.2 mmol, yield 37.1%).

(5) Synthesis of Ligand B-350

Under an argon atmosphere, HCL/ethyl acetate (4 M, 100 mL, 400.0 mmol) were added at 0° C. to the compound 6a (1.7 g, 2.8 mmol). After heated to 30° C., a reaction mixture was stirred for 20 hours to obtain, a white suspended solution. Volatiles were removed under reduced pressure to obtain a crude product. Dichloromethane (100 mL) was added thereto, and an organic phase was washed with 100 mL saturated sodium hydrogen carbonate aqueous solution. Then, the organic phase was concentrated to obtain the ligand B-350 (1.3 g, 2.4 mmol, yield 85.4%).

$^1$HNMR (400 MHz, CDCl$_3$, δ, ppm): 8.21 (s, 1H), 7.70 (d, J=7.6 Hz, 1H), 7.25 (s, 1H), 6.99 (t, J=7.6 Hz, 1H), 2.03-1.90 (m, 18H), 1.71 (s, 12H);

$^{31}$PNMR (162 MHz, CDCl$_3$, δ, ppm): −5.59 (s).

Synthesis Example 1-2

Synthesis of Ligand B-352

Ligand B-352 was synthesized according to the following scheme.

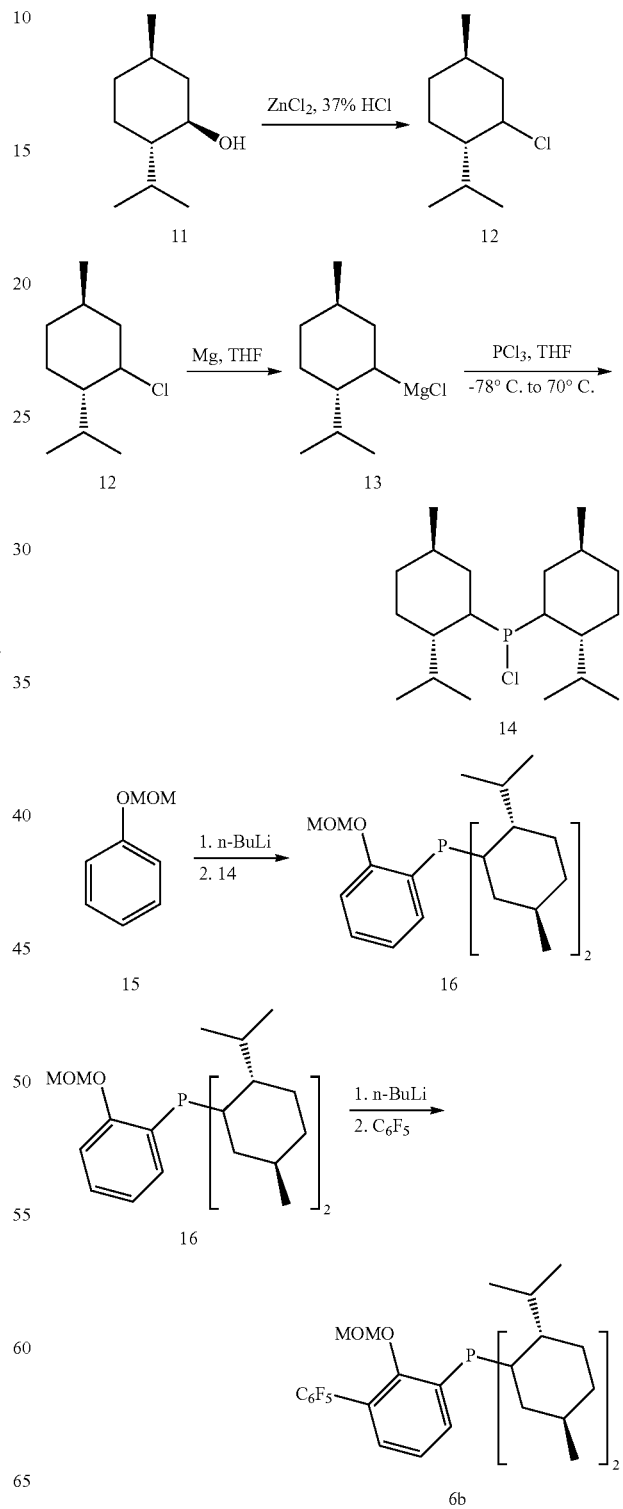

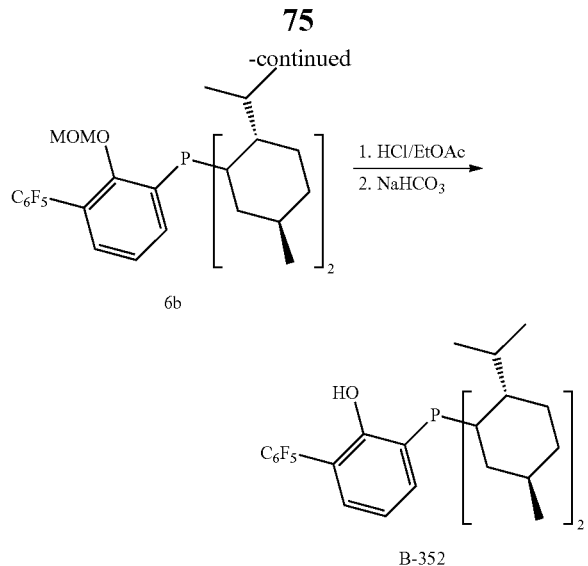

6b

B-352

(1) Synthesis of Compound 12

Anhydrous zinc chloride (287.9 g, 2.11 mol) was put in concentrated hydrochloric acid (12 M, 198.0 mL) at once. After the anhydrous zinc chloride was dissolved in the hydrochloric acid, compound 11 (100.0 g, 634.0 mmol) was added. Then, the solution was stirred at 35° C. for 16 hours to obtain a yellow suspended solution.

After the suspended solution was cooled, it was extracted with petroleum ether (80 mL×3). To an organic phase, mL water and concentrated sulfuric acid were added in several portions until no color change was observed. The organic phase was washed with water (50 mL×5), dried with anhydrous sodium sulfate, filtered and then concentrated to obtain a crude product.

The crude product was purified by distillation under reduced pressure (b.p. 60° C./20 mmHg) to obtain compound 12 in a colorless oil form. Yield: 90.0 g (515.4 mmol, yield: 80.5%)

(2) Synthesis of Compound 14

Under a nitrogen atmosphere, magnesium (7.1 g, 293.1 mmol) was put in a three-necked flask, and then anhydrous THF (80 mL) and iodine (10.0 mg, 39.4 μmol) were added thereto. Then, the compound 12 (40.0 g, 229.0 mmol) was slowly added thereto. A reaction solution was stirred at 70° C. for 3 hours to obtain a black suspension containing compound 13. After the black suspension was cooled to 0° C., phosphorus trichloride (11.0 g, 80.1 mmol) dissolved in toluene (50 mL) was added thereto in a dropwise manner. A suspended solution thus obtained was stirred at 0° C. for one hour and then stirred at 70° C. for 14 hours to obtain a white suspended solution. The suspended solution was separated by filtration, and a filtrate was concentrated to obtain compound 14 (crude product) in a yellow oil form.

(3) Synthesis of Compound 16

Compound 15 (2.1 g, 15.2 mmol) was dissolved in THF (30 mL), and n-butyllithium (2.5 N, 6.1 mL, 15.2 mmol) was added thereto at −78° C. They were stirred at 0° C. for one hour. A 10 mL solution of the compound 14 (3.5 g, 10.1 mmol) in THF was added to a reaction solution, and the mixed solution was stirred at 20° C. for 16 hours to obtain a yellow solution containing compound 16. The yellow solution was used as it was in a subsequent reaction.

(4) Synthesis of Compound 6b

Under a nitrogen atmosphere, n-BuLi (2.5 M, 6.48 mL, 16.2 mmol) was added at 0° C. to a 30 mL solution of the yellow solution containing the compound 16 (4.5 g, 10.1 mmol) in THF, and they were stirred at 0° C. for two hours. Hexafluorobenzene (2.8 g, 15.2 mmol) was added at 0° C. to a reaction solution, and they were stirred at 20° C. for 16 hours to obtain a yellow solution. The reaction solution was quenched with water and extracted with ethyl acetate (20 mL×2). An organic phase was washed with water (20 mL) and brine (20 mL), dried with sodium sulfate, and then concentrated to obtain a crude product. The crude product was purified through a silica gel column using petroleum ether/ethyl acetate=100/1 as eluent to obtain compound 6b.

(5) Synthesis of Ligand B-352

HCl/ethyl acetate (4 M, 734.5 μL, 2937.9 μmol) were added at 0° C. to a 10 mL solution of the compound 6b (200.0 mg, 293.8 μmol) in ethyl acetate, and they were stirred at 15° C. for 30 minutes. Then, the mixed solution was concentrated, quenched by adding saturated sodium hydrogen carbonate aqueous solution (30 mL) thereto, and then extracted with dichloromethane (20 mL×2). An organic phase was dried with anhydrous sodium sulfate and then concentrated to obtain the ligand B-352.

$^1$HNMR (400 MHz, $C_6D_6$, δ, ppm): 7.99 (d, J=10.08 Hz, 1H), 7.51 (d, J=7.60, 2.52, 1.76 Hz, 1H), 7.06 (d, J=7.32 Hz, 1H), 6.82 (t, J=7.60 Hz, 1H), 2.79 (sept, J=7.08 Hz, 1H), 2.18-2.09 (m, 1H), 1.96-1.86 (m, 3H), 1.81-1.74 (m, 1H), 1.69-1.65 (m, 1H), 1.61-1.47 (m, 3H), 1.42-1.32 (m, 2H), 1.24-1.13 (m, 2H), 1.07-1.02 (m, 1H), 0.97-0.93 (m, 9H), 0.90-0.86 (m, 10H), 0.54-0.45 (m, 1H), 0.34 (d, J=7.84 Hz, 3H);

$^{31}$PNMR (162 MHz, $C_6D_6$, δ, ppm): −37.52 (s).

Synthesis Example 1-3

Synthesis of Ligand B-415

Ligand B-415 was synthesized according to the following scheme.

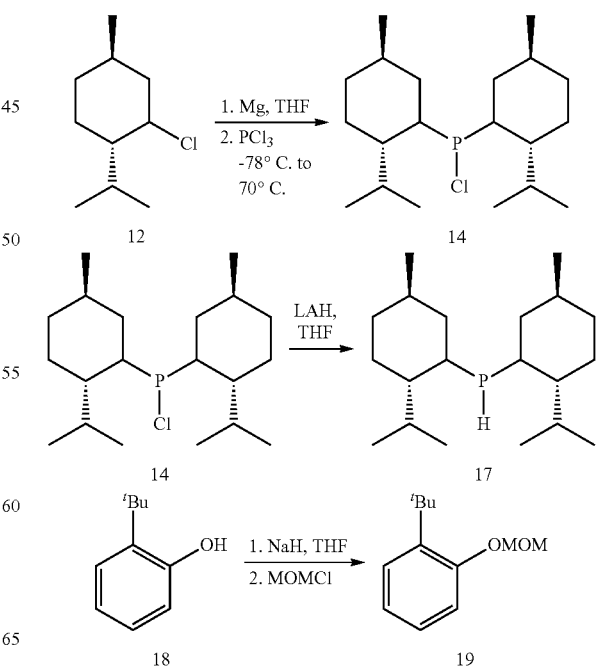

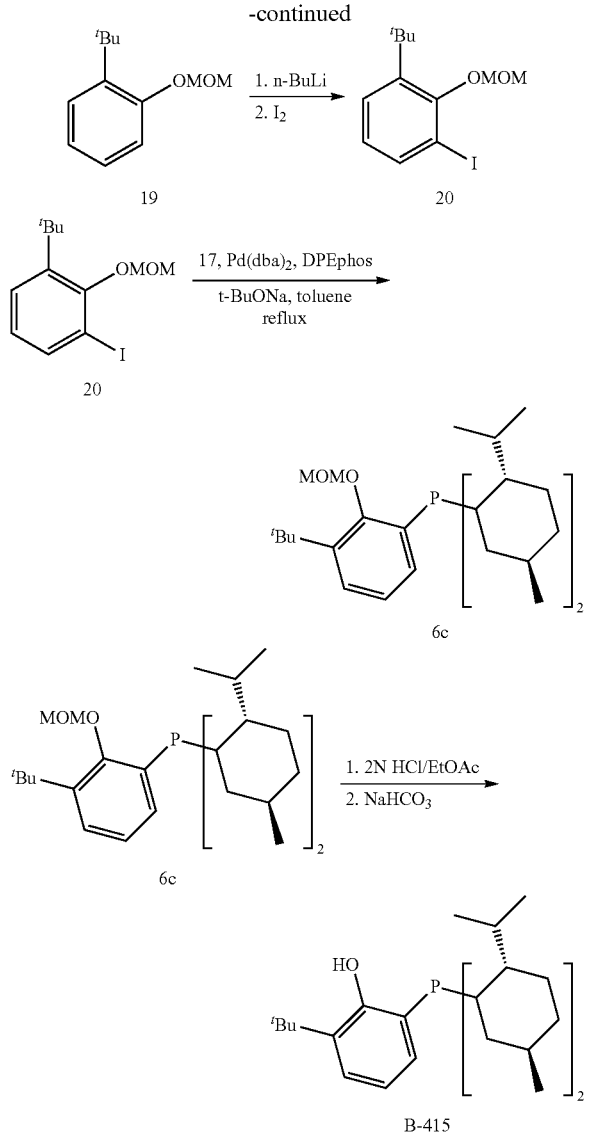

(1) Synthesis of Compound 14

Under a nitrogen atmosphere, magnesium (7.12 g, 293.06 mmol) was put in a three-necked flask, and anhydrous THF (30 mL) and iodine (158.76 mg, 625.49 μmol, 126 μL) were added thereto at room temperature. Then, a 10 mL solution of the compound 12 (40 g, 228.95 mmol) in THF was slowly added thereto in a dropwise manner, and 1,2-dibromoethane (430.11 mg, 2.29 mmol, 172.73 μL) was added thereto in two batches. A reaction solution was stirred at 68° C. for three hours to obtain a black suspension. The reaction solution was cooled to room temperature and then filtered, and a filtrate was added to a 120 mL solution of phosphorus trichloride (8.59 g, 62.55 mmol) in hexane to obtain a white suspension. The suspension was slowly heated to room temperature and stirred at 68° C. for 16 hours. A reaction solution was filtered, and a filtrate was concentrated under reduced pressure to obtain a product in a light yellow oil form. Then, the product was purified by distillation under reduced pressure (140° C.-155° C., 80 pa) to obtain compound 14 with a purity of 61% (21.7 g, 38.37 mmol, yield 30.7%).

(2) Synthesis of Compound 17

Under an argon atmosphere, lithium aluminum hydride (792.22 mg, 20.87 mmol) was added at 0° C. to a 50 mL solution of the compound 14 (6.0 g, 17.39 mmol) in THF, and they were stirred at 18° C. for 12 hours to obtain a white suspension. Deaerated water (1.2 mL) and deaerated 15% sodium hydroxide aqueous solution (3.6 mL) were added at 0° C. to a reaction solution. After filtering, a solid residue was washed with dichloromethane (50 mL×3) to obtain compound 17 (5.9 g, 16.72 mmol, yield 96.13%, purity 88%) in a white solid form.

(3) Synthesis of Compound 19

Compound 18 (100.00 g, 665.6.9 mmol, 102.04 mL) was added at 0° C. to a suspended solution of sodium hydride (66.30 g, 1.66 mol) in THF (300.00 mL), and they were stirred at 0° C. for 30 minutes. Chloromethyl methyl ether (107.19 g, 1.33 mol, 101.12 mL) was added at 0° C. to the resulting reaction solution, and they were stirred at 15° C. for 15 hours to obtain a white suspension. A reaction solution was quenched with water (200 mL) and extracted with ethyl acetate (200 mL×3). A mixed organic layer was washed with brine (200 mL). Then, the organic layer was dehydrated with sodium sulfate and filtered. A filtrate was concentrated, thereby obtaining a crude product. The crude product was purified through a silica gel column (petroleum ether as eluent) to obtain compound 19 (112.00 g, 576.52 mmol, 86.60%).

(4) Synthesis of Compound 20

First, n-BuLi (2.5 M, 22.65 mL) was added at 0° C. to a solution (30.00 mL) of the compound 19 (10.00 g, 51.47 mmol) in THF. A reaction solution was stirred at 0° C. for one hour. Then, iodine (15.68 g, 61.76 mmol, 12.44 mL) was added thereto, and they were stirred at 25° C. for 16 hours to obtain a yellow solution. Then, a reaction solution was quenched with saturated sodium sulfate aqueous solution (30 mL) and extracted with ethyl acetate (30 mL×3). A mixed organic layer was washed with brine (15 mL), dehydrated with sodium sulfate and filtered. A filtrate was concentrated to obtain a crude product. The crude product was purified through a silica gel column (petroleum ether as eluent) to obtain compound 20 (12.00 g, 37.48 mmol, yield 72.82%).

(5) Synthesis of Compound 6c

Toluene (80 mL) was added to the mixture of the compound 20 (5.9 g, 16.72 mmol), the compound 17 (5.95 g, 16.72 mmol), Pd(dba)$_2$ (961.50 mg, 1.67 mmol), sodium tert-butoxide (3.21 g, 33.44 mmol) and bis[2-(diphenylphosphino)phenyl]ether (1.80 g, 3.34 mmol). Under a nitrogen atmosphere, they were stirred at 110° C. for 18 hours to obtain a brown suspension. A reaction solution was cooled to room temperature and then filtered. A solid residue was washed with ethyl acetate (100 mL×4), mixed with filtrate and concentrated to obtain a crude product in a black oil form. The crude product was purified through a silica gel column (petroleum ether as eluent). Then, the crude product was dried under reduced pressure at 80° C. for 4 hours to obtain compound 6c (5.3 g, 9.86 mmol, yield 58.95%) in a yellow solid form.

(6) Synthesis of Ligand B-415

HCl/ethyl acetate (2 M, 30.00 mL) were added to a 20 mL solution of the compound 6c (1.2 g, 2.39 mmol) in dichloromethane. A reaction solution was stirred at 18° C. for 24 hours to obtain a yellow solution. A reaction solution was concentrated to obtain a crude product. The pH of the crude product was adjusted to 6.5 to 7.0 with saturated sodium hydrogen carbonate aqueous solution (30 mL). The crude product was extracted with dichloromethane (35 mL×3) and concentrated under reduced pressure to obtain the ligand B-415 (700 mg, 1.45 mmol, yield 60.74%, purity 95%) in a light yellow solid form.

$^1$HNMR (400 MHz, $C_6D_6$, δ, ppm): 8.19 (d, J=11.81 Hz, 1H), 7.38 (dt, J=7.45, 1.96 Hz, 1H), 7.28 (dd, J=7.64, 1.20 Hz, 1H), 6.83 (t, J=7.64 Hz, 1H), 2.94-2.81 (m, 1H), 2.25-2.10 (m, 1H), 2.00-1.78 (m, 4H), 1.73-1.63 (m, 1H), 1.62-1.46 (m, 5H), 1.55 (s, 9H), 1.44-1.30 (M, 2H), 1.28-1.16 (m, 2H), 1.13-0.89 (m, 3H), 0.96 (d, J=6.88 Hz, 3H), 0.93 (d, J=6.76 Hz, 3H), 0.93 (d, J=6.88 Hz, 3H), 0.87 (d, J=6.88 Hz, 3H), 0.85 (d, J=6.88 Hz, 3H), 0.61-0.40 (m, 1H), 0.32 (d, J=6.76 Hz, 3H);

$^{31}$PNMR (162 MHz, $C_6D_6$, δ, ppm): −37.76 (s).

Synthesis Example 1-4

Synthesis of Ligand B-414

Ligand B-414 was synthesized according to the following scheme.

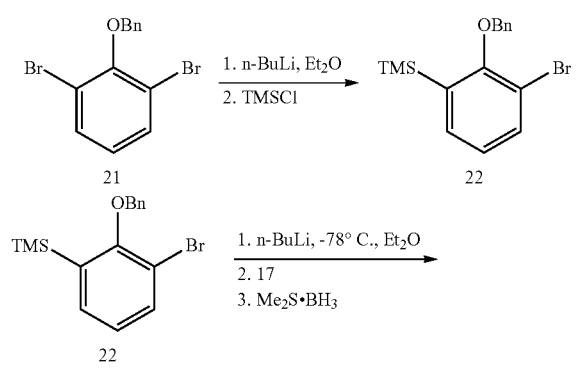

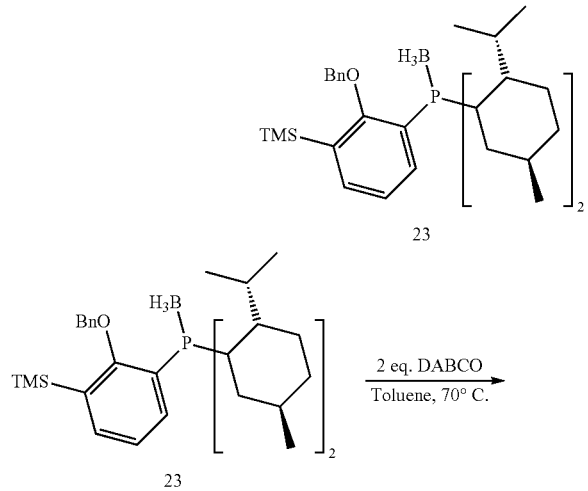

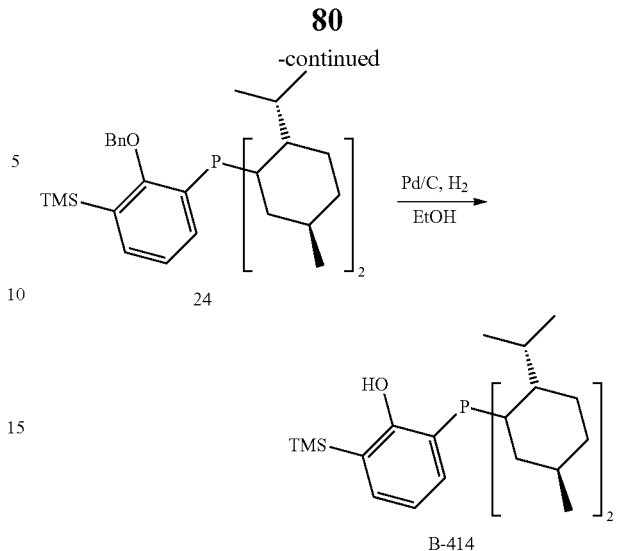

(1) Synthesis of Compound 22

First, n-BuLi (2.5 M, 2.46 mL) was added at −78° C. to a solution (10.00 mL) of compound 21 (2.00 g, 5.85 mmol) in ether, and they were stirred at −78° C. for one hour. Chlorotrimethylsilane (762.65 mg, 7.02 mmol, 886.81 μL) was added at −78° C. to a reaction solution, and they were stirred at 20° C. for 16 hours to obtain a white suspension. Water (20 mL) was added to a reaction solution and the reaction solution was extracted with ethyl acetate (50 mL×3). A mixed organic phase was dehydrated with sodium sulfate, filtered and then concentrated to obtain a crude product. The crude product was purified through a silica gel column (petroleum ether as eluent) to obtain compound 22 (1.30 g, 3.88 mmol, yield 66.27%).

(2) Synthesis of Compound 23

First, n-BuLi (2.5 M, 1.31 mL) was added at −78° C. to a solution (10.00 mL) of the compound 22 (1.00 g, 2.98 mmol) in ether, and they were stirred at −78° C. for one hour. The compound 17 (1.94 g, 2.98 mmol) was added at −78° C. to a reaction solution thus obtained, and they were stirred at 20° C. for 12 hours. Dimethyl sulfide borane (10 M, 357.60 μL) was added thereto at −78° C., and they were stirred at 20° C. for 12 hours to obtain a white suspension. Water (1.0 mL) was added at 0° C. to a reaction solution and the reaction solution was extracted with ethyl acetate (20 mL×3). A mixed organic layer thus obtained was dehydrated with sodium sulfate and filtered. Then, a filtrate was concentrated to obtain a crude product. The crude product was purified through a silica gel column (petroleum ether as eluent) to obtain compound 23 (700.00 mg, 1.21 mmol, yield 40.59%).

(3) Synthesis of Compound 24

First, 1,4-diazabicyclo[2.2.2]octane (814.05 mg, 7.26 mmol, 798.09 μL) was added to a suspension (50.00 mL) of the compound 23 (2.10 g, 3.63 mmol) in toluene, and a reaction mixed solution was stirred at 70° C. for 16 hours. All solvent was removed under reduced pressure to obtain yellow oil. Then, the oil was purified through a silica gel column (petroleum ether as eluent) to obtain compound 24 (1.20 g, 2.12 mmol, yield 58.52%).

(4) Synthesis of Ligand B-414

A solution (5.00 mL) of the compound 24 (1.20 g, 2.12 mmol) in ethanol was added at 20° C. to a suspension of Pd/C (2.40 g, 2.12 mmol) in ethanol (80.00 mL), and they were stirred at 20° C. for 160 hours in the presence of hydrogen to obtain a black suspension. A reaction solution was filtered through celite and washed with dichloromethane (100 mL). A filtrate was concentrated under reduced pressure to obtain a deep yellow oil. The oil was purified through a silica gel column (petroleum ether as eluent) to obtain the ligand B-414 in a yellow oil form (350.00 mg, 737.20 μmol, yield 34.77%).

$^1$HNMR (400 MHz, C$_6$D$_6$, δ, ppm): 7.81 (d, J=11.24 Hz, 1H), 7.50 (ddd, J=7.58, 2.97, 1.70 Hz, 1H), 7.43 (dd, J=7.14, 1.52 Hz, 1H), 6.88 (t, J=7.39 Hz, 1H), 2.92-2.78 (m, 1H), 2.19-2.11 (m, 1H), 1.99-1.76 (m, 4H), 1.72-1.45 (m, 4H), 1.44-1.31 (m, 2H), 1.30-1.14 (m, 2H), 1.13-0.99 (m, 4H), 0.96 (d, J=6.82 Hz, 3H), 0.94 (d, J=6.06 Hz, 3H), 0.93 (d, J=6.82 Hz, 3H), 0.87 (d, J=6.00 Hz, 3H), 0.84 (d, J=6.82 Hz, 3H), 0.48-0.46 (m, 1H), 0.44 (s, 9H), 0.32 (d, J=6.82 Hz, 3H);

$^{31}$PNMR (162 MHz, C$_6$D$_6$, δ, ppm): −39.04 (s).

Synthesis Example 1-5

Synthesis of Ligand B-439

Ligand B-439 was synthesized according to the following scheme.

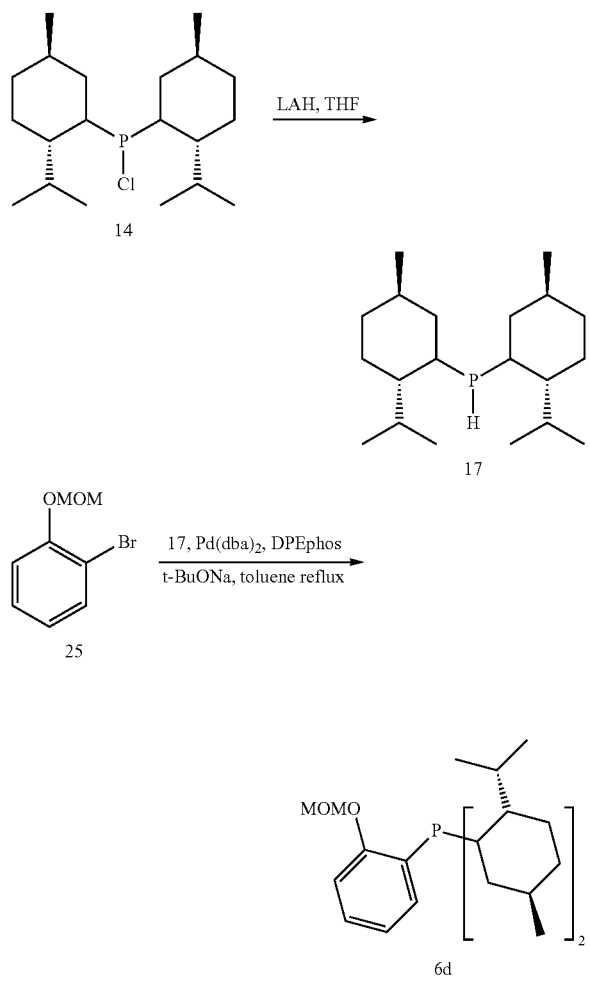

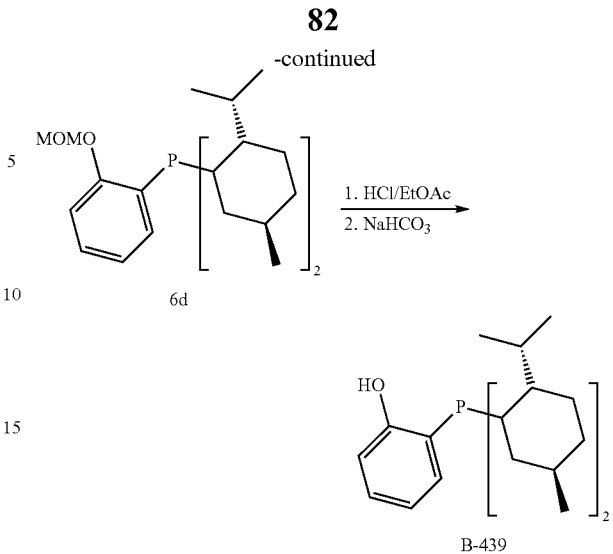

(1) Synthesis of Compound 17

Under an argon atmosphere, lithium aluminum hydride (1.13 g, 29.66 mmol) was added at 0° C. to a 100 mL solution of the compound 14 (9.3 g, 26.96 mmol) in THF, and they were stirred at 10° C. for 48 hours to obtain a white suspension. Deaerated water (1.2 mL), deaerated 15% sodium hydroxide aqueous solution (1.2 mL) and deaerated water (3.6 mL) were added at 0° C. to the suspension in this order. After the suspension was filtered, a solid residue was washed with dichloromethane (50 mixed with filtrate and concentrated to obtain compound 17 (7.5 g, 20.77 mmol, yield 77.05%, purity 86%) in a white solid form.

(2) Synthesis of Compound 6d

Toluene (80 mL) was added to the mixture of the compound 25 (3 g, 13.82 mmol), the compound 17 (4.99 g, 13.82 mmol), tris(dibenzylideneacetone)dipalladium (794.72 mg, 1.38 mmol), bis[2-(diphenylphosphino)phenyl]ether (1.49 g, 2.76 mmol) and sodium tert-butoxide (2.66 g, 27.64 mmol). They were refluxed for 1.2 hours to obtain a black suspension. The volatiles were removed under reduced pressure to give a crude product. The crude product was dried under reduced pressure at 85° C. for 4 hours to obtain compound 6d (3.1 g, 6.91 mmol, yield 50.02%, purity 99.6%) in a brown solid form.

(3)) Synthesis of Ligand 8-439

Under an argon atmosphere, hydrochloric acid/ethyl acetate (4 M, 40 mL) were added at 0° C. to a solution (20 mL) of the compound 6d (3.1 g, 6.94 mmol) in ethyl acetate, and they were stirred at 20° C. for 3.5 hours to obtain a brown solution. Then, a solvent was removed under reduced pressure to obtain a crude product. The crude product was dissolved in dichloromethane (50 mL), and an organic layer was washed with saturated sodium hydrogen carbonate aqueous solution (50 mL) and concentrated, thereby obtaining the ligand B-439 in a brown solid form (2.35 g, 5.74 mmol, yield 82.77%, purity 98%).

$^1$HNMR (400 MHz, C$_6$D$_6$, δ, ppm): 7.53 (dd, J=7.7 Hz, 2.6 Hz, 1H), 7.15 (t, J=3.3 Hz, 2H), 6.84-6.89 (m, 2H), 3.0 (sept, J=6.4 Hz, 1H), 2.23-2.32 (m, 1H), 1.92-2.07 (m, 4H), 1.76-1.81 (m, 1H), 1.68-1.76 (m, 3H), 1.26-1.36 (m, 2H), 1.15-1.24 (m, 2H), 1.09-1.13 (m, 1H), 1.01-1.05 (m, 9H), 0.91-0.98 (m, 10H), 0.58-0.67 (m, 1H), 0.43 (d, J=6.6 Hz, 3H);

$^{31}$PNMR (162 MHz, CDCl$_3$, δ, ppm): −45.64 (s).

Synthesis Example 1-6

Synthesis of Ligand B-412

Ligand B-412 was synthesized according to the following scheme.

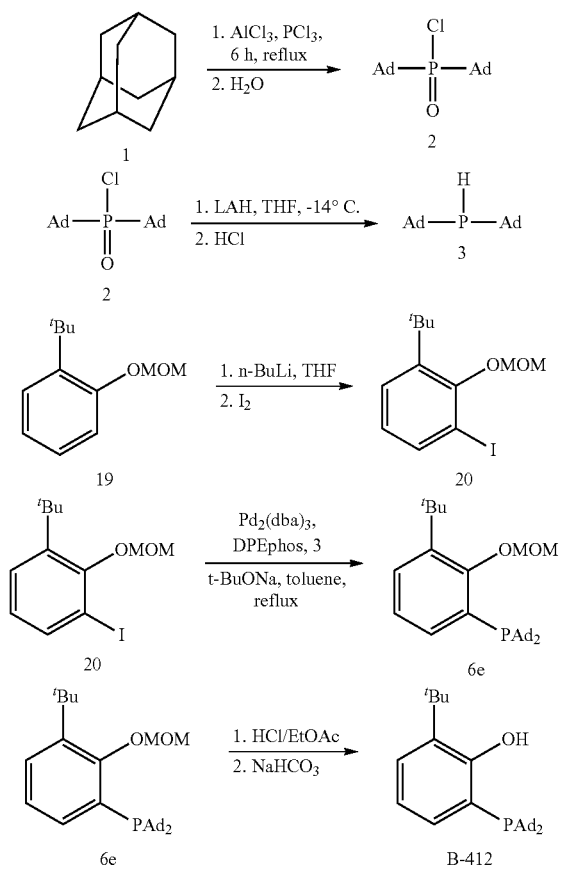

(1) Synthesis of Compound 2

Under an argon atmosphere, a mixture of the compound 1 (10.00 g, 73.41 mmol), aluminum chloride (10.47 g, 78.55 mmol, 4.29 mL) and phosphorus trichloride (50.70 g, 369.18 mmol, 32.50 mL) was stirred at 80° C. for 6 hours to obtain an orange suspension. Excess phosphorus trichloride was removed by distillation at atmospheric pressure. Then, a reaction solution was filtered, and water (150 mL) was added to a filtrate and, the reaction solution was extracted with dichloromethane (150 mL×2). A mixed organic layer was dehydrated with sodium sulfate and filtered, and a filtrate was concentrated, thereby obtaining compound 2 in an orange solid form (12.90 g, 33.16 mmol, yield 45.04).

(2) Synthesis of Compound 3

Under an argon atmosphere, lithium aluminum hydride (3.27 g, 86.27 mmol) was added at −14° C. over a period of two hours to a solution (150.00 mL) of the compound 2 (12.90 g, 36.56 mmol) in THF. After heated to 30° C., a reaction solution was stirred for 18 hours to obtain a gray suspension. The suspension was cooled to −14° C. again, and 1 M hydrochloric acid (100 mL) was added thereto. The suspension was extracted with ethyl acetate, and a mixed organic layer was dehydrated with sodium sulfate and filtered. Then, a filtrate was concentrated to obtain compound 3 (a crude product).

(3) Synthesis of Compound 20

First, n-BuLi (2.5 M, 24.71 mL) was added at 0° C. to a solution (25.00 mL) of the compound 19 (10.00 g, 51.47 mmol) in THF, and they were stirred at 0° C. for one hour. Then, iodine (15.68 g, 61.76 mmol, 12.44 mL) was added to a reaction solution, and they were stirred at 25° C. for 16 hours to obtain a brown solution. Water (100 mL) was added to a reaction solution and the reaction solution was extracted with ethyl acetate (70 mL×3). A mixed organic layer was washed, with saturated sodium thiosulfate (50 mL×2), dehydrated with sodium sulfate and filtered. Then, a filtrate was concentrated to obtain a crude product in a black oil form. Then, the crude product was purified through a silica gel column (petroleum ether as eluent) to obtain compound 20 in a light yellow oil form (9.38 g, 29.30 mmol, yield 56.92%).

(4) Synthesis of Compound 6e

Under an argon atmosphere, toluene (100 mL) was added to the mixture of the compound 20 (6.88 g, 21.49 mmol), the compound 3 (6.50 g, 21.49 mmol), sodium tert-butoxide (4.13 g, 42.98 mmol), bis[2-(diphenylphosphino)phenyl] ether (2.31 g, 4.30 mmol) and tris(dibenzylideneacetone) dipalladium (1.97 g, 215 mmol). They were stirred at 110° C. for 15 hours to obtain a black suspension. A reaction solution was cooled to 30° C. and filtered. A solid residue was washed with ethyl acetate (100 mL×4), mixed with filtrate and concentrated to obtain a crude product in a black oil form. The crude product was purified through a silica gel column (petroleum ether/ethyl acetate=1/0-50/1 as eluent) and dried under reduced pressure at 120° C. to obtain compound 6e (2.80 g, 5.66 mmol, yield 26.34%).

(5) Synthesis of Ligand B-412

Under an argon atmosphere, hydrochloric acid/ethyl acetate (4 M, 30.49 mL) were added at 0° C. to a solution (10.00 mL) of the compound 6e (1.83 g, 3.70 mmol) in dichloromethane, and they were stirred at 15° C. for 3 hours to obtain a deep yellow solution. Then, a solvent was removed under reduced pressure to obtain a crude product. Dichloromethane was added to the crude product, and the crude product was washed with saturated sodium hydrogen carbonate aqueous solution (50 mL) and concentrated, thereby obtaining the ligand B-412 in a yellow solid form (1.65 g, 3.66 mmol, yield 98.96%).

$^1$HNMR (400 MHz, $C_6D_6$, δ, ppm): 8.92 (d, J=11.75 Hz, 1H), 7.51 (d, J=7.52 Hz, 1H), 7.37 (d, J=7.77 Hz, 1H), 6.88 (t, J=7.70 Hz, 1H), 2.03 (d(br), J=12.06 Hz, 6H), 1.94 (d(br), J=12.06 Hz, 6H), 1.82-1.72 (br, 6H), 1.60 (s, 9H), 1.58-1.48 (br, 12H);

$^{31}$PNMR (162 MHz, $C_6D_6$, δ, ppm): 3.31 (s).

Comparative Synthesis Example 1-1

Synthesis of Ligand B-348

Ligand B-348 was synthesized according to the following scheme.

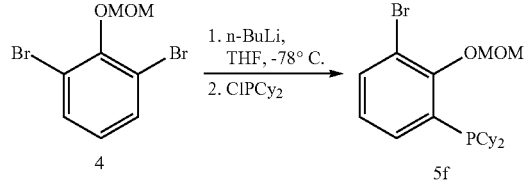

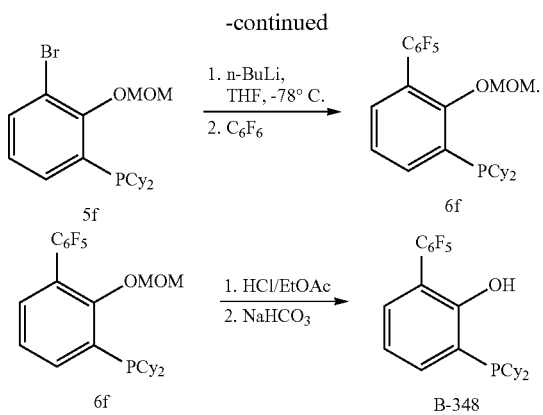

(1) Synthesis of Compound 5f

First, n-butyllithium (2.5 M, 4.0 mL, 10.0 mmol) was added at −78° C. to a 30 mL solution of the compound 4 (3.0 g, 10.0 mmol) in THF, and they were stirred at −78° C. for one hour. Then, chlorodicyclohexylphosphine (2.3 g, 10.0 mmol) was added at −78° C., and they were stirred at 10° C. for 12 hours. A reaction solution was poured into ice water and extracted with ethyl acetate (30 mL×3). An organic phase was dried with anhydrous sodium sulfate and concentrated, thereby obtaining a crude product. Then, the crude product was purified through a silica gel column (petroleum ether/ethyl acetate=10:1 as eluent) to obtain compound 5f in a light yellow oil form (2.2 g, yield 53.2%).

(2) Synthesis of Compound 6f

First, n-butyllithium (2.5 M, 2.6 mL, 6.4 mmol) was added at −78° C. to a 30 mL solution of the compound 5f (2.2 g, 5.3 mmol) in THF, and they were stirred at −78° C. for one hour. Then, hexafluorobenzene (1.5 g, 8.0 mmol) was added at −78° C., and a reaction solution was stirred at 10° C. for 12 hours to obtain a yellow solution. The reaction solution was poured into ice water (30 mL) and extracted with ethyl acetate (30 mL×3). An organic phase was dried with anhydrous sodium sulfate and concentrated, thereby obtaining a crude product. Then, the crude product was purified through a silica gel column (petroleum ether/ethyl acetate=10:1 as eluent) to obtain compound 6f in a viscous, light yellow oil form (0.8 g, yield 30.1%).

(3) Synthesis of Ligand B-348

HCl/ethyl acetate (729.3 mg, 20.0 mmol) were added at 0° C. to a 15 mL solution of the compound 6f (1.0 g, 2.0 mmol) in ethyl acetate, and they were stirred at 15° C. for 15 minutes. A reaction solution was concentrated and quenched with saturated sodium hydrogen carbonate aqueous solution (30 mL). Then, the reaction solution was extracted with dichloromethane (50 mL×2), and an organic phase was dried with anhydrous sodium sulfate and concentrated, thereby obtaining a crude product. The crude product was purified through a silica gel column (petroleum ether/ethyl acetate=5/1 as eluent) to obtain ligand B-348 (600.0 mg, yield 67.6%).

$^1$HNMR (400 MHz, CDCl$_2$, δ, ppm): 7.42-7.36 (m, 1H), 7.23 (d, J=7.6 Hz, 1H), 7.03 (t, J=7.6 Hz, 1H), 2.02-1.59 (m, 12H), 1.32-1.11 (m, 10H);

$^{31}$PNMR (162 MHz, CDCl$_3$, δ, ppm): −33.26 (s).

1-3. Synthesis of Complexes

Example 1-1

Synthesis of Complex (B-350)Ni((1,4,5-η)-COE)

All of the following operations were carried out under the atmosphere of high-purity argon. Hereinafter, bis-1,5-cyclooctadiene nickel (0, i.e., zero) is referred to as Ni(COD)$_2$, and (1,4,5-η)-4-cyclooctene-1-yl ligand is referred to as (1,4,5-η)-COE.

First, the ligand B-350 (65 mg, 0.12 mmol) was weighed and put in a 25 mL round bottom flask. Next, Ni(COD)$_2$ (43 mg, 0.16 mmol) was weighed and put in another flask, and dissolved in toluene (6.0 mL) to prepare a solution of 20 mmol/mL Ni(COD)$_2$ in toluene. The thus-obtained solution was yellow and transparent. The thus-obtained Ni(COD)$_2$ solution in toluene (6.2 mL) was added to the round bottom flask containing the ligand B-350 to obtain a solution. After that, they were stirred for one hour at room temperature. At this time, it was confirmed that the color of the solution gradually changed from dark yellow to brown, and there was no precipitation. Therefore, a 20 mmol/mL solution of a reaction product ((B-350)Ni((1,4,5-η)-COE)) of 3-350 and Ni(COD)$_2$ was obtained. The concentration of the reaction product was calculated assuming that B-350 and Ni(COD)$_2$ reacted in a molar ratio of 1:1 to form a nickel complex.

Example 1-2

Synthesis of Complex (B-352)Ni((1,4,5-η)-COE)

Complex (B-352)Ni((1,4,5-η)-COE) was synthesized in the same manner as Example 1-1, except that the ligand B-352 was used in place of the ligand B-350.

Example 1-3

Synthesis of Complex (B-350)NiPh(PEt$_3$)

Complex (B-350)NiPh(PEt$_3$) was synthesized according to the following scheme.

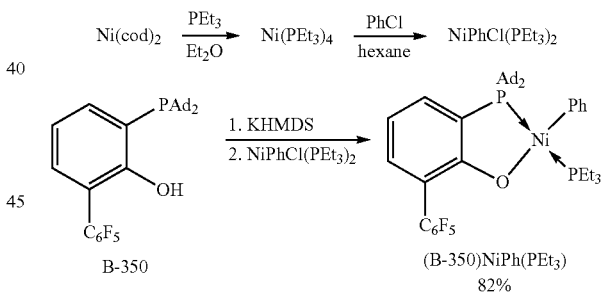

Ni(COD)$_2$ (1.57 g, 5.71 mmol) was added to a 80 mL Schlenk tube and dissolved in diethyl ether (10 mL). This solution was cooled with ice water, and triethylphosphine (25 mmol, 1.0 M THF solution) was added. The solution was warmed up to room temperature, and stirred for two hours. After a solvent was removed, the Schlenk tube was transferred to a glove box. Hexane (5 mL) was added and an obtained mixture was filtered through celite. Then, the celite was washed with hexane (5 mL). Chlorobenzene (1.10 g, 9.77 mmol) was added to a filtrate, and the filtrate was further stirred for 4 hours at room temperature. Then, a solvent was removed under reduced pressure, and pentane (5 mL) was added. A mixture thus obtained was filtered through celite, and the celite was washed with pentane (5 mL). Then, a filtrate was stored at −35° C. overnight to obtain a crystal. The crystal was washed with chilled pentane, and the thus-obtained crystal was dried under reduced pressure at room temperature for two hours to obtain an aimed product NiPhCl(PEt$_3$)$_2$ in an orange solid form (2.00 g, 86%).

$^1$HNMR (500 MHz, C$_6$D$_6$) δ7.43 (d, J=7.5 Hz, 2H), 6.97 (t, J=7.3 Hz, 2H), 6.80 (t, J=7.0 Hz, 1H), 1.32 (m, 12H), 1.02 (m, 18H);

$^{13}$CNMR (126 MHz, C$_6$D$_6$): 155.31 (t, J=54 Hz, 1C), 137.54 (t, J=6 Hz, 2C), 126.79 (t, J=4 Hz, 2C), 121.33 (t, J=4 Hz, 1C), 14.25 (t, J=20 Hz, 6C), 8.32 (s, 6C);

$^{31}$PNMR (202 MHz, C$_6$D$_6$) δ11.1;

Elemental analysis, Calcd for C$_{18}$H$_{35}$ClNiP$_2$; C, 53.05; H, 8.66, found C, 52.81; H, 8.57.

In a glove box, a 3 mL solution of potassium bis(trimethylsilyl)amide (19 mg, 0.089 mmol) in diethyl ether was gradually added to the ligand B-350 (50 mg, 0.089 mmol) collected in a 15 mL vial. A reaction mixture was stirred at room temperature for 10 minutes. To this reaction solution, a 1.5 mL solution of NiPhCl(PEt$_3$)$_2$ (36 mg, 0.089 mmol) in diethyl ether was added in a dropwise manner, and THF (3 mL) was added. Then, the reaction solution was stirred overnight at room temperature. The reaction mixture was filtered through celite, and the celite was washed with THF (2 mL). After volatiles were removed under reduced pressure, a product was extracted with hexane and filtered through celite. The celite was washed with hexane (3 mL). The volatiles were removed again under reduced pressure, and pentane (1.5 mL) was added. The resultant was left to stand at −35° C. overnight. A solid thus produced was collected by filtration, washed with chilled pentane (1 mL) and dried under reduced pressure for one hour at room temperature, thereby obtaining complex (B-350)NiPh(PEt$_3$) (59 mg, yield 82%).

$^1$HNMR (400 MHz, C$_6$D$_6$) δ7.74 (d, J=8 Hz, 2H), 7.61 (t, J=6.6 Hz, 1H), 6.97 (d, J=6.8 Hz, 2H), 6.80 (t, J=7.6 Hz, 1H), 6.65 (t, J=7.0 Hz, 1H), 2.53-2.50 (m, 6H), 2.13-2.09 (m, 6H), 1.82 (s, 6H), 1.65-1.54 (m, 12H), 0.93-0.83 (m, 15H);

$^{31}$PNMR (162 MHz, C$_6$D$_6$) δ42.88 (d, J=260 Hz, 1P), 12.83 (d, J=260 Hz, 1P).

X-ray crystal structure analysis of (B-350)NiPh(PEt$_3$) was carried out in the following manner.

In a glove box, the complex (B-350)NiPh(PEt$_3$) was dissolved again using n-pentane at room temperature. The solution was transferred to a vial, cooled to −30° C. and then left in a freezer at −30° C. As a result, growth of single crystal of (B-350)NiPh(PEt$_3$) was observed.

A single crystal having a size of about 0.25×0.20×0.18 mm was selected from the obtained single crystals and set on a loop style mount. The mount was put on SATURN 724 CCD diffractometer manufactured by Rigaku Corporation equipped with a goniometeric stage and a CCD detector, at −180° C. The single crystal was set at a position 45 mm away from the diffractometer. Diffraction intensity measurement was carried out using Mo-Kα beam monochromatized by graphite Lattice constant was determined first, and reflection data of 720 frames were obtained using program Crystal Clear. Lorentz correction was carried out on the obtained data. Unit lattice of the obtained single crystal was monoclinic with the space group P2$_1$/n. Structure was determined by direct method using program SHELXT2014. For F2 of reflection observed by SHELXL2014, refinement was carried out by the full matrix least square method. On all atoms other than hydrogen, structure refinement was carried out by anisotropic temperature factor; positions of hydrogen atoms were determined by calculation; and structure refinement was carried out by isotropic temperature factor. Data converged with R2(I>2σ(I))=0.1147.

FIG. 1 is an ORTEP diagram of complex (B-350)NiPh (PEt$_3$). As a result of the X-ray crystal structure analysis, it became apparent that the obtained complex had a chemical formula of C44H53F5NiOP2 and a planar four-coordinate structure as shown in FIG. 1. Ethyl group and 1,2,3,4,5-pentafluorophenyl group on phosphine were disordered. The distance between Ni and P2 was 2.243 Å. The distance between Ni and O was 1.904 Å. The distance between Ni and P1 was 2.205 Å. The distance between Ni and carbon atom on phenyl group was 1.891 Å. The coordination angle of P—Ni—O was 86.8°.

Example 1-4

Synthesis of Complex (B-415)Ni((1,4,5-η)-COE)

Complex (B-415)Ni((1,4,5-η)-COE) was synthesized in the same manner as Example 1-1, except that the ligand B-415 was used in place of the ligand B-350.

Example 1-5

Synthesis of Complex (B-414)Ni((1,4,5-η)-COE)

Complex (B-414)Ni((1,4,5-η)-COE) was synthesized in the same manner as Example 1-1, except that the ligand B-414 was used in place of the ligand B-350.

Example 1-6

Synthesis of Complex (B-439)Ni((1,4,5-η)-COE)

Complex (B-439)Ni((1,4,5-η)-COE) was synthesized in the same manner as Example 1-1, except that the ligand B-439 was used in place of the ligand B-350.

Example 1-7

Synthesis of Complex (B-412)Ni((1,4,5-η)-COE)

Complex (B-412)Ni((1,4,5-η)-COE) was synthesized in the same manner as Example 1-1, except that the ligand B-412 was used in place of the ligand B-350.

Comparative Example 1-1

Synthesis of Complex (B-348)Ni((1,4,5-η)-COE)

Complex (B-348)Ni((1,4,5-η)-COE) was synthesized in the same manner as Example 1-1, except that the ligand B-348 was used in place of the ligand B-350.

1-4. Propylene Polymerization or Copolymerization

Example 1-1A

Propylene Polymerization Using Complex of Example 1-1

Propylene (500 mL) was introduced into an induction-stirring autoclave having an inner volume of about 2 L. The complex ((B-350)Ni((1,4,5-η)-COE)) of Example 1-1 was introduced into the autoclave with nitrogen gas. The autoclave was warmed up to 50° C. with stirring the mixture. Polymerization was started from the time when the autoclave temperature reached 50° C. and carried out for a predetermined time. After removing unreacted monomer, the autoclave was opened, and drying by heating was carried out to obtain a polymer.

Example 1-2A

Propylene Polymerization Using Complex of Example 1-2

A polymer was obtained in the same manner as Example 1-1A, except that the complex ((B-352)Ni((1,4,5-η)-COE)) of Example 1-2 was used in place of the complex ((B-350)Ni((1,4,5-η)-COE))) of Example 1-1.

Example 1-3A

Propylene Polymerization Using Complex of Example 1-3

A 50 mL stainless-steel autoclave was dried for three hours with a dryer at 120° C., assembled and then dried under reduced pressure at 125° C. for two hours. After the autoclave was cooled to room temperature, under an argon atmosphere, the complex ((B-350)NiPh(PEt$_3$)) (5.0 μmol, 10.0 mL, 0.50 mmol/L toluene solution) of Example 1-3, toluene (5 mL) and propylene 6 mL were added to the autoclave. Then, the autoclave was warmed up to 50° C. and stirred for 43 hours. After the autoclave was cooled to room temperature, venting residual propylene was carried out, and a reaction product was quenched with ethanol (20 mL) and then a polymer was collected by filtering. The polymer was dried under reduced pressure for two hours at 100° C. to 120° C. to obtain an aimed polymer.

Example 1-4A

Propylene Polymerization Using Complex of Example 1-4

A polymer was obtained in the same manner as Example 1-1A, except that the complex ((3-415)Ni((1,4,5-η)-COE)) of Example 1-4 was used in place of the complex ((B-350)Ni((1,4,5-η)-COE))) of Example 1-1.

Example 1-5A

Propylene Polymerization Using Complex of Example 1-5

A polymer was obtained in the same manner as Example 1-1A, except that the complex ((B-414)Ni((1,4,5-η)-COE)) of Example 1-5 was used in place of the complex ((B-350)Ni((1,4,5-η)-COE))) of Example 1-1.

Example 1-6A

Propylene Polymerization Using Complex of Example 1-6

A polymer was obtained in the same manner as Example 1-1A, except that the complex ((B-439)Ni((1,4,5-η)-COE)) of Example 1-6 was used in place of the complex ((B-350)Ni((1,4,5-η)-COE))) of Example 1-1.

Example 1-7A

Propylene Polymerization Using Complex of Example 1-7

A polymer was obtained in the same manner as Example 1-1A, except that the complex ((B-412)Ni((1,4,5-η)-COE)) of Example 1-7 was used in place of the complex ((B-350)Ni((1,4,5-η)-COE))) of Example 1-1.

Example 1-2B

Copolymerization Using Complex of Example 1-2

A copolymer was obtained in the same manner as Example 1-1A, except that the complex ((B-352)Ni((1,4,5-η)-COE)) of Example 1-2 was used in place of the complex ((B-350)Ni((1,4,5-η)-COE)) of Example 1-1, and after the complex of Example 1-2 was introduced into an autoclave with nitrogen gas, ethyl 10-undecanoate was further added to the autoclave. For the content rate of the comonomer in the copolymer, a molar ratio of propylene:comonomer was determined by $^1$HNMR measurement and expressed in tables as comonomer content mol %.

Example 1-2C

Copolymerization Using Complex of Example 1-2

A copolymer was obtained in the same manner as Example 1-1A, except that the complex ((B-352)Ni((1,4,5-η)-COE)) of Example 1-2 was used in place of the complex ((B-350)Ni((1,4,5-η)-COE)) of Example 1-1, and after the complex of Example 1-2 was introduced into an autoclave with nitrogen gas, 10-undecene-1-ol was further added to the autoclave. For the content rate of the comonomer in the copolymer, a molar ratio of propylene:comonomer was determined by $^1$HNMR measurement and expressed in tables as comonomer content mol %.

Comparative Example 1-1A

Propylene Polymerization Using Complex of Comparative Example 1-1

A polymer was obtained in the same manner as Example 1-1A, except that the complex ((B-348)Ni((1,4,5-η)-COE)) of Comparative Example 1-1 was used in place of the complex ((B-3.50)Ni((1,4,5-η)-COE)) of Example 1-1.

The following Table 4-1 is for comparison of nickel raw materials and ligands used to synthesize the complexes of Examples 1-1 to 1-7 and Comparative Example 1-1.

TABLE 4-1

|  | Nickel raw material | Ligand | R¹ | R⁵ | R⁶ |
|---|---|---|---|---|---|
| Example 1-1 | Ni(COD)2 | B-350 | pentafluoropheyl group | adamantyl group | adamantyl group |
| Example 1-2 | Ni(COD)2 | B-352 | pentafluoropheyl group | menthyl group | menthyl group |
| Example 1-3 | NiClPh(PEt3)2 | B-350 | pentafluoropheyl group | adamantyl group | adamantyl group |
| Example 1-4 | Ni(COD)2 | B-415 | tert-butyl group | menthyl group | menthyl group |
| Example 1-5 | Ni(COD)2 | B-414 | trimethylsilyl group | menthyl group | menthyl group |
| Example 1-6 | Ni(COD)2 | B-439 | hydrogen | menthyl group | menthyl group |
| Example 1-7 | Ni(COD)2 | B-412 | tert-butyl group | adamantyl group | adamantyl group |
| Comparative Example 1-1 | Ni(COD)2 | B-348 | pentafluorophenyl group | cyclohexyl group | cyclohexyl group |

The following Table 4-2 shows the polymerization conditions and polymerization results of Examples 1-1A to 1-7A, Examples 1-2B and 1-2C, and Comparative Example 1-1A. In Table 4-2, polymerization activity represents copolymer yield (g) per 1 mol of complex used for polymerization and per 1 hour of polymerization time. In Table 4-2, as GPC measurement results relating to polymer, weight average molecular weight Mw and molecular weight distribution Mw/Mn are mentioned. Copolymerization amount in Table 4-2 indicates the ratio of comonomer incorporated into the polyplefin backbone determined by $^1$H NMR.

lymer having a higher molecular weight than ever before, can achieve copolymerization of α-olefin and polar group-containing monomer with excellent polymerization activity, and have superior technical significance.

Second Embodiment of the Present Disclosure 2-1. Evaluation Method
(1) Weight Average Molecular Weight Mw, Number Average Molecular Weight Mn and Molecular Weight Distribution Mw/Mn: Determined by the Following GPC Measurement.

TABLE 4-2

|  | Complex | Comonomer species | Added comonomer amount (mmol) | Polymerization time (hr) | Polymerization activity (g/mol/hr) | Molecular weight Mw (g/mol) | Mw/Mn | Copolymerization amount (mol %) |
|---|---|---|---|---|---|---|---|---|
| Example 1-1A | Example 1-1 | — | — | 2 | $4.7 \times 10^3$ | 6,200 | 1.8 | — |
| Example 1-2A | Example 1-2 | — | — | 3 | $7.9 \times 10^4$ | 12,200 | 2.0 | — |
| Example 1-3A | Example 1-3 | — | — | 43 | $2.0 \times 10^3$ | 6,700 | 2.2 | — |
| Example 1-4A | Example 1-4 | — | — | 3 | $1.4 \times 10^4$ | 13,600 | 1.8 | — |
| Example 1-5A | Example 1-5 | — | — | 3 | $1.8 \times 10^4$ | 10,400 | 1.7 | — |
| Example 1-6A | Example 1-6 | — | — | 3 | $4.6 \times 10^2$ | 3,300 | 1.4 | — |
| Example 1-7A | Example 1-7 | — | — | 3 | $4.6 \times 10^4$ | 21,600 | 1.8 | — |
| Example 1-2B | Example 1-2 | Ethyl-10-undecenoate | 26.8 | 3 | $4.0 \times 10^4$ | 11,600 | 1.8 | 0.8 |
| Example 1-2C | Example 1-2 | 10-Undecen-1-ol | 69.1 | 3 | $1.7 \times 10^3$ | 8,400 | 1.4 | 1.7 |
| Comparative Example 1-1A | Comparative Example 1-1 | — | — | 2 | $7.2 \times 10^3$ | 1,440 | 1.9 | — |

1-5. Consideration

As is clear from Comparative Example 1-1A in Table 4-2, in the case of polypropylene polymerization using the conventional complex (Comparative Example 1-1), the molecular weight Mw of the thus-obtained polymer is 1,440 and small. Meanwhile, as is clear from Examples 1-1A to 1-7A in Table 4-2, in the case of polypropylene polymerization using the metal complexes (Examples 1-1 to 1-7) of the present disclosure, the molecular weights Mw of the thus-obtained polymers are 3,300 or more and large. As just described, it was revealed that the metal complexes of the present disclosure in which bulky substituent groups are used as R⁵ and R⁶, provide polypropylene having a high molecular weight compared to the case where R⁵ and R⁶ are cyclohexyl groups. Also in the case of using the metal complexes of the present disclosure, the polymerization activities are 4.6×10² (g/mol/hr) or more and excellent, and the molecular weight distributions Mw/Mn of the thus-obtained polypropylenes are suppressed 2.2 or less.

Also, as is clear from Examples 1-2B and 1-20 in Table 4-2, by the metal complexes of the present disclosure, copolymerization of α-olefin and polar group-containing monomer is achieved with excellent polymerization activity.

From the above reasons, it is clear that the metal complexes of the present disclosure provide α-olefin homopo- First, a sample (about 20 mg) was collected in a vial for the pretreatment unit PL-SP 260VS for the high temperature GPC manufactured by Polymer Laboratories Ltd, and o-Dichlorobenzene containing BHT as a stabilizer (concentration of BHT=0.5 g/L) was added thereto to adjust the polymer concentration to 0.1% by mass. The polymer was dissolved by heating at 135° C. in the above-described pretreatment unit PL-SP 260VS for the high temperature GPC, and filtered with a glass filter to prepare a sample solution. No polymer was seized by the glass filter in GPC measurement of the present invention. Next, GPC measurement was carried out using HLC-8321GPC/HT manufactured by Tosoh Corporation equipped with TSKgel GMH-HT (30 cm×4 pieces) manufactured by Tosoh Corporation as a column and RI detector. The following measuring conditions were employed: injection amount of sample solution: about 520 μL; column temperature: 135° C.; solvent: o-dichlorobenzene; and flow rate: 1.0 mL/min. Calculation of molecular weight was carried out as follows. That is, commercially available monodisperse polystyrene was used as a standard sample, and a calibration curve on retention time versus molecular weight was prepared from viscosity formulae of the polystyrene standard sample and an ethylene polymer, and calculation of molecular weight was carried out based on the calibration curve. As a viscosity formula, 2-2. Synthesis of Ligands

Synthesis Example 2-1

Synthesis of Ligand B-349

Ligand B-349 was synthesized according to the following scheme.

In chemical formulae mentioned below, —OMOM represents methoxymethoxy group (—OCH$_2$OCH$_3$).

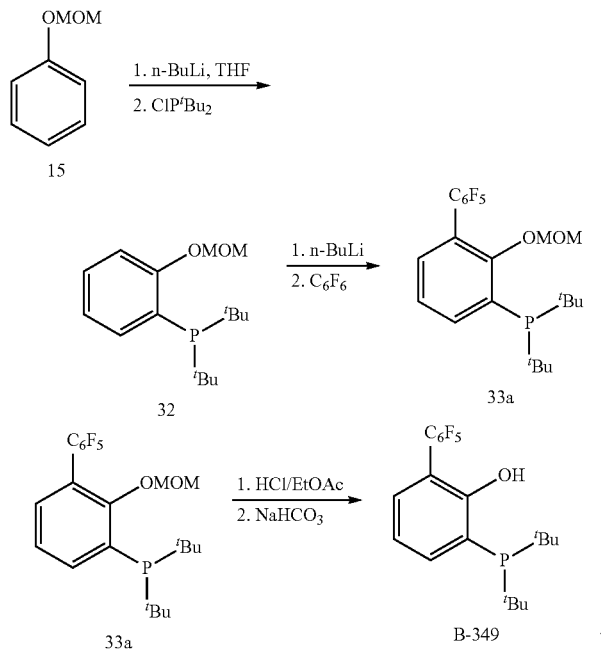

(1) Synthesis of Compound 33a

Under an argon atmosphere, n-butyllithium (2.5 M, 24.6 mL, 61.5 mmol) was added at 0° C. to a 100 mL solution of the compound 15 (8.5 g, 61.5 mmol) in THF, and they were stirred at 0° C. for one hour. Then, di-tert-butylchlorophosphine (11.1 g, 61.5 mmol, 11.7 mL) was added thereto at −78° C., and they were stirred at 10° C. for two hours (production of compound 32). Then, n-butyllithium (2.5 M, 29.5 mL, 73.8 mmol) was added thereto at 0° C., and a reaction solution was stirred at 0° C. for one hour. To this reaction solution, hexafluorobenzene (17.2 g, 92.3 mmol) was added at −78° C., and they were stirred at 10° C. for 12 hours. The reaction solution was poured into ice water (50 mL) and extracted with ethyl acetate (100 mL×2). An organic phase was dried with anhydrous sodium sulfate and concentrated, thereby obtaining a crude product. The crude product was purified through a silica gel column (petroleum ether/ethyl acetate=100:1-20:1 as eluent) and recrystallized with petroleum ether:ethyl acetate (20:1, 50 mL) to obtain compound 33a (5.0 g, 10.7 mmol, yield 17.4%).

(2) Synthesis of Ligand B-349

Under an argon atmosphere, HCl/ethyl acetate (4 M, 85.1 mL, 340.2 mmol) were added at 0° C. to a 20.0 mL solution of the compound 33a (5.0 g, 11.2 mmol) in dichloromethane, and they were stirred at 10° C. for two hours. Volatiles were removed under reduced pressure, and dichloromethane (100 mL) was added to a residue. An organic phase was washed with saturated sodium hydrogen carbonate aqueous solution (100 mL×2) and concentrated, thereby obtaining B-349 (3.9 g, 9.28 mmol, yield 83.2%).

$^1$HNMR (400 MHz, CDCl$_3$, δ, ppm): 8.19 (s, 1H), 7.71 (d, J=7.6 Hz, 1H), 7.25 (s, 1H), 7.00 (t, J=7.4 Hz, 1H), 1.28 (s, 9H), 1.25 (s, 9H);
$^{31}$PNMR (1621 Hz, CDCl$_3$, δ, ppm) −5.84 (s).

Synthesis Example 2-2

Synthesis of Ligand B-395

Ligand B-395 was synthesized according to the following scheme.

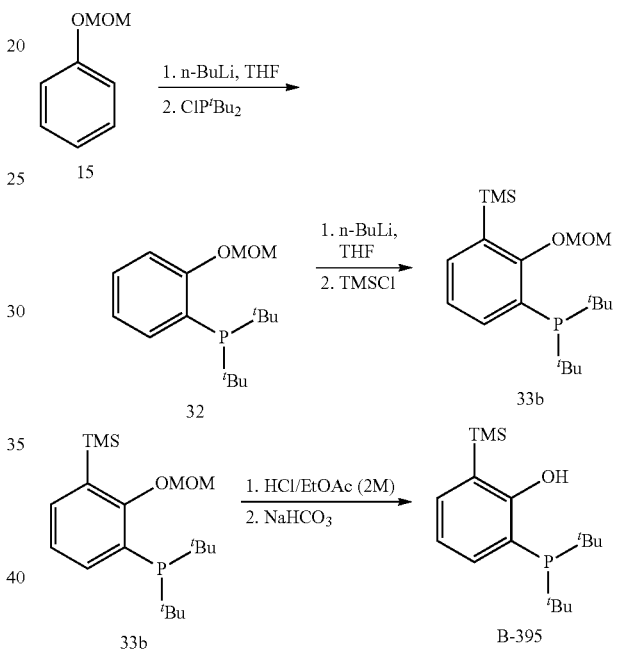

(1) Synthesis of Compound 33b

First, n-butyllithium (2.5 M, 8.7 mL, 21.8 mmol) was added at 0° C. to a 20 mL solution of the compound 15 (3.0 g, 21.7 mmol) in THF, and they were stirred at 0° C. for one hour. Then, di-tert-butylchlorophosphine (3.9 g, 21.7 mmol, 4.1 mL) was added thereto at −78° C., and they were stirred at 15° C. for two hours (production of compound 32). Then, n-butyllithium (2.5 M, 10.9 mL, 27.2 mmol) was added thereto at 0° C., and they were stirred at 0° C. for one hour. Then, chlorotrimethylsilane (3.54 g, 32.6 mmol, 4.1 mL) was added at −78° C., and they were stirred at 15° C. for 12 hours. A reaction solution was poured into ice water (50 mL) and extracted with ethyl acetate (50 mL×2). An organic phase was dried with anhydrous sodium sulfate and concentrated, thereby obtaining a crude product. The crude product was purified through a silica gel column (petroleum ether as eluent) to obtain compound 33b in a colorless oil form (2.3 g, 6.3 mmol, yield 28.7%).

(2) Synthesis of Ligand B-395

Under an argon atmosphere, HCl/ethyl acetate (2 M, 15.0 mL, 30.0 mmol) were added at 0° C. to a 30 mL solution of the compound 33b (2.4 g, 6.8 mmol) in dichloromethane, and they were stirred at 15° C. for 1.5 hours. Volatiles were removed under reduced pressure to obtain a light yellow oil. Dichloromethane (100 mL) was added, and an organic phase was washed with saturated sodium hydrogen carbonate aqueous solution (100 mL) and concentrated, thereby obtaining B-395 in a white solid form (1.0 g, 2.9 mmol, yield 91.0%).

$^1$HNMR (400 MHz, CDCl$_3$, δ, ppm): 8.01 (s, 1H), 7.56 (d, J=7.6 Hz, 1H), 7.38 (dd, J=7.2 Hz, 1.6 Hz, 1H), 6.86 (t, J=7.4 Hz, 1H), 1.23 (s, 9H), 1.20 (s, 9H), 0.29 (s, 9H);

$^{31}$PNMR (162 MHz, CDCl$_3$, δ, ppm) −6.04 (s).

Synthesis Example 2-3

Synthesis of Ligand B-396

Ligand B-395 was synthesized according to the following scheme.

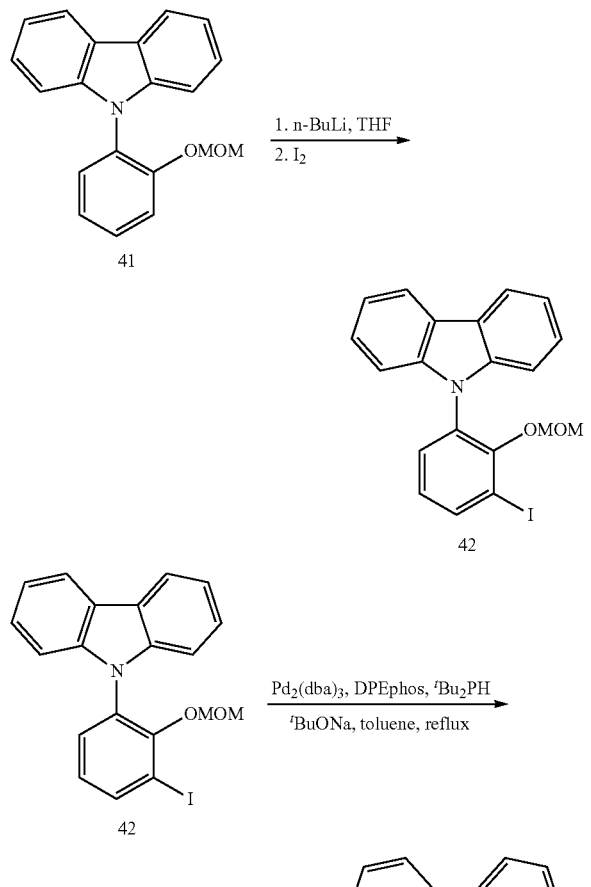

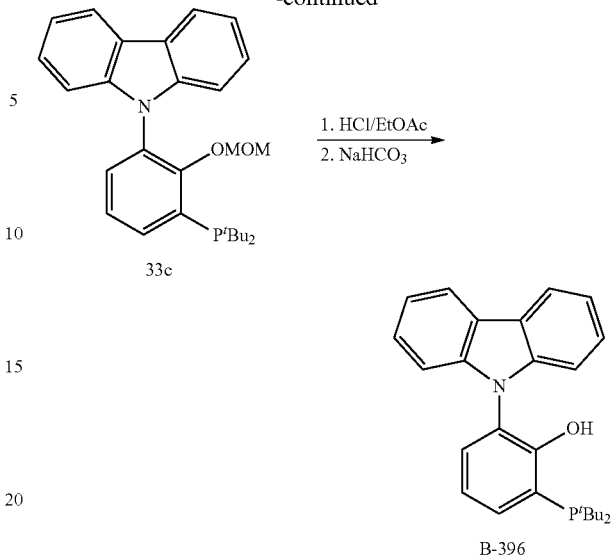

(1) Synthesis of Compound 42

Compound 41 was synthesized by reference to Japanese Patent Application Laid-Open No. 2016-17134.

First, n-butyllithium (2.5 M, 15.8 mL, 39.5 mmol) was added at 0° C. to a 60 mL solution of the compound 41 (10.0 g, 33.0 mmol) in THF, and they were stirred at 0° C. for one hour. Then, a 10 mL solution of iodine (10.0 g, 39.6 mmol, 8.0 mL) in THF was added thereto at 0° C. A reaction mixture was stirred at 25° C. for 16 hours. This reaction mixture was quenched by adding water (30 mL) and extracted with ethyl acetate (30 mL×3). An organic phase was washed with brine (15 mL), dried with anhydrous sodium sulfate and concentrated to obtain a crude product. The crude product was purified through a silica gel column (petroleum ether as eluent) to obtain compound 42 (7.5 g, 17.4 mmol, yield 53.7%).

(2) Synthesis of Compound 33c

Under a nitrogen atmosphere, a 10.0 mL solution of the compound 42 (900 mg, 2.1 mmol), di-tert-butylphosphine (337.8 mg, 2.3 mmol), tris(dibenzylideneacetone)dipalladium (192.3 mg, 210.0 μmol), sodium-tert-butoxide (403.6 mg, 4.2 mmol) and bis[2-(diphenylphosphino)phenyl]ether (DPEPhos, 1.1 g, 2.1 mmol) in toluene, was stirred at 100° C. for 16 hours. A reaction mixture was concentrated to obtain a crude product. The crude product was purified through a silica gel column (petroleum ether:ethyl acetate-10:1 as eluent) to obtain compound 33c (210.0 mg, 469.2 μmol, yield 22.34%).

(3) Synthesis of Ligand B-396

HCl/ethyl acetate (4 M, 40.0 mL, 160.0 mmol) were added at 0° C. to a 3 mL solution of the compound 33c (3.1 g, 6.9 mmol) in dichloromethane. A reaction mixture was stirred at 25° C. for two hours to obtain a yellow solution. The reaction mixture was concentrated to obtain a crude product. The pH of the crude product was adjusted to 6.5 to 7.0 with saturated sodium hydrogen carbonate aqueous solution (30 mL). The crude product was extracted with dichloromethane (25 mL×3). An organic phase was washed with brine (25 mL), dried with anhydrous sodium sulfate and concentrated, thereby obtaining the ligand B-396 (2.4 g, 6.0 mmol, yield 85.9%).

$^1$HNMR (400 MHz, CDCl$_3$, δ, ppm): 8.15 (d, J=7.8 Hz, 2H), 8.08 (s, 1H), 7.76 (dt, J=7.8 Hz, 1.9 Hz, 1H), 7.49 (dd, J=7.7 Hz, 1.4 Hz, 1H), 7.40 (t, J=7.6 Hz, 2H), 7.27 (t, J=7.6 Hz, 2H), 7.18 (d, J=8.1 Hz, 2H), 7.09 (t, J=7.7 Hz, 1H), 1.32 (s, 9H), 1.29 (s, 9H);

$^{31}$PNMR (162 MHz, CDCl$_3$, δ, ppm): −5.75 (s).

Comparative Synthesis Example 2-1

Synthesis of Ligand B-399

Ligand B-399 was synthesized according to the following scheme.

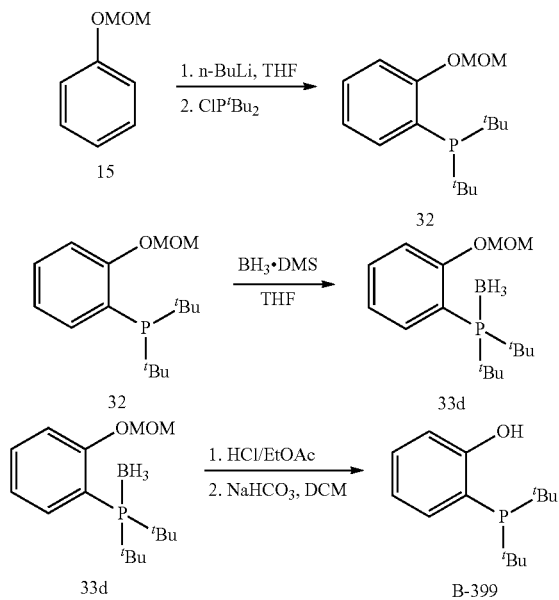

(1) Synthesis of Compound 32

First, n-butyllithium (2.5 M, 12.2 mL, 30.0 mmol) was added at 0° C. to a 30 mL solution of the compound 15 (4M g, 29.0 mmol) in THF, and they were stirred at 0° C. for one hour. Then, di-tert-butylchlorophosphine (5.2 g, 29.0 mmol, 5.5 mL) was added thereto at −78° C., and they were stirred at 15° C. for 12 hours. A reaction solution was poured into ice water (20 mL) and extracted with ethyl acetate (20 mL×2). An organic phase was dried with anhydrous sodium sulfate and concentrated, thereby obtaining a crude product. The crude product was purified through a silica gel column (petroleum ether:ethyl acetate=1:0-50:1 as eluent) to obtain compound 32 (3.5 g, 9.0 mmol, yield 31.2%).

(2) Synthesis of Compound 33d

Under an argon atmosphere, BH$_3$.THF (1.0 M, 16.7 mL, 16.7 mmol) was added at −78° C. to a 10 mL solution of the compound (3.9 g, 13.9 mmol) in THF, and they were stirred at 10° C. for one hour. BH$_3$-dimethylsulfide (10 M, 1.7 mL, 16.7 mmol) was added thereto at −78° C., and they were stirred at 10° C. for 12 hours. To this reaction solution, ice water (10 mL) was added at 0° C., and volatiles were removed under reduced pressure. Water (20 mL) was added to the reaction solution, and the reaction solution was extracted with ethyl acetate (20 mL×3). An organic phase was dried with anhydrous sodium sulfate and concentrated, thereby obtaining a white solid. The white solid was recrystallized with ethyl acetate (10 mL) to obtain compound 33d (1.5 g, 5.1 mmol, yield 36.4).

(3) Synthesis of Ligand B-399

Under an argon atmosphere, HCl/ethyl acetate (4 M, 80.0 mL, 320.0 mmol) were added at 0° C. to the compound 33d (5.4 g, 18.2 mmol) in dichloromethane (20 mL), and they were stirred at 10° C. for three hours. Volatiles were removed under reduced pressure, and dichloromethane (100 mL) was added. An organic phase was washed with saturated sodium hydrogen carbonate aqueous solution (100 mL) and concentrated, thereby obtaining the ligand B-399 (4.0 g, 16.8 mmol, yield 92.1%).

$^1$HNMR (400 MHz, CDCl$_3$, δ, ppm): 7.85 (s, 1H), 7.57 (dt, J=7.6 Hz, 1.4 Hz, 1H), 7.28 (td, J=7.7 Hz, 1.6 Hz, 1H), 6.94 (td, J=7.2 Hz, 1.2 Hz, 1H), 6.87 (td, J=7.5 Hz, 1.2 Hz, 1H), 1.32 (s, 9H), 1.29 (s, 9H);

$^{31}$PNMR (162 MHz, CDCl$_3$, δ, ppm): −6.21 (s).

2-3. Synthesis of Complexes

Example 2-1

Synthesis of Complex (B-349)Ni((1,4,5-η)-COE)

All of the following operations were carried out under the atmosphere of high-purity argon. Hereinafter, bis-1,5-cyclooctadiene nickel (0, i.e., zero) is referred to as Ni(COD)$_2$, and (1,4,5-η)-4-cyclooctene-1-yl ligand is referred to as (1,4,5-η)-COE.

First, the ligand B-349 (50 mg, 0.12 mmol) was weighed and put in a 25 mL round bottom flask. Next, Ni(COD)$_2$ (40 mg, 0.15 mmol) was weighed and put in another flask, and dissolved in toluene (7.3 mL) to prepare a solution of 20 mmol/mL Ni(COD)$_2$ in toluene. The thus-obtained solution was yellow and transparent. The thus-obtained Ni (COD)$_2$ solution in toluene (6.2 mL) was added to the round bottom flask containing the ligand B-349 to obtain a solution. After that, they were stirred for one hour at room temperature. At this time, it was confirmed that the color of the solution gradually changed from dark yellow to brown, and there was no precipitation. Therefore, a 20 mmol/mL solution of a reaction product ((B-349)Ni((1,4,5-η)-COE)) of B-349 and Ni(COD)$_2$ was obtained. The concentration of the reaction product was calculated assuming that B-349 and Ni (CCD) reacted in a molar ratio of 1:1 to form a nickel complex.

Example 2-2

Synthesis of Complex (B-395)Ni((1,4,5-η)-COE)

Complex (B-395)Ni((1,4,5-η)-COE) was synthesized in the same manner as Example 2-1, except that the ligand B-395 was used in place of the ligand B-349.

Example 2-3

Synthesis of Complex (B-396)Ni((1,4,5-η)-COE)

Complex (B-396)Ni((1,4,5-η)-COE) was synthesized in the same manner as Example 2-1, except that the ligand B-396 was used in place of the ligand B-349.

Example 2-4

Synthesis of Complex (B-395)NiPhPy

Complex (B-395)NiPhPy was synthesized according to the following scheme.

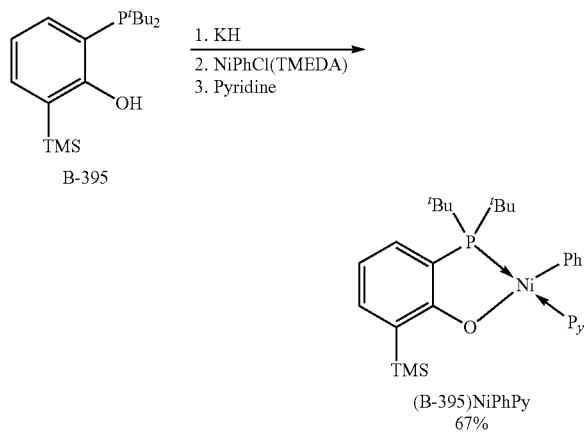

In a glove box, the ligand B-395 (53 mg, 0.17 mmol) and potassium hydride (17 mg, 0.43 mmol) were put in a 15 mL vial. Diethyl ether (5 mL) was added thereto, and they were stirred for 30 minutes. A reaction mixture was filtered through celite, and the celite was washed with diethyl ether (3 mL). NiPhCl(TMEDA) (TMEDA: tetramethylethylenediamine) was synthesized by reference to Non-Patent Literature "Marshall, W. J.; Grushin, V. V. Can. J. Chem. 2005, 83, 640". NiPhCl(TMEDA) (49 mg, 0.17 mmol) was added to the diethyl ether filtrate, and they were stirred overnight. A reaction solution was filtered through celite, and the celite was washed with diethyl ether (3 mL). To this filtrate, pyridine (13 mg, 0.17 mmol) was added, and they were stirred at room temperature overnight. Then, the reaction mixture was filtered through celite, and the celite was washed with diethyl ether (1.5 mL). A volatile component was removed under reduced pressure to obtain a crude product. Pentane (1 mL) was added to the crude product, and the crude product was left to stand at −35° C. overnight. A solid thus produced was collected by filtration, washed with chilled pentane (1 mL) and dried under reduced pressure for one hour, at room temperature, thereby obtaining (B-395)NiPhPy (60 mg, yield 67%).

$^1$H-NMR (400 MHz, $C_6D_6$) δ8.72-8.70 (m, 2H), 7.91 (d, J=8.0 Hz, 2H), 7.54-7.52 (m, 1H), 7.48-7.44 (m, 1H), 6.98 (t, J=7.4 Hz, 2H), 6.82 (t, J=7.4 Hz, 1H), 6.67-6.60 (m, 2H), 6.38 (t, J=6.8 Hz, 2H), 1.42 (s, 9H), 1.39 (s, 9H), 0.25 (s, 9H);

$^{31}$P-NMR (162 MHz, $C_6D_6$) δ58.416.

Example 2-5

Synthesis of Complex (B-349)NiPh(PEt$_3$)

Complex (B-349)NiPh(PEt$_2$) was synthesized according to the following scheme.

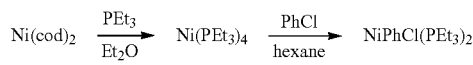

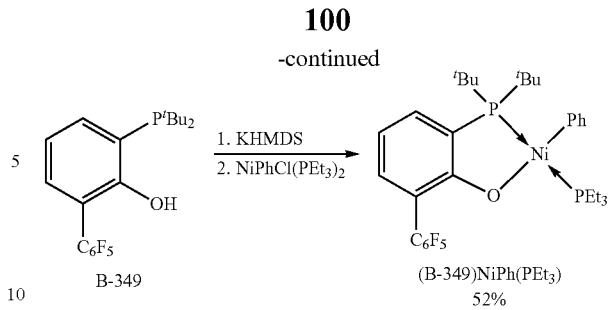

Ni(COD)$_2$ (1.57 g, 5.71 mmol) was added to a 80 mL Schlenk tube and dissolved in diethyl ether (10 mL). This solution was cooled with ice water, and triethylphosphine (25 mmol, 1.0 M THF solution) was added. The solution was warmed up to room temperature, and the solution was stirred for two hours. After a solvent was removed, the Schlenk tube was transferred to a glove box. Hexane (5 mL) was added and filtered through celite. Then, the celite was washed with hexane (5 mL). Chlorobenzene (1.10 g, 9.77 mmol) was added to a filtrate, and the filtrate was further stirred for 4 hours at room temperature. Then, a solvent was removed under reduced pressure, and pentane (5 mL) was added. A mixture thus obtained was filtered through celite, and the celite was washed with pentane (5 mL). Then, a filtrate was stored at −35° C. overnight to obtain a crystal. The crystal was washed with chilled pentane, and the thus-obtained crystal was dried under reduced pressure at room temperature for two hours to obtain an aimed product NiPhCl(PEt$_3$)$_2$ in an orange solid form (2.00 g, 86%).

$^1$HNMR (500 MHz, $C_6D_6$) δ7.43 (d, J=7.5 Hz, 2H), 6.97 (t, J=7.3 Hz, 2H), 6.60 (t, J=7.0 Hz, 1H), 1.32 (m, 12H), 1.02 (m, 18H);

$^{13}$CNMR (126 MHz, $C_6D_6$): 155.31 (t, J=54 Hz, 1C), 137.54 (t, J=6 Hz, 2C), 126.79 (t, J=4 Hz, 2C), 121.33 (t, J=4 Hz, 1C), 14.25 (t, J=20 Hz, 6C), 8.32 (s, 6C);

$^{31}$PNMR (202 MHz, $C_6D_6$) δ11.1;

Elemental analysis, Calcd for $C_{18}H_{35}ClNiP_2$; C, 53.05; H, 8.66. found C, 52.81; H, 8.57.

In a glove box, a 3 mL solution of potassium bis(trimethylsilyl)amide (26 mg, 0.12 mmol) in diethyl ether was gradually added to the ligand B-349 (50 mg, 0.12 mmol) collected in a 15 mL vial. A reaction mixture was stirred at room temperature for 10 minutes. To this reaction solution, a 1.5 mL solution of NiPhCl(PEt$_3$)$_2$ (49 mg, 0.12 mmol) in diethyl ether was added in a dropwise manner, and THF (3 mL) was added. Then, the reaction solution was stirred overnight at room temperature. The reaction mixture was filtered through celite, and the celite was washed with THF (2 mL). After volatiles were removed under reduced pressure, a product was extracted with hexane and filtered through celite. The celite was washed with hexane (3 mL). The volatiles were removed again under reduced pressure, and pentane (1.5 mL) was added. The resultant was left to stand at −35° C. overnight. A solid thus produced was collected by filtration, washed with chilled pentane (1 mL) and dried under reduced pressure for one hour at room temperature, thereby obtaining (B-349)NiPh(PEt$_3$) (40 mg, yield 52%).

$^1$HNMR. (500 MHz, $C_6D_6$) δ7.53 (d, J=7.5 Hz, 2H), 7.48 (t, J=6.3 Hz, 1H), 6.93 (t, J=7.3 Hz, 1H), 6.78 (t, J=7.3 Hz, 1:11), 6.56 (t, J 8.0 Hz, 11-1), 1.28 (s, 9H), 1.25 (s, 9H), 0.89-0.79 (m, 15H); $^{31}$PNMR (202 MHz, $C_6D_6$) δ48.710 (d, J=265 Hz, 1P), 13.120 (d, J=265 Hz, 1P)

Comparative Example 2-1

Synthesis of Complex (B-399)Ni((1,4,5-η)-COE)

Complex (B-399)Ni((1,4,5-η)-COE) was synthesized in the same manner as Example 2-1, except that the ligand B-399 was used in place of the ligand B-349.

2-4. Propylene Polymerization or Copolymerization

Example 2-1A

Propylene Polymerization Using Complex of Example 2-1

Propylene (500 mL) was introduced into an induction-stirring autoclave having an inner volume of about 2 L. The complex ((B-349)Ni((1,4,5-η)-COE)) of Example 2-1 was introduced into the autoclave with nitrogen gas. The autoclave was warmed up to 50° C. with stirring the mixture. Polymerization was started from the time when the autoclave temperature reached 50° C. and carried out for a predetermined time. After removing unreacted monomer, the autoclave was opened, and drying by heating was carried out to obtain a polymer.

Example 2-2A

Propylene Polymerization Using Complex of Example 2-2

A polymer was obtained in the same manner as Example 2-1A, except that the complex ((B-395)Ni((1,4,5-η)-COE)) of Example 2-2 was used in place of the complex ((B-349)Ni((1,4,5-η)-COE)) of Example 2-1.

Example 2-3A

Propylene Polymerization Using Complex of Example 2-3

A polymer was obtained in the same manner as Example 2-1A, except that the complex ((B-395)Ni((1,4,5-η)-COE)) of Example 2-3 was used in place of the complex ((B-349)Ni((1,4,5-η)-COE)) of Example 2-1.

Example 2-4A

Propylene Polymerization Using Complex of Example 2-4

A polymer was obtained in the same manner as Example 2-1A, except that the complex ((B-395)NiPhPy) of Example 2-4 was used in place of the complex ((B-349)Ni((1,4,5-η)-COE)) of Example 2-1.

Example 2-5A

Propylene Polymerization Using Complex of Example 2-5

A polymer was obtained in the same manner as Example 1A, except that the complex ((B-349)NiPh(PEt$_3$)) of Example 2-5 was used in place of the complex ((B-349)Ni((1,4,5-η)-COE)) of Example 2-1.

Example 2-2B to Example 2-2D

Copolymerization Using Complex of Example 2-2

A copolymer was obtained in the same manner as Example 2-1A, except that the complex ((B-395)Ni((1,4,5-η)-COE)) of Example 2-2 was used in place of the complex ((B-349)Ni((1,4-η)-COE)) of Example 2-1, and after the complex of Example 2-2 was introduced into an autoclave with nitrogen gas, triethoxyvinylsilane (Example 2-2B), ethyl 10-undecenoate (Example 2-2C) or 3-butene-1-ol (Example 2-2D) was further added to the autoclave. For the content rate of the comonomer in the copolymer, a molar ratio of propylene:comonomer was determined by $^1$HNMR measurement and expressed in tables as comonomer content mol %.

Example 2-4E

Copolymerization Using Complex of Example 2-4

A 50 mL stainless-steel autoclave was dried for three hours with a dryer at 120° C., assembled and then dried under reduced pressure at 125° C. for two hours. After the autoclave was cooled to room temperature, under an argon atmosphere, the complex ((B-395)NiPhPy) (5.0 μmol, 10.0 mL, 0.50 mmol/L toluene solution) of Example 2-4 and toluene (5 mL) were added to the autoclave. Then, allyl acetate was added. Then, the autoclave was filled with ethylene (4.0 MPa) and stirred for 16 hours at 50° C. After the autoclave was cooled to room temperature, venting residual ethylene was carried out, and a reaction product was quenched with ethanol (20 mL) and then a polymer was collected by filtering. The polymer was dried under reduced pressure for two hours at 100° C. to 120° C. to obtain an aimed copolymer. For the content rate of the comonomer in the copolymer, a molar ratio of ethylene:comonomer was determined by $^1$HNMR measurement and expressed in tables as comonomer content mol %.

Comparative Example 2-1A

Propylene Polymerization Using Complex of Comparative Example 2-1

A polymer was obtained in the same manner as Example 2-1A, except that the complex ((B-399)Ni((1,4,5-η)-COE)) of Comparative Example 2-1 was used in place of the complex ((B-349)Ni((1,4,5-η)-COE)) of Example 2-1.

The following Table 5-1 is for comparison of nickel raw materials and ligands used to synthesize the complexes of Examples 2-1 to 2-5 and Comparative Example 2-1.

TABLE 5-1

|  | Nickel raw material | Ligand | $R^1$ | $R^5$ | $R^6$ |
|---|---|---|---|---|---|
| Example 2-1 | Ni(COD)2 | B-349 | pentafluorophenyl group | t-butyl group | t-butyl group |
| Example 2-2 | Ni(COD)2 | B-395 | trimethylsilyl group | t-butyl group | t-butyl grop |
| Example 2-3 | Ni(COD)2 | B-396 | carbazolyl group | t-butyl group | t-buty group |
| Example 2-4 | NiClPh(TMEDA) | B-395 | trimethylsilyl group | t-butyl group | t-butyl group |
| Example 2-5 | NiClPh(PEt3)2 | B-349 | pentafluorophenyl group | t-butyl group | t-butyl group |
| Comparative Example 2-1 | Ni(COD)2 | B-399 | hydrogen | t-butyl group | t-butyl group |

For polymerization or copolymerization using propylene, the following Table 5-2 shows the polymerization conditions and polymerization results of Examples 2-1A to 2-5A, Examples 2-2B to 2-2D, and Comparative Example 2-1A. For copolymerization using ethylene, the following Table 5-3 shows the polymerization conditions and polymerization results of Example 2-4E. In these tables, polymerization activity represents copolymer yield (g) per mol of complex used for polymerization and per hour of polymerization time. In these tables, as GPC measurement results relating to polymer, weight average molecular weight Mw and molecular weight distribution Mw/Mn are mentioned. Copolymerization amount in these tables indicates the ratio of comonomer incorporated into the polyplefin backbone determined by 1H NMR.

eroatom is used as $R^1$, exhibit high polymerization activity in polypropylene Polymerization and provide polypropylene having a high molecular weight, compared to the case where $R^1$ is hydrogen (Comparative Example 2-1). Also, the molecular weight distributions Mw/Mn of the thus-obtained polypropylenes are suppressed to 2.2 or less.

Also, as is clear from Examples 2-2B to 2-2D in Table 5-2 and Example 2-4E in Table 5-3, by the metal complexes of the present disclosure, copolymerization of α-olefin and polar group-containing monomer is achieved with excellent polymerization activity.

From the above reasons, it is clear that the metal complexes of the present disclosure provide α-olefin homopolymer having a higher molecular weight and higher polymerization activity than ever before, can achieve

TABLE 5-2

|  | Complex | Comonomer species | Added comonomer amont (mmol) | Polymerization time (hr) | Polymerization activity (g/mol/hr) | Molecular weight Mw (g/mol) | Mw/Mn | Copolymerization amount (mol %) |
|---|---|---|---|---|---|---|---|---|
| Example 2-1A | Example 2-1 | — | — | 2 | $1.3 \times 10^4$ | 5,400 | 1.8 | — |
| Example 2-2A | Example 2-2 | — | — | 3 | $1.3 \times 10^5$ | 11,700 | 2.2 | — |
| Example 2-3A | Example 2-3 | — | — | 2 | $1.0 \times 10^5$ | 5,500 | 2.1 | — |
| Example 2-4A | Example 2-4 | — | — | 3 | $1.8 \times 10^5$ | 11,500 | 2.2 | — |
| Example 2-5A | Example 2-5 | — | — | 3 | $6.5 \times 10^3$ | 4,900 | 2.2 | — |
| Example 2-2B | Example 2-2 | Triethoxy vinylsilane | 5.8 | 3 | $2.4 \times 10^3$ | 7,800 | 1.8 | >0.1 |
| Example 2-2C | Example 2-2 | Ethyl-10-undecenoate | 26.8 | 3 | $9.1 \times 10^4$ | 12,100 | 2.0 | 0.5 |
| Example 2-2D | Example 2-2 | 3-buten-1-ol | 32.6 | 3 | $2.1 \times 10^3$ | 7,900 | 1.6 | 0.2 |
| Comparative Example 2-1A | Comparative Example 2-1 | — | — | 3 | $4.0 \times 10^3$ | 3,200 | 1.8 | — |

TABLE 5-3

|  | Complex | Comonomer species | Added comonomer amont (mmol) | Polymerization time (hr) | Polymerization activity (g/mol/hr) | Molecular weight Mw (g/mol) | Mw/Mn | Copolymerization amount (mol %) |
|---|---|---|---|---|---|---|---|---|
| Example 2-4E | Example 2-4 | allyl acetate | 9.3 | 16 | $1.6 \times 10^3$ | 7,900 | 3.7 | 0.1 |

2-5. Consideration

As is clear from Comparative Example 2-1A in Table 5-2, in the case of polypropylene polymerization using the conventional complex (Comparative Example 2-1), polymerization activity is $4.0 \times 10^3$ (g/mol/hr) and low, and the molecular weight Mw of the thus-obtained polymer is 3,200 and small. Meanwhile, as is clear from Examples 2-1A to 2-5A in Table 5-2, in the case of polypropylene polymerization using the metal complexes (Examples 2-1 to 2-5) of the present disclosure, polymerization activities are $6.5 \times 10^3$ (g/mol/hr) or more and high, and the molecular weights Mw of the thus-obtained polymers are 4,900 or more and large. As just described, the metal complexes of the present disclosure in which a substituent group containing a hetcopolymerization of α-olefin and polar group-containing monomer with excellent polymerization activity, and have superior technical significance.

Third Embodiment of the Present Disclosure 3-1. Evaluation Method (1) Weight Average Molecular Weight Mw, Number Average Molecular Weight Mn and Molecular Weight Distribution. Mw/Mn: Determined by the Following GPC Measurement.

First, a sample (about 20 mg) was collected in a vial for the pretreatment unit PL-SP 260VS for the high temperature GPC manufactured by Polymer Laboratories Ltd, and o-Dichlorobenzene containing BHT as a stabilizer (concentration of BHT=0.5 g/L) was added thereto to adjust the polymer concentration to 0.1% by mass. The polymer was dissolved by heating at 135° C. in the above-described pretreatment unit PL-SP 260VS for the high temperature GPC, and filtered with a glass filter to prepare a sample solution. No polymer was seized by the glass filter in GPC measurement of the present disclosure. Next, GPC measurement was carried out using HLC-8321GPC/HT manufactured by Tosoh Corporation equipped with TSKgel GMH-HT (30 cm×4 pieces) manufactured by Tosoh. Corporation as a column and RI detector. The following measuring conditions were employed: injection amount of sample solution: about 520 μL; column temperature: 135° C.; solvent: o-dichlorobenzene; and flow rate: 1.0 mL/min. Calculation of molecular weight was carried out as follows. That is, commercially available monodisperse polystyrene was used as a standard sample, and a calibration curve on retention time versus molecular weight was prepared from viscosity formulae of the polystyrene standard sample and an ethylene polymer, and calculation of molecular weight was carried out based on the calibration curve. As a viscosity formula, $[\eta]=K \times M\alpha$ was used, and $K=1.38E-4$, $\alpha=0.70$ for polystyrene, and $K=4.77E-4$, $\alpha=0.70$ for ethylene polymer were used. For propylene polymer, $K=1.03E-4$, $\alpha=0.78$ were used.

3-2. Synthesis of Ligands

Synthesis Example 3-1

Synthesis of Ligand B-394

Ligand 8-394 was synthesized according to the following scheme.

In chemical formulae mentioned below, —OMOM represents methoxymethoxy group (—OCH$_2$OCH$_3$).

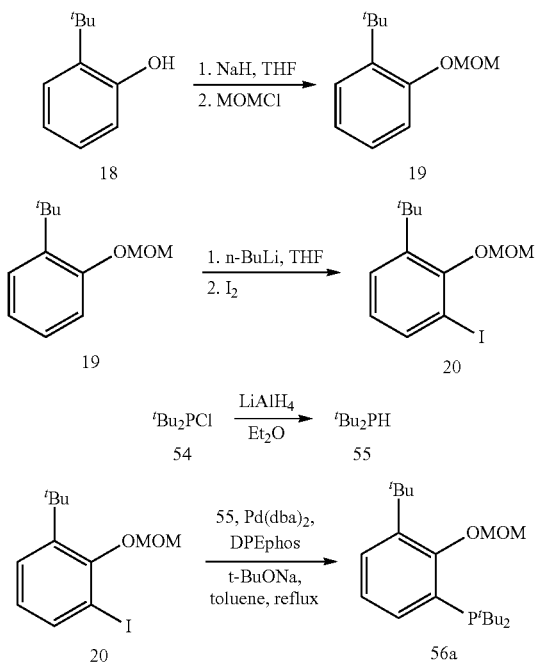

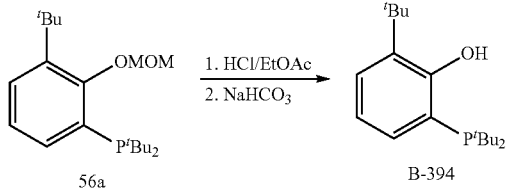

(1) Synthesis of Compound 19

A 250 mL suspended solution of sodium hydride (7.46 g, 186.4 mmol, purity 60%) in THF was added at 0° C. to 2-tert-butylphenol (the compound 18, 100.0 g, 66.6 mmol, 10.2 mL), and they were stirred at 0° C. for 30 minutes. Chloromethyl ether (10.7 g, 133.1 mmol, 10.1 mL) was added at 0° C. to a reaction mixture, and they were stirred at 15° C. for 15 hours. Then, potassium hydroxide aqueous solution (2 M, 200 mL) was slowly added to the reaction mixture, and they were stirred at 15° C. for 30 minutes. Then, the reaction mixture was extracted with ethyl acetate (100 mL×2), dried with anhydrous sodium sulfate and concentrated, thereby obtaining a crude product. The crude product was purified through a silica gel column (petroleum ether as eluent) to obtain compound 19 (8.8 g, 45.3 mmol, yield 68.1.%).

(2) Synthesis of Compound 20

First, n-butyllithium (2.5 M, 10.3 mL, 25.8 mmol) was added at 0° C. to a 60 mL solution of the compound 19 (5.0 g, 25.7 mmol) in THF, and they were stirred at 0° C. for one hour. Then, iodine (6.5 g, 25.7 mmol, 5.2 mL) was added thereto at 0° C., and they were stirred at 15° C. for 15 hours ice water (20 mL) was added to a reaction mixture, and the reaction mixture was extracted with ethyl acetate (20 mL×2). An organic phase was washed with sodium thiosulfate (20 mL) and water (20 mL), dried with anhydrous sodium sulfate and concentrated, thereby obtaining compound 20. The compound was used in a subsequent reaction without purification.

(3) Synthesis of Compound 55

Under a nitrogen atmosphere, a 40 mL solution of compound 54 (20.0 g, 110.7 mmol, 21.1 mL) in diethyl ether, was slowly added at 0° C. to a 110 mL suspended solution of lithium aluminum hydride (4.2 g, 110.7 mmol) in THF. A mixture was stirred at 35° C. for 5 hours. THF (20 mL) and water (20 mL) were slowly added at 0° C. to a reaction mixture, and then they were stirred at 35° C. for three hours. All volatile matters were collected from the reaction mixture by distillation. Then, an organic phase was dried over magnesium sulfate and filtrate. After the removal of solvent by evaporation, the residue was distilled at 70 mmHg, and a fraction with a boiling point of from 50° C. to 55° C. was collected to obtain the compound 55 in a colorless clear oil form (8.2 g, 55.7 mmol, yield 50.40).

(4) Synthesis of Compound 56a

Under a nitrogen atmosphere, toluene (5 mL) was added to the mixture of the compound 20 (200.0 mg, 468.5 μmol), the compound 55 (68.5 mg, 468.5 μmol), tris(dibenzylideneacetone)dipalladium (42.9 mg, 46.9 μmol), bis[2-(diphenylphosphino)phenyl]ether (50.5 mg, 93.7 μmol) and sodium-tert-butoxide(90.1 mg, 937.0 μmol). They were stirred at 100° C. for 16 hours. A reaction mixture was concentrated, and water (15 mL) was added thereto. Then, the reaction mixture was extracted with ethyl acetate (15 mL×2). An organic phase was washed with brine (15 mL), dried with anhydrous sodium sulfate and concentrated, thereby obtaining a crude product. The crude product was purified through a silica column (petroleum ether as eluent) to obtain compound 56a.

(5) Synthesis of Ligand B-394

HCl/ethyl acetate (4 M, 40.0 mL) were added at 0° C. to a mL solution of the compound 56a (2.5 g, 7.4 mmol) in dichloromethane. They were stirred at 25° C. for two hours. A reaction mixture was concentrated to obtain a crude product. The pH of the crude product was adjusted to 6.5 to 7.0 with saturated sodium hydrogen carbonate aqueous solution (30 mL). Then, the crude product was extracted with dichloromethane (25 mL×3). An organic phase was washed with brine (25 mL), dried with anhydrous sodium sulfate and concentrated, thereby obtaining the ligand B-394 (1.6 g, 5.4 mmol, yield 73.5%).

$^1$HNMR (400 MHz, CDCl$_3$, δ, ppm): 8.21 (d, J=12 Hz, 1H), 7.41 (dt, J=7.6 Hz, 2.8 Hz, 1H), 6.81-6.76 (m, 1H), 6.79 (t, 1H), 1.40 (s, 9H), 1.23 (s, 9H), 1.20 (s, 9H);
$^{31}$PNMR (162 MHz, CDCl$_3$, δ, ppm) −6.75 (s).

Synthesis Example 3-2

Synthesis of ligand B-400

Ligand B-400 was synthesized according to the following scheme.

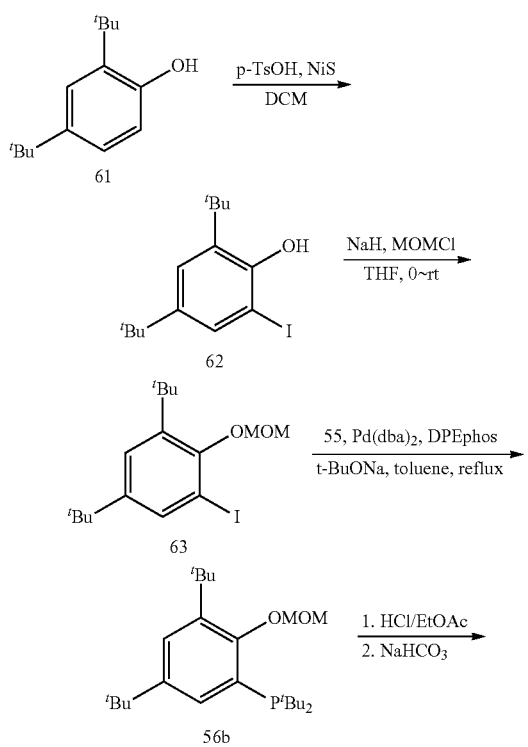

(1) Synthesis of Compound 62

N-iodosuccinimide (6.0 g, 26.7 mmol) was added to a solution of compound 61 (5.0 g, 24.2 mmol) and p-toluene-sulfonic acid (378.5 mg, 2.4 mmol) in dichloromethane, and they were stirred at 25° C. for 16 hours. A reaction mixture was quenched with saturated sodium thiosulfate (30 mL) and then extracted with ethyl acetate (20 mL×3). An organic phase was washed with brine (25 mL), dried with anhydrous sodium sulfate and concentrated, thereby obtaining a crude product. The crude product was purified through a silica gel column (petroleum ether as eluent) to obtain compound 62 (8.0 g, 24.1 mmol, yield 99.4%).

(2) Synthesis of Compound 6:3

Sodium hydride (1.4 g, 36.1 mmol, purity 60%) was added at 0° C. to a 20 mL solution of the compound 62 (8.0 g, 24.1 mmol) in THF. Then, chloromethyl methyl ether (2.5 g, 31.3 mmol, 2.4 mL) was added, and they were stirred at 25° C. for 16 hours. A reaction mixture was quenched by adding saturated sodium hydrogen carbonate aqueous solution (25 mL) at 0° C. and extracted with ethyl acetate (15 mL×3). An organic phase was washed with brine (10 mL), dried with anhydrous sodium sulfate and concentrated, thereby obtaining a crude product. The crude product was purified through a silica gel column (petroleum ether as eluent) to obtain compound 63 (5.2 g, 13.8 mmol, yield 57.4%).

(3) Synthesis of Compound 56b

Under a nitrogen atmosphere, toluene (20 mL) was added to the mixture of the compound 63 (5.2 g, 13.8 mmol), the compound 55 used to synthesize the ligand B-394 (2.0 g, 13.8 mmol), tris(dibenzylideneacetone)dipalladium (1.3 g, 1.4 mmol), bis[2-(diphenylphosphino)phenyl]ether (1.5 g, 2.8 mmol) and sodium-test-butoxide (2.7 g, 27.6 mmol). They were stirred at 100° C. for 16 hours. Then, a reaction mixture was concentrated to obtain a crude product. The crude product was purified through a silica gel column (petroleum ether/ethyl acetate-10/1 as eluent) and then recrystallized in the petroleum ether, thereby obtaining compound 56b (3.0 g, 7.6 mmol, yield 55.0%).

(4) Synthesis of Ligand B-400

HCl/ethyl acetate (4 M, 20.0 mL) were added at 0° C. to the compound 56b (2.8 g, 7.1 mmol) in dichloromethane (20 mL). They were stirred at 25° C. for two hours. Then, a reaction mixture was concentrated to obtain a crude product. The pH of the crude product was adjusted to 6.5 to 7.0 with saturated sodium hydrogen carbonate aqueous solution (30 ml). The crude product was extracted with dichloromethane (25 mL×3). An organic, phase was washed with brine (25 mL), dried with anhydrous sodium sulfate and concentrated, thereby obtaining the ligand B-400 (2.2 g, 6.3 mmol, yield 88.4%).

$^1$HNMR (400 MHz, CDCl$_3$, δ, ppm): 7.98 (d, J=12.4 Hz, 1H), 7.34 (t, J=2.5 Hz, 1H), 7.26-7.21 (m, 1H), 1.32 (s, 9H), 1.23 (s, 9H), 1.14 (s, 9H), 1.11 (s, 9H);
$^{31}$PNMR (162 MHz, CDCl$_1$, δ, ppm) −5.35 (s).

Comparative Synthesis Example 3-1

Synthesis of Ligand B-399

Ligand B-399 was synthesized according to the following scheme.

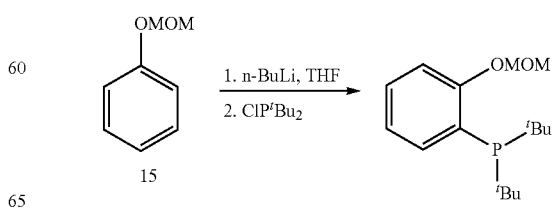

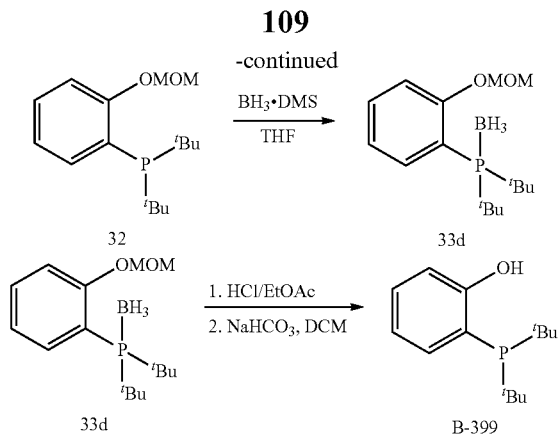

(1) Synthesis of Compound 32

First, n-butyllithium (2.5 M, 12.2 mL, 30.0 mmol) was added at 0° C. to a 30 mL solution of the compound 15 (4.0 g, 29.0 mmol) in THF, and they were stirred at 0° C. for one hour. Then, di-tert-butylchlorophosphine (5.2 g, 29.0 mmol, 5.5 mL) was added thereto at −78° C., and they were stirred at 15° C. for 12 hours. A reaction solution was poured into ice water (20 mL) and extracted with ethyl acetate (20 mL×2). An organic phase was dried with anhydrous sodium sulfate and concentrated, thereby obtaining a crude product. The crude product was purified through a silica gel column (petroleum ether:ethyl acetate=1:0-50:1 as eluent) to obtain compound 32 (3.5 g, 9.0 mmol, yield 31.2%).

(2) Synthesis of Compound 33d

Under an argon atmosphere, BH$_3$.THF (1.0 M, 16.7 mL, 16.7 mmol) was added at −78° C. to a 10 mL solution of the compound 32 (3.9 g, 13.9 mmol) in THF, and they were stirred at 10° C. for one hour. BH$_3$-dimethylsulfide (10 M, 1.7 mL, 16.7 mmol) was added thereto at −78° C., and they were stirred at 10° C. for 12 hours. To this reaction solution, ice water (10 mL) was added at 0° C., and volatiles were removed under reduced pressure. Water (20 mL) was added to the reaction solution, and the reaction solution was extracted with ethyl acetate (20 mL×3). An organic phase was dried with anhydrous sodium sulfate and concentrated, thereby obtaining a white solid. The white solid was recrystallized with ethyl acetate (10 mL) to obtain compound 33d (1.5 g, 5.1 mmol, yield 36.4%).

(3) Synthesis of Ligand B-399

Under an argon atmosphere, HCl/ethyl acetate (4 M, 80.0 mL, 320.0 mmol) were added at 0° C. to the compound 33d (5.4 g, 18.2 mmol) in dichloromethane (20 mL), and they were stirred at 10° C. for three hours. Volatiles were removed under reduced pressure, and dichloromethane (100 mL) was added. An organic phase was washed with saturated sodium hydrogen carbonate aqueous solution (100 mL) and concentrated, thereby obtaining the ligand B-399 (4.0 g, 16.8 mmol, yield 92.1%).

$^1$HNMR (400 MHz, CDCl$_3$, δ, ppm): 7.85 (s, 1H), 7.57 (dt, J=7.6 Hz, 1.4 Hz, 1H), 7.28 (td, J=7.7 Hz, 1.6 Hz, 1H), 6.94 (td, J=7.2 Hz, 1.2 Hz, 1H), 6.87 (td, J=7.5 Hz, 1.2 Hz, 1H), 1.32 (s, 9H), 1.29 (s, 9H);

$^{31}$PNMR (162 MHz, CDCl$_3$, δ, ppm) −6.21 (s).

3-3. Synthesis of Complexes

Example 3-1

Synthesis of Complex (B-394)Ni((1,4,5-η)-COE)

All of the following operations were carried out under the atmosphere of high-purity argon. Hereinafter, bis-1,5-cyclooctadiene nickel (0, i.e., zero) is referred to as Ni(COD)$_2$, and (1,4,5-η)-4-cyclooctene-1-yl ligand is referred to as (1,4,5-η)-COE.

First, the ligand B-394 (42 mg, 0.14 mmol) was weighed and put in a 25 mL round bottom flask. Next, Ni(COD)$_2$ (43 mg, 0.16 mmol) was weighed and put in another flask, and dissolved in toluene (8.0 mL) to prepare a solution of 20 mmol/mL Ni(COD)$_2$ in toluene. The thus-obtained solution was yellow and transparent. The thus-obtained Ni(COD)$_2$ solution in toluene (7.1 mL) was added to the round bottom flask containing the ligand B-394 to obtain a solution. After that, they were stirred for one hour at room temperature. At this time, it was confirmed that the color of the solution gradually changed from dark yellow to brown, and there was no precipitation. Therefore, a 20 mmol/mL solution of a reaction product ((B-394)Ni((1,4,5-η)-COE)) of B-394 and Ni(COD)$_2$ was obtained. The concentration of the reaction product was calculated assuming that B-394 and Ni(COD)$_2$ reacted in a molar ratio of 1:1 to form a nickel complex.

Example 3-2

Synthesis of Complex (B-400)Ni((1,4,5-η)-COE)

Complex (D-400)Ni((1,4,5-η)-COE) was synthesized in the same manner as Example 3-1, except that the ligand B-400 was used in place of the ligand B-394.

Example 3-3

Synthesis of Complex (B-394)Ni(4-Fluorophenyl)Py

Complex (B-394)Ni(4-Fluorophenyl)Py was synthesized according to the following scheme.

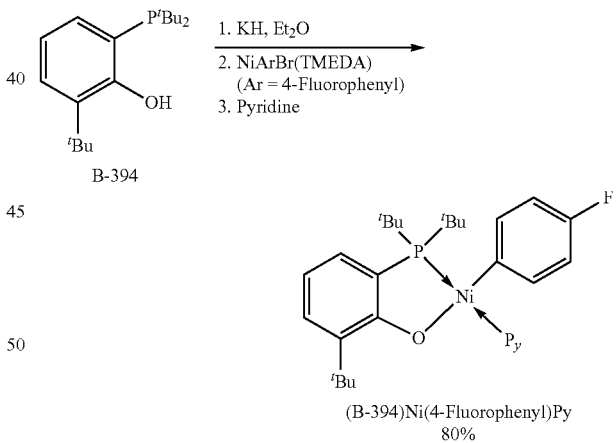

(B-394)Ni(4-Fluorophenyl)Py
80%

In a glove box, the ligand B-394 (100 mg, 0.34 mmol) and potassium hydride (27 mg, 0.68 mmol) were put in a 15 mL vial. Diethyl ether (5 mL) was added thereto, and they were stirred for 10 minutes at room temperature. A reaction mixture was filtered through celite, and the celite was washed with diethyl ether (5 mL). Ni(1-Fluorophenyl)Br (TMEDA) (TMEDA: tetramethylethylenediamine) was synthesized by reference to Non-Patent Literature "Molecules (2014), 19(9), 13603-13613". Ni(4-Fluorophenyl)Br (TMEDA) (126 mg, 0.36 mmol) was added to the diethyl ether filtrate, and they were stirred for 12 hours at room temperature. A reaction mixture was filtered through celite, and the celite was washed with diethyl ether (3 mL). To this filtrate, pyridine (29 mg, 0.37 mmol) was added, and they were stirred at room temperature for 10 hours. Then, a solvent in the reaction mixture was removed, thereby obtaining a solid. The thus-obtained solid was added to hexane (20 mL), and the mixture was filtered through celite, and the celite was washed with hexane (5 mL). A solvent in a filtrate thus obtained was removed to obtain a crude product. Hexane (1.5 mL) was added to the crude product, and the crude product was left to stand at −35° C. overnight. A solid thus precipitated was collected by filtration and washed with chilled hexane. A yellow solid thus obtained was dried under reduced pressure for two hours at room temperature, thereby obtaining complex (B-394)Ni(4-Fluorophenyl)Py (144 mg, 80%).

$^1$HNMR (400 MHz, δ, $C_6D_6$) 8.63 (d, J=5.6 Hz, 2H), 7.68 (t, J=7.0 Hz, 2H), 7.34-7.31 (m, 2H), 6.78 (t, J=9.0 Hz, 2H), 6.66 (t, J=7.4 Hz, 1H), 6.58 (td, J=7.6, 2.0 Hz, 1H), 6.36 (t, J=7.0 Hz, 2H), 1.41 (d, J=4.0 Hz, 18H), 1.38 (s, 9H);

$^{31}$PNMR (162 MHz, δ, $C_6D_6$) 60.3;

$^{19}$FNMR (376 MHz, δ, $C_6D_6$) −124.0;

$^{13}$CNMR (101 MHz, δ, $C_6D_6$) 175.54 (d, J=17 Hz, 1C), 161.58 (dd, J=240, 1.3 Hz, 1C), 150.35 (s, 2C), 144.43 (dd, J=37, 3.2 Hz, 1C), 139.24 (d, J=4.9 Hz, 2C), 138.47 (d, J=7.4 Hz, 1C), 136.52 (s, 1C), 131.93 (d, J=1.1 Hz, 1C), 129.11 (d, J=1.7 Hz, 1C), 123.37 (s, 2C), 118.02 (d, J=41 Hz, 1C), 113.14 (dd, J=18, 2.2 Hz, 2C), 112.71 (d, J=6.6 Hz, 1C), 36.33 (d, J=18 Hz, 2C), 34.97 (d, J=14 Hz, 1C), 30.17 (d, J=74.1 Hz, 6C), 29.65 (s, 3C).

Elemental analysis, Calcd for $C_{29}H_{39}FNNiCP$; C, 66.18; H, 7.47; N, 2.66; found C, 66.19; H, 7.73; N, 2.54.

Comparative Example 3-1

Synthesis Complex (B-399)Ni((1,4,5-η)-COE)

Complex (B-399)Ni((1,4,5-η)-COE) was synthesized in the same manner as Example 3-1, except that the ligand B-399 was used in place of the ligand B-394.

3-4. Propylene Polymerization or Copolymerization

Example 3-1A

Propylene Polymerization Using Complex of Example 3-1

Propylene (500 mL) was introduced into an induction-stirring autoclave having an inner volume of about 2 L. The complex ((B-394)Ni((1,4,5-η)-COE)) of Example 3-1 was introduced into the autoclave with nitrogen gas. The autoclave was warmed up to 50° C. with stirring the mixture. Polymerization was started from the time when the autoclave temperature reached 50° C. and carried out for a predetermined time. After removing unreacted monomer, the autoclave was opened, and drying by heating was carried out to obtain a polymer.

Example 3-2A

Propylene Polymerization Using Complex of Example 3-2

A polymer was obtained in the same manner as Example 3-1A, except that the complex ((B-400)Ni((1,4,5-η)-COE)) of Example 3-2 was used in place of the complex ((B-394)Ni((1,4,5-η)-COE)) of Example 3-1.

Example 3-3A

Propylene Polymerization Using Complex of Example 3-3

A polymer was obtained in the same manner as Example 3-1A, except that the complex ((B-394)Ni(4-Fluorophenyl)Py) of Example 3-3 was used in place of the complex ((B-394)Ni((1,4,5-η)-COE)) of Example 3-1.

Example 3-1B

Copolymerization Using Complex of Example 3-1

A copolymer was obtained in the same manner as Example 3-1A, except that after the complex of Example 3-1 was introduced into an autoclave with nitrogen gas, 3-butene-1-ol was further added to the autoclave. For the content rate of the comonomer in the copolymer, a molar ratio of propylene:comonomer was determined by $^1$HNMR measurement and expressed in tables as comonomer content mol %.

Example 3-2C

Copolymerization Using Complex of Example 3-2

A copolymer was obtained in the same manner as Example 3-1A, except that the complex ((B-400)Ni((1,4,5-η)-COE)) of Example 3-2 was used in place of the complex ((B-394)Ni((1,4,5-η)-COE)) of Example 3-1, and after the complex of Example 3-2 was introduced into an autoclave with nitrogen gas, ethyl 10-undecenoate was further added. For the content rate of the comonomer in the copolymer, a molar ratio of propylene:comonomer was determined by $^1$HNMR measurement and expressed in tables as comonomer content mol %.

Example 3-3D

Copolymerization Using Complex of Example 3-3

A 50 mL stainless-steel autoclave was dried for three hours with a dryer at 120° C., assembled and then dried under reduced pressure at 125° C. for two hours. After the autoclave was cooled to room temperature, under an argon atmosphere, the complex ((B-394)Ni(4-Fluorophenyl)Py) (10.0 μmol, 10.0 mL, 1.00 mmol/L toluene solution) of Example 3-3 and toluene (10 mL) were added to the autoclave. Then, propylene (10 g) and methyl acrylate were added. Then, the temperature of the autoclave was adjusted to 50° C., and the content was stirred for 64 hours. After the autoclave was cooled to room temperature, venting residual propylene was carried out, and a reaction product was quenched with ethanol (20 mL) and then a polymer was collected by filtering. The polymer was dried under reduced pressure for two hours at 100° C. to 120° C. to obtain an aimed copolymer. For the content rate of the comonomer in the copolymer, a molar ratio of propylene:comonomer was determined by $^1$HNMR measurement and expressed in tables as comonomer content mol %.

Comparative Example 3-1A

Propylene Polymerization Using Complex of Comparative Example 3-1

A polymer was obtained in the same manner as Example 3-1A, except that the complex ((B-399)Ni((1,4,5-η)-COE))

of Comparative Example 3-1 was used in place of the complex ((B-394)Ni((1,4,5-η)-COE)) of Example 3-1.

The following Table 5-1 is for comparison of nickel raw materials and ligands used to synthesize the complexes of Examples 3-1 to 3-3 and Comparative Example 3-1.

TABLE 6-1

| | Nickel raw material | Ligand | $R^1$ | $R^3$ | $R^5$ | $R^6$ |
|---|---|---|---|---|---|---|
| Example 3-1 | Ni(COD)2 | B-394 | t-butyl group | hydrogen | t-butyl group | t-butyl group |
| Example 3-2 | Ni(COD)2 | B-400 | t-butyl group | t-butyl group | t-butyl group | t-butyl group |
| Example 3-3 | NiArBr(TMEDA) (Ar = 4-Fluorophenyl) | B-394 | t-butyl group | hydrogen | t-butyl group | t-butyl group |
| Comparative Example 3-1 | Ni(COD)2 | B-399 | hydrogen | hydrogen | t-butyl group | t-butyl group |

For polymerization or copolymerization using propylene, the following Table 6-2 shows the polymerization conditions and polymerization results of Examples 3-1A to 3-3A, Example 3-1B, Example 3-2C, Example 3-3D, and Comparative Example 3-1A. In Table 6-2, polymerization activity represents copolymer yield (g) per 1 mol of complex used for polymerization and per 1 hour of polymerization time. In Table 6-2, as GPC measurement results relating to polymer, weight average molecular weight Mw and molecular weight distribution Mw/Mn are mentioned. Copolymerization amount in Table 6-2 indicates the ratio of comonomer incorporated into the polyplefin backbone determined by 1H NMR.

TABLE 6-2

| | Complex | Comonomer species | Added comonomer amount (mmol) | Polymerization time (hr) | Polymerization activity (g/mol/hr) | Molecular weight Mw (g/mol) | Mw/Mn | Copolymerization amount (mol %) |
|---|---|---|---|---|---|---|---|---|
| Example 3-1A | Example 3-1 | — | — | 3 | $1.5 \times 10^5$ | 15,900 | 2.3 | — |
| Example 3-2A | Example 3-2 | — | — | 3 | $1.6 \times 10^5$ | 16,900 | 2.2 | — |
| Example 3-3A | Example 3-3 | — | — | 3 | $1.1 \times 10^5$ | 17,100 | 1.8 | — |
| Example 3-1B | Example 3-1 | 3-Buten-1-ol | 81.6 | 3 | $7.9 \times 10^2$ | 8,000 | 1.3 | 0.2 |
| Example 3-2C | Example 3-2 | Ethyl-10-undecenoate | 26.8 | 3 | $2.1 \times 10^4$ | 17,100 | 1.6 | 0.6 |
| Example 3-3D | Example 3-3 | Methyl acrylate | 0.12 | 64 | 17 | — | — | 0.1 |
| Comparative Example 3-1A | Comparative Example 3-1 | — | — | 3 | $4.0 \times 10^3$ | 3,200 | 1.8 | — |

3-5. Consideration

As is clear from Comparative Example 3-1A in Table 6-2, in the case of polypropylene polymerization using the conventional complex (Comparative Example 3-1), polymerization activity is $4.0 \times 10^3$ (g/mol/hr) and low, and the molecular weight Mw of the thus-obtained polymer is 3,200 and small. Meanwhile, as is clear from Examples 3-1A to 3-3A in Table 6-2, in the case of polypropylene polymerization using the metal complexes (Examples 3-1 to 3-3) of the present disclosure, polymerization activities are $1.1 \times 10^5$ (g/mol/hr) or more and high, and the molecular weights MW of the thus-obtained polymers are 15,900 or more and large. As just described, the metal complexes of the present disclosure in which a hydrocarbon group is used as $R^1$, exhibit high polymerization activity in polypropylene polymerization and provide polypropylene having a high molecular weight, compared to the case where $R^1$ is hydrogen (Comparative Example 3-1). Also, the molecular weight distributions Mw/Mn of the thus-obtained polypropylenes are suppressed to 2.3 or less.

Also, as is clear from Example 3-1B, Example 3-2C and Example 3-3D in Table 6-2, by the metal complexes of the present disclosure, copolymerization of α-olefin and polar group-containing monomer is achieved with excellent polymerization activity.

From the above reasons, it is clear that the metal complexes of the present disclosure provide α-olefin homopolymer having a higher molecular weight and higher polymerization activity than ever before, can achieve copolymerization of α-olefin and polar group-containing monomer with excellent polymerization activity, and have superior technical significance.

INDUSTRIAL APPLICABILITY

By using the metal complex of the present disclosure, novel functional polyolefin can be produced. Therefore, the metal complex of the present disclosure is industrially extremely useful for applications, especially applications in which adhesion and good design are required.

The invention claimed is:

1. A catalyst component for olefin polymerization, comprising a metal complex obtained by contacting a compound represented by the following formula [I] or [II] with a transition metal compound containing a transition metal belonging to 9th, 10th or 11th group in the periodic table:

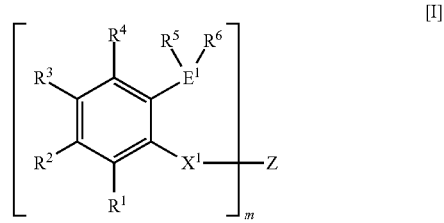

-continued

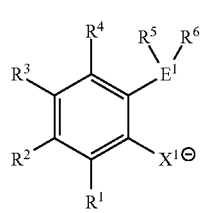

[II]

wherein R¹ to R⁶, E¹ and X¹ in the formulae [I] and [II] are as follows:

R¹, R², R³ and R⁴ each independently represents an atom or group selected from the group consisting of the following (i) to (iv):
(i) hydrogen,
(ii) a halogen,
(iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and
(iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

a plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represents a linear alkyl group having 7 to 30 carbon atoms, a branched acyclic alkyl group having 7 to 30 carbon atoms, an alkenyl group having 7 to 30 carbon atoms, a cycloalkyl group having 7 to 30 carbon atoms and optionally having a side chain, or an arylalkyl group having 7 to 30 carbon atoms, each of the groups optionally having one selected from the group consisting of a heteroatom and a group containing a heteroatom;

$E^1$ represents phosphorus, arsenic or antimony; and $X^1$ represents oxygen or sulfur, and wherein, in the formula [I], Z represents hydrogen or a leaving group, and m represents a valence of Z, and wherein $R^5$ and $R^6$ each independently represents an alkenyl group having 7 to 30 carbon atoms, a cycloalkyl group having 7 to 30 carbon atoms and optionally having a side chain, each of the groups not having one selected from the group consisting of a heteroatom and a group containing a heteroatom.

2. A catalyst for olefin polymerization, comprising the following components (A) and (B), and optionally further comprising the following component (C):

the component (A): a metal complex obtained by contacting a compound represented by the following formula [I] or [II] with a transition metal compound containing a transition metal belonging to 9th, 10th or 11th group in the periodic table:

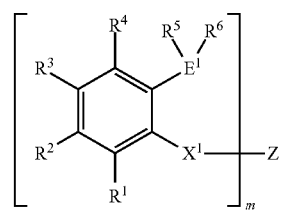

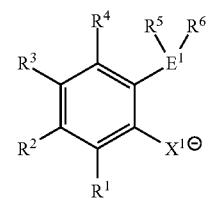

wherein R¹ to R⁶, E¹ and X¹ in the formulae [I] and [II] are as follows:

R¹, R², R³ and R⁴ each independently represents an atom or group selected from the group consisting of the following (i) to (iv):
(i) hydrogen,
(ii) a halogen,
(iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and
(iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

a plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represents a linear alkyl group having 7 to 30 carbon atoms, a branched acyclic alkyl group having 7 to 30 carbon atoms, an alkenyl group having 7 to 30 carbon atoms, a cycloalkyl group having 7 to 30 carbon atoms and optionally having a side chain, or an arylalkyl group having 7 to 30 carbon atoms, each of the groups optionally having one selected from the group consisting of a heteroatom and a group containing a heteroatom;

$E^1$ represents phosphorus, arsenic or antimony; and $X^1$ represents oxygen or sulfur, and wherein, in the formula [I], Z represents hydrogen or a leaving group, and m represents a valence of Z;

the component (B): a compound reactive with the component (A) to form an ion pair, or an ion-exchange layered silicate; and the component (C): an organoaluminum compound.

3. The catalyst for olefin polymerization according to claim 2, wherein the component (B) is aluminoxane.

4. A method for producing an α-olefin polymer, wherein (a) an α-olefin is polymerized or copolymerized in the presence of the catalyst for polymerization defined by claim 2.

5. The method for producing the α-olefin polymer according to claim 4, wherein the (a) α-olefin is propylene.

6. A method for producing an α-olefin copolymer, wherein (a) an α-olefin and (b) a (meth)acrylic acid ester monomer, vinyl monomer or allyl monomer are copolymerized in the presence of the catalyst for polymerization defined by claim 2.

7. A method for producing an α-olefin copolymer according to claim 6, wherein the (a) α-olefin is propylene.

8. A catalyst component for olefin polymerization, comprising a metal complex obtained by contacting a compound represented by the following formula [I] or [II] with a transition metal compound containing a transition metal belonging to 9th, 10th or 11th group in the periodic table:

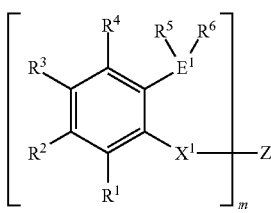
[I]

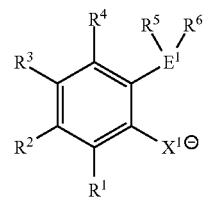
[II]

wherein $R^1$ to $R^6$, $E^1$ and $X^1$ in the formulae [I] and [II] are as follows:

$R^2$, $R^3$ and $R^4$ each independently represents an atom or group selected from the group consisting of the following (i) to (iv):

(i) hydrogen, (ii) a halogen, (iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and (iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

$R^1$ represents a group selected from the group consisting of the following (v) and (vi):

(v) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups having one selected from the group consisting of a heteroatom and a group containing a heteroatom, and (vi) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, wherein $R^8$, $R^9$, M', x and v are as described above;

a plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represents a linear alkyl group having 1 to 6 carbon atoms, a branched acyclic alkyl group having 3 to 6 carbon atoms, or an alkenyl group having 2 to 6 carbon atoms, each of the groups optionally having one selected from the group consisting of a heteroatom and a group containing a heteroatom;

$R^5$ and $R^6$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$E^1$ represents phosphorus, arsenic or antimony; and $X^1$ represents oxygen or sulfur, and wherein, in the formula [I], Z represents hydrogen or a leaving group, and m represents a valence of Z, and wherein $R^5$ and $R^6$ each independently represents a branched acyclic alkyl group having 3 to 6 carbon atoms, or an alkenyl group having 2 to 6 carbon atoms, each of the groups not having one selected from the group consisting of a heteroatom and a group containing a heteroatom.

9. A catalyst for olefin polymerization, comprising the following components (A) and (B), and optionally further comprising the following component (C):

the component (A): a metal complex obtained by contacting a compound represented by the following formula [I] or [II] with a transition metal compound containing a transition metal belonging to 9th, 10th or 11th group in the periodic table:

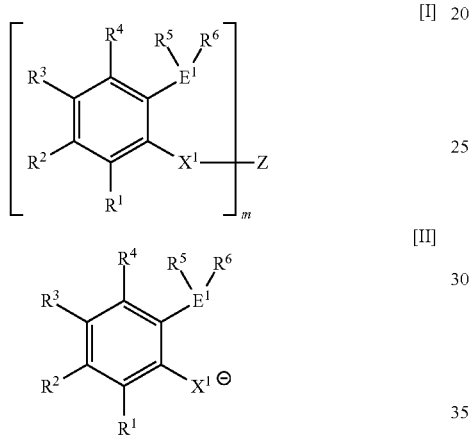

wherein $R^1$ to $R^6$, $E^1$ and $X^1$ in the formulae [I] and [II] are as follows:

$R^2$, $R^3$ and $R^4$ each independently represents an atom or group selected from the group consisting of the following (i) to (iv):

(i) hydrogen, (ii) a halogen, (iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and (iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

$R^1$ represents a group selected from the group consisting of the following (v) and (vi):

(v) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups having one selected from the group consisting of a heteroatom and a group containing a heteroatom, and (vi) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, wherein $R^8$, $R^9$, M', x and v are as described above;

a plurality of groups appropriately selected from $R^1$, $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represents a linear alkyl group having 1 to 6 carbon atoms, a branched acyclic alkyl group having 3 to 6 carbon atoms, or an alkenyl group having 2 to 6 carbon atoms, each of the groups optionally having one selected from the group consisting of a heteroatom and a group containing a heteroatom;

$R^5$ and $R^6$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$E^1$ represents phosphorus, arsenic or antimony; and $X^1$ represents oxygen or sulfur, and wherein, in the formula [I], Z represents hydrogen or an leaving group, and m represents a valence of Z;

the component (B): a compound reactive with the component (A) to form an ion pair, or an ion-exchange layered silicate; and the component (C): an organoaluminum compound.

10. The catalyst for olefin polymerization according to claim 9, wherein the component (B) is aluminoxane.

11. A method for producing an α-olefin polymer, wherein (a) an α-olefin is polymerized or copolymerized in the presence of the catalyst for polymerization defined by claim 9.

12. The method for producing the α-olefin polymer according to claim 11, wherein the (a) α-olefin is propylene.

13. A method for producing an α-olefin copolymer, wherein (a) an α-olefin and (b) a (meth)acrylic acid ester monomer, vinyl monomer or allyl monomer are copolymerized in the presence of the catalyst for polymerization defined by claim 9.

14. The method for producing the α-olefin copolymer according to claim 13, wherein the (a) α-olefin is propylene.

15. A catalyst component for olefin polymerization, comprising a metal complex obtained by contacting a compound represented by the following formula [I] or [II] with a transition metal compound containing a transition metal belonging to 9th, 10th or 11th group in the periodic table:

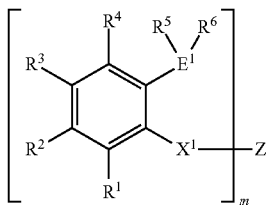

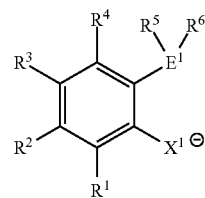

wherein $R^1$ to $R^6$, $E^1$ and $X^1$ in the formulae [I] and [II] are as follows:

$R^1$ represents a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms;

$R^2$, $R^3$ and $R^4$ each independently represents an atom or group selected from the group consisting of the following (i) to (iv):
(i) hydrogen,
(ii) a halogen,
(iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and
(iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, CN, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

a plurality of groups appropriately selected from $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represents a linear alkyl group having 4 to 6 carbon atoms, a secondary alkyl group having 4 to 6 carbon atoms, a tertiary alkyl group having 4 to 6 carbon atoms, or an alkenyl group having 4 to 6 carbon atoms, each of the groups optionally having one selected from the group consisting of a heteroatom and a group containing a heteroatom;

$E^1$ represents phosphorus, arsenic or antimony; and
$X^1$ represents oxygen or sulfur, and
wherein, in the formula [I],
Z represents hydrogen or a leaving group, and
m represents a valence of Z, and
wherein $R^5$ and $R^6$ each independently represents a tertiary alkyl group having 4 to 6 carbon atoms, or an alkenyl group having 4 to 6 carbon atoms, each of the groups not having one selected from the group consisting of a heteroatom and a group containing a heteroatom.

16. A catalyst for olefin polymerization, comprising the following components (A) and (B), and optionally further comprising the following component (C):

the component (A): a metal complex obtained by contacting a compound represented by the following formula [I] or [II] with a transition metal compound containing a transition metal belonging to 9th, 10th or 11th group in the periodic table:

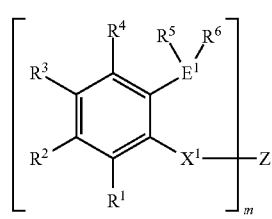

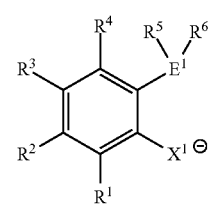

wherein $R^1$ to $R^6$, $E^1$ and $X^1$ in the formulae [I] and [II] are as follows:

$R^1$ represents a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms;

$R^2$, $R^3$ and $R^4$ each independently represents an atom or group selected from the group consisting of the following (i) to (iv):
(i) hydrogen,
(ii) a halogen,
(iii) a linear alkyl group having 1 to 30 carbon atoms, a branched acyclic alkyl group having 3 to 30 carbon atoms, an alkenyl group having 2 to 30 carbon atoms, a cycloalkyl group having 3 to 30 carbon atoms and optionally having a side chain, an aryl group having 6 to 30 carbon atoms, an arylalkyl group having 7 to 30 carbon atoms, or an alkylaryl group having 7 to 30 carbon atoms, each of the groups optionally having one selected from the group consisting of a heteroatom and a group containing a heteroatom, and (iv) $OR^9$, $CO_2R^9$, $CO_2M'$, $C(O)N(R^8)_2$, $C(O)R^9$, $SR^9$, $SO_2R^9$, $SOR^9$, $OSO_2R^9$, $P(O)(OR^9)_{2-y}(R^8)_y$, $CN$, $NHR^9$, $N(R^9)_2$, $Si(OR^8)_{3-x}(R^8)_x$, $OSi(OR^8)_{3-x}(R^8)_x$, $NO_2$, $SO_3M'$, $PO_3M'_2$, $P(O)(OR^9)_2M'$ or an epoxy-containing group, where $R^8$ represents hydrogen or a hydrocarbon group having 1 to 20 carbon atoms; $R^9$ represents a hydrocarbon group having 1 to 20 carbon atoms; M' represents an alkali metal, an alkaline earth metal, ammonium, quaternary ammonium or phosphonium; x represents an integer of from 0 to 3; and y represents an integer of from 0 to 2;

a plurality of groups appropriately selected from $R^2$, $R^3$ and $R^4$ optionally bind to each other to form an alicyclic ring, an aromatic ring, or a heterocyclic ring containing a heteroatom selected from the group consisting of oxygen, nitrogen and sulfur, and in this case, a number of ring members is 5 to 8, and the ring optionally has a substituent group thereon;

$R^5$ and $R^6$ each independently represents a linear alkyl group having 4 to 6 carbon atoms, a secondary alkyl group having 4 to 6 carbon atoms, a tertiary alkyl group having 4 to 6 carbon atoms, or an alkenyl group having 4 to 6 carbon atoms, each of the groups optionally having one selected from the group consisting of a heteroatom and a group containing a heteroatom;

$E^1$ represents phosphorus, arsenic or antimony; and $X^1$ represents oxygen or sulfur, and wherein, in the formula [I], Z represents hydrogen or a leaving group, and m represents a valence of Z;

the component (B): a compound reactive with the component (A) to form an ion pair, or an ion-exchange layered silicate; and the component (C): an organoaluminum compound.

17. The catalyst for olefin polymerization according to claim 16, wherein the component (B) is aluminoxane.

18. A method for producing an α-olefin polymer, wherein (a) an α-olefin is polymerized or copolymerized in the presence of the catalyst for polymerization defined by claim 16.

19. The method for producing the α-olefin polymer according to claim 18, wherein the (a) α-olefin is propylene.

20. A method for producing an α-olefin copolymer, wherein (a) an α-olefin and (b) a (meth)acrylic acid ester monomer, vinyl monomer or allyl monomer are copolymerized in the presence of the catalyst for polymerization defined by claim 16.

21. The method for producing the α-olefin copolymer according to claim 20, wherein the (a) α-olefin is propylene.

* * * * *